(12) United States Patent
Cheng et al.

(10) Patent No.: US 11,448,859 B2
(45) Date of Patent: Sep. 20, 2022

(54) OPTICAL LENS SYSTEM

(71) Applicant: Young Optics Inc., Hsinchu (TW)

(72) Inventors: Hung-You Cheng, Hsinchu (TW);
Yu-Hung Chou, Hsinchu (TW);
Ching-Lung Lai, Hsinchu (TW);
Yi-Hua Lin, Hsinchu (TW); Wei-Hao Huang, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 0 days.

(21) Appl. No.: 16/821,253

(22) Filed: Mar. 17, 2020

(65) Prior Publication Data

US 2020/0218038 A1 Jul. 9, 2020

Related U.S. Application Data

(63) Continuation of application No. 14/981,691, filed on Dec. 28, 2015, now Pat. No. 10,656,397, which is a continuation-in-part of application No. 14/750,569, filed on Jun. 25, 2015, now abandoned.

(51) Int. Cl.
*G02B 13/14* (2006.01)
*G02B 13/04* (2006.01)

(52) U.S. Cl.
CPC ........... *G02B 13/143* (2013.01); *G02B 13/04* (2013.01)

(58) Field of Classification Search
CPC ...... G02B 13/14; G02B 13/143; G02B 13/04; G02B 13/18; G02B 7/04; G02B 9/64; G02B 27/00; G02B 27/0025

USPC ........ 359/350, 354–357, 432, 642, 648–649, 359/691, 717, 728, 749, 754, 793
See application file for complete search history.

(56) References Cited

U.S. PATENT DOCUMENTS

| 4,770,477 | A | | 9/1988 | Shafer | |
|---|---|---|---|---|---|
| 5,475,537 | A | * | 12/1995 | Kobayashi | G02B 13/24 359/368 |
| 5,589,988 | A | * | 12/1996 | Suenaga | G02B 15/142 359/752 |
| 5,930,032 | A | | 7/1999 | Maruyama et al. | |
| 5,999,310 | A | | 12/1999 | Shafer et al. | |
| 6,115,175 | A | | 9/2000 | Maruyama et al. | |
| 6,313,955 | B1 | * | 11/2001 | Yoneyama | G02B 13/02 359/684 |
| 6,956,694 | B2 | | 10/2005 | Shafer et al. | |
| 7,057,804 | B2 | | 6/2006 | Tada et al. | |
| 7,599,127 | B2 | | 10/2009 | Muratani et al. | |
| 7,768,719 | B2 | | 8/2010 | Jung et al. | |
| 8,279,527 | B2 | | 10/2012 | Lin | |

(Continued)

*Primary Examiner* — Jie Lei
(74) *Attorney, Agent, or Firm* — Muncy, Geissler, Olds & Lowe, P.C.

(57) ABSTRACT

An optical lens system using ultraviolet for imaging includes, in order from a magnified side to a minified side, a first lens group of positive refractive power and a second lens group of positive refractive power. The second lens group includes at least one cemented lens and at least one aspheric lens. The optical lens system satisfies the condition of $TE_{(\lambda=400)}>94\%$, where $TE_{(\lambda=400)}$ denotes an overall transmittance of all of the lenses in the optical lens system measured at a wavelength of 400 nm and is equal to a product of respective internal transmittances of all of the lenses measured at a wavelength of 400 nm.

20 Claims, 39 Drawing Sheets

(56) References Cited

U.S. PATENT DOCUMENTS

| | | |
|---|---|---|
| 8,498,066 B2 | 7/2013 | Liu et al. |
| 9,261,670 B2 | 2/2016 | Lai et al. |
| 2003/0155482 A1 | 8/2003 | Moellmann |
| 2006/0077564 A1 | 4/2006 | Baba |
| 2009/0296201 A1 | 12/2009 | Caldwell |
| 2013/0070123 A1 | 3/2013 | Imaoka |
| 2014/0185143 A1 | 7/2014 | Kubota |
| 2014/0185144 A1 | 7/2014 | Kubota |
| 2016/0154224 A1 | 6/2016 | Imai et al. |

\* cited by examiner

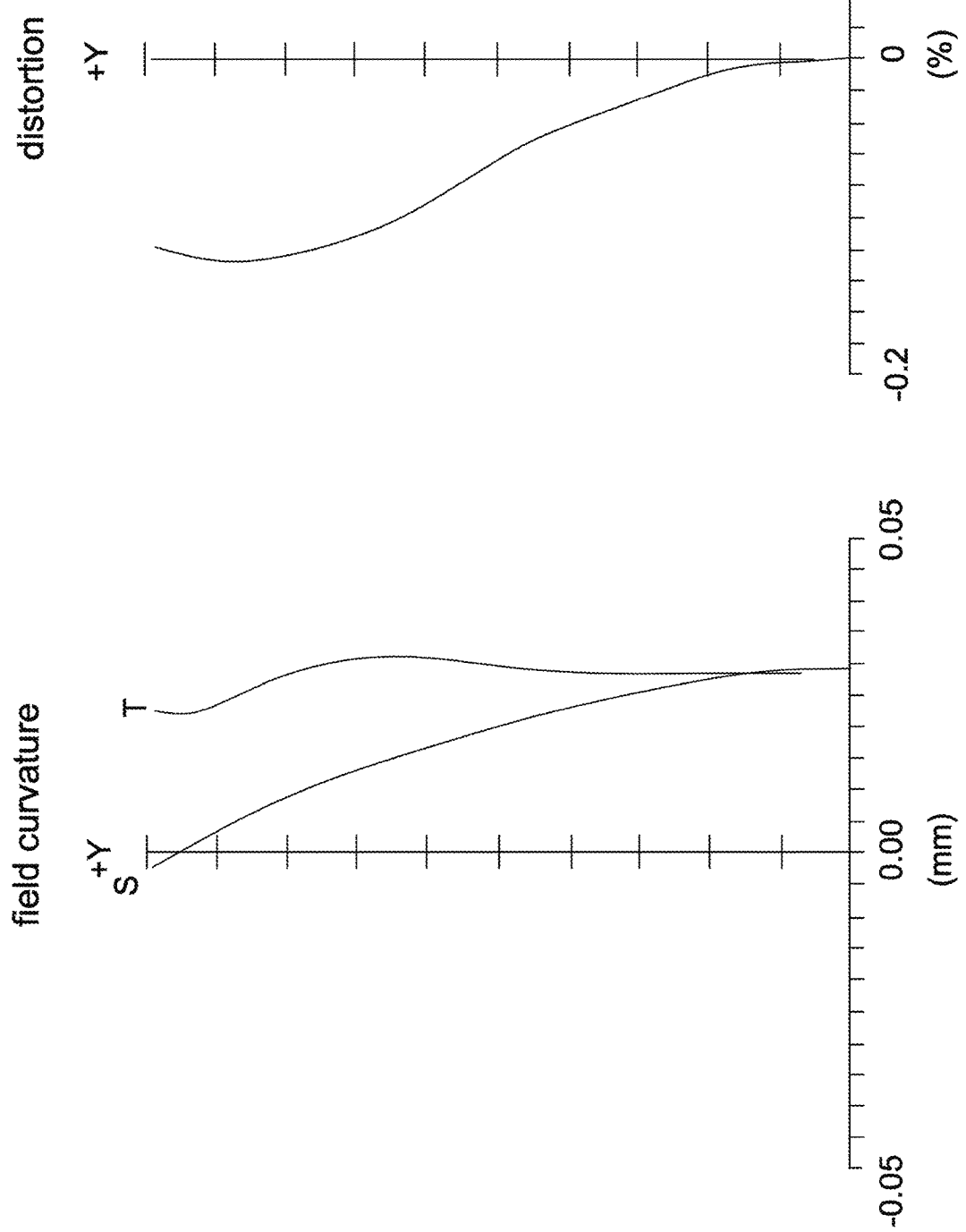

OPTICAL LENS SYSTEM

CROSS-REFERENCE TO RELATED APPLICATIONS

This application is continuation application of application Ser. No. 14/981,691, filed Dec. 28, 2015, which is a continuation-in-part of application Ser. No. 14/750,569, filed Jun. 25, 2015, the contents of which are incorporated by reference herein.

BACKGROUND OF THE INVENTION a. Field of the Invention

The invention relates generally to an optical lens system, and more particularly to an optical lens system adapted to transmit short wavelength light for imaging purpose.

b. Description of the Related Art

Generally, an optical lens system that uses short wavelength light as a light source is favorable for forming an image of fine patterns, since the size of the smallest spot image that can be resolved is in proportion to the wavelength. However, the optical lens system using short wavelength light is difficult to achieve a high light transmittance and may cause considerable chromatic aberrations that increase as the wavelength decreases. Therefore, it is desirable to provide a high-performance optical lens system that has an improved light transmittance and is favorable for correcting chromatic aberrations.

BRIEF SUMMARY OF THE INVENTION

According to one aspect of the present disclosure, an optical lens system using ultraviolet for imaging includes, in order from a magnified side to a minified side, a first lens group of positive refractive power and a second lens group of positive refractive power. The second lens group includes at least one cemented lens and at least one aspheric lens, and, during focusing, the first lens group remains stationary, and the second lens group is movable in a direction of an optical axis. The optical lens system satisfies the condition of $TE_{(\lambda=400)} > 94\%$, where $TE_{(\lambda=400)}$ denotes an overall transmittance of all of the lenses in the optical lens system measured at a wavelength of 400 nm and is equal to a product of respective internal transmittances of all of the lenses measured at a wavelength of 400 nm.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 illustrates modulation transfer function (MTF) curves,

FIG. 3A illustrates astigmatic field curves, and FIG. 3B illustrates percentage distortion curves.

FIG. 5 illustrates modulation transfer function (MTF) curves,

FIG. 6A illustrates astigmatic field curves, and FIG. 6B illustrates percentage distortion curves.

FIG. 8 illustrates modulation transfer function (MTF) curves,

FIG. 9A illustrates astigmatic field curves, and FIG. 9B illustrates percentage distortion curves.

FIG. 11 illustrates modulation transfer function (MTF) curves,

FIG. 12A illustrates astigmatic field curves, and FIG. 12B illustrates percentage distortion curves.

FIG. 14 illustrates modulation transfer function (MTF) curves,

FIG. 15A illustrates astigmatic field curves, and FIG. 15B illustrates percentage distortion curves.

FIG. 17 illustrates modulation transfer function (MTF) curves,

FIG. 18A illustrates astigmatic field curves, and FIG. 18B illustrates percentage distortion curves.

FIG. 20 illustrates modulation transfer function (MTF) curves,

FIG. 21A illustrates astigmatic field curves, and FIG. 21B illustrates percentage distortion curves.

FIG. 23 illustrates modulation transfer function (MTF) curves,

FIG. 24A illustrates astigmatic field curves, and FIG. 24B illustrates percentage distortion curves.

FIG. 26 illustrates modulation transfer function (MTF) curves,

FIG. 27A illustrates astigmatic field curves, and FIG. 27B illustrates percentage distortion curves.

FIG. 29 illustrates modulation transfer function (MTF) curves,

FIG. 30A illustrates astigmatic field curves, and FIG. 30B illustrates percentage distortion curves.

FIG. 32 illustrates modulation transfer function (MTF) curves,

FIG. 33A illustrates astigmatic field curves, and FIG. 33B illustrates percentage distortion curves.

FIG. 35 illustrates modulation transfer function (MTF) curves,

FIG. 36A illustrates astigmatic field curves, and FIG. 36B illustrates percentage distortion curves.

FIGS. 38, 39A and 39B show optical simulation results of the optical lens system shown in FIG. 37.

FIG. 38 illustrates modulation transfer function (MTF) curves,

FIG. 39A illustrates astigmatic field curves, and FIG. 39B illustrates percentage distortion curves.

DETAILED DESCRIPTION OF THE INVENTION

Figure 1:
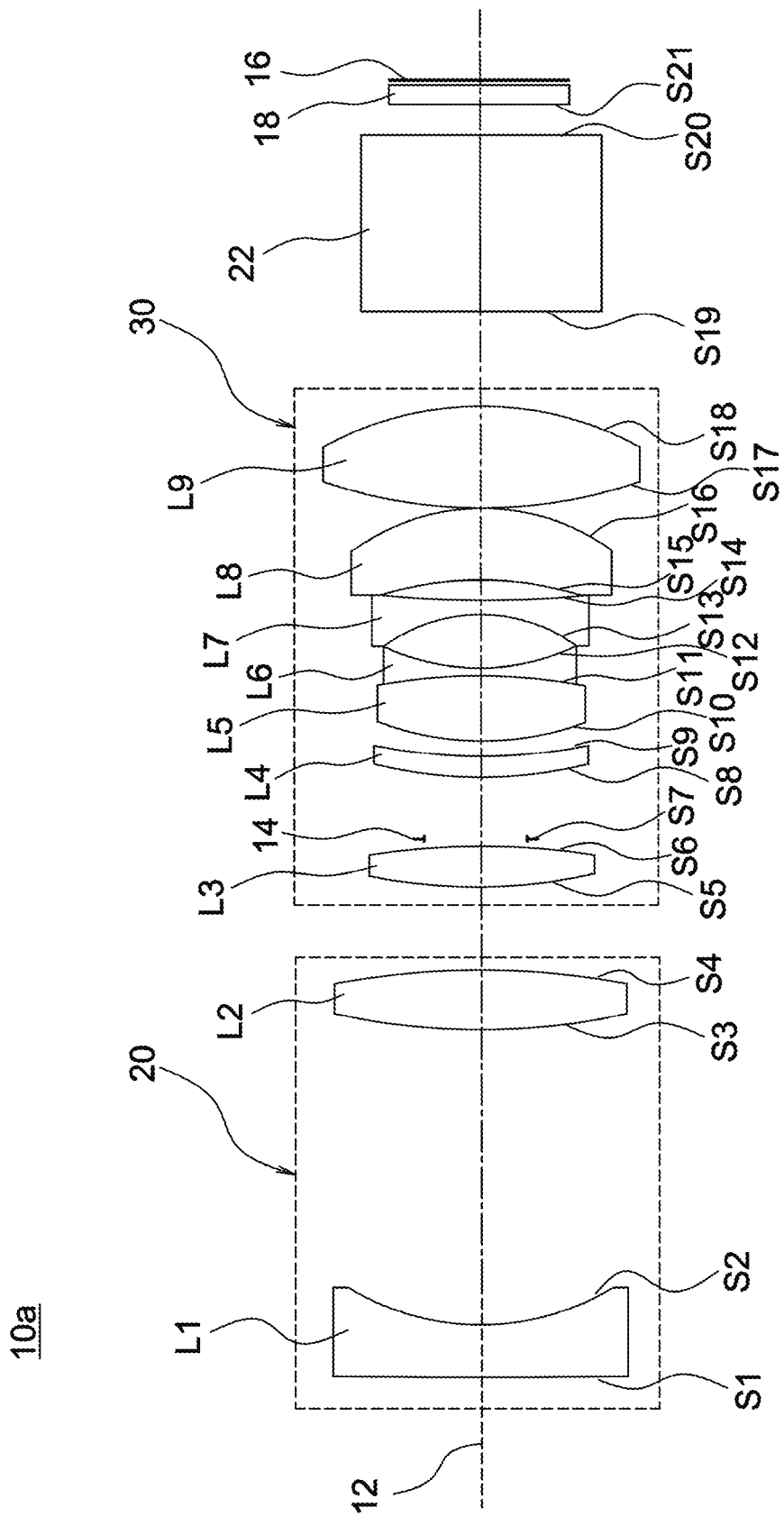
FIG. 1 shows a schematic diagram illustrating an optical lens system according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

An optical lens system according to an embodiment of the invention may include a first lens group 20 of positive refractive power and a second lens group 30 of positive refractive power. The second lens group 30 may include at least one aspherical lens surface for correcting different kinds of optical aberrations such as spherical aberration, coma, astigmatism, field curvature, and image distortion. Besides, the second lens group 30 may include at least one cemented lens to balance chromatic aberration. A spatial light modulator 16, for example, a digital micro-mirror device (DMD), selectively reflects illumination light to produce image light, and the image light may pass through a cover plate 18, a deflection prism 22, the second lens group 30, and the first lens group 20 in succession, and then the image light is projected onto an object (not shown).

In one embodiment, each of the lenses in the optical lens system may be made of glass. When the lens is made of glass, the distribution of the refractive power of the optical lens system may be more flexible to design, and the glass material is not sensitive to temperature variations to ensure competent resolution of the optical lens system under different ambient temperatures. Further, because the second lens group 30 may include at least one aspherical lens surface, more controllable variables are obtained, and the aberration is reduced, as well as the number of required lenses can be minified on constructing an optical lens system to reduce the total track length.

In one embodiment, the optical lens system may use short wavelength light such as blue light or ultraviolet as a light source. The optical lens system according to one embodiment may satisfy the following condition:

$T_{(\lambda=400)}>95\%$; and $TE_{(\lambda=400)}>94\%$, where $T_{(\lambda=400)}$ denotes a transmittance of a lens material forming each of the lenses in the optical lens system, with the transmittance of the lens material being measured at a wavelength of 400 nm and a thickness of 10 mm, and $TE_{(\lambda=400)}$ denotes an overall transmittance of all of the lenses in the optical lens system measured at a wavelength of 400 nm.

Further, the optical lens system according to one embodiment may satisfy the following condition:

$T_{(\lambda=350)}>90\%$; and $TE_{(\lambda=350)}>80\%$, where $T_{(\lambda=350)}$ denotes a transmittance of a lens material forming each of the lenses in the optical lens system, with the transmittance of the lens material being measured at a wavelength of 350 nm and a thickness of 10 mm, and $TE_{(\lambda=350)}$ denotes an overall transmittance of all of the lenses in the optical lens system measured at a wavelength of 350 nm.

In one embodiment, the optical lens system may satisfy the following condition:

C/N≥0.7, where N denotes a total number of the lenses in the optical lens system, and C denotes a number of the lenses having an Abbe number of larger than 40 in the optical lens system.

According to the above embodiments, the optical lens system is featured with good correction ability, high light transmittance and improved image quality.

A first design example of an optical lens system 10a is described in detail below with reference to FIG. 1. As illustrated in FIG. 1, the first lens group 20 includes two lenses L1 and L2 arranged in order, along an optical axis 12, from a magnified side (on the left of FIG. 1) to a minified side (on the right of FIG. 1). The second lens group 30 includes seven lenses L3, L4, L5, L6, L7, L8 and L9 arranged in order, along the optical axis 12, from the magnified side to the minified side. The refractive powers of the lens L1, L2, L3, L4, L5, L6, L7, L8 and L9 are negative, positive, positive, positive, positive, negative, negative, positive and positive, respectively. The lens L9 of the second lens group 30 may have at least one aspheric surface. The lens L5 and lens L6 are integrated as one piece to form a cemented lens. An aperture stop 14 is located between the lens L3 and the lens L4. The lens L1 has a convex magnified-side surface S1 and a concave minified-side surface S2, the lens L2 has a convex magnified-side surface S3 and a convex minified-side surface S4, the lens L3 has a convex magnified-side surface S5 and a convex minified-side surface S6, the lens L4 has a convex magnified-side surface S8 and a concave minified-side surface S9, the lens L5 has a convex magnified-side surface S10, the lens L6 has a concave magnified-side surface S11 and a concave minified-side surface S12, the lens L7 has a concave magnified-side surface S13 and a concave minified-side surface S14, the lens L8 has a concave magnified-side surface S15 and a convex minified-side surface S16, and the lens L9 has a convex magnified-side surface S17 and a convex minified-side surface S18.

According to the optical lens system of the present disclosure, each of a magnified-side and a minified-side surface of a lens has a paraxial region and a peripheral region. The paraxial region refers to the region of the surface where light rays travel close to an optical axis and the peripheral region refers to the region of the surface where light rays travel away from the optical axis. Particularly, when a lens has a convex surface, it may indicate that the surface is convex at the paraxial region; and when the lens has a concave surface, it may indicate that the surface is concave at the paraxial region.

The detailed optical data of the first example are shown in Table 1 below.

TABLE 1

Applied to a wavelength of 405 ± 25nm
Effective focal length of the optical lens system F = 20.7095 mm
Effective focal length of the first lens group F1 = 74.2252 mm
Effective focal length of the second lens group F2 = 32.2465 mm

| Surface | radius (mm) | thickness (mm) | refractive index | Abbe number | Refractive power | Shape |
|---|---|---|---|---|---|---|
| S1 | 444.281 | 3.80 | 1.55 | 45.80 | L1 (−) | convex |
| S2 | 17.495 | 19.90 | | | | concave |
| S3 | 37.652 | 3.62 | 1.74 | 52.60 | L2 (+) | convex |
| S4 | −104.735 | 6.27 | | | | convex |
| S5 | 68.171 | 2.32 | 1.74 | 52.60 | L3 (+) | convex |
| S6 | −94.965 | 0.00 | | | | convex |
| S7 (stop) | INF | 4.94 | | | | |
| S8 | 31.467 | 2.03 | 1.50 | 81.60 | L4 (+) | convex |
| S9 | 102.715 | 0.56 | | | | concave |
| S10 | 24.415 | 4.14 | 1.50 | 81.60 | L5 (+) | convex |
| S11 | −44.318 | 0.80 | 1.63 | 35.70 | L6 (−) | concave |
| S12 | 15.460 | 3.48 | | | | concave |
| S13 | −10.904 | 0.80 | 1.63 | 35.70 | L7 (−) | concave |
| S14 | 79.930 | 1.46 | | | | concave |
| S15 | −29.862 | 4.98 | 1.74 | 52.60 | L8 (+) | concave |
| S16 | −14.871 | 0.10 | | | | convex |
| S17 | 25.045 | 6.95 | 1.50 | 81.50 | L9 (+) | convex |
| S18 | −20.498 | 6.26 | | | | convex |
| S19 | INF | 12.00 | 1.52 | 64.20 | | |
| S20 | INF | 2.00 | | | | |
| S21 | INF | 1.10 | 1.52 | 64.20 | | |

Further, the aspheric surface satisfies the following equation:

$$x = \frac{c'y^2}{1+\sqrt{1-(1+k)c'^2y^2}} + Ay^4 + By^6 + Cy^8 + Dy^{10} + Ey^{12} + Fy^{14} + Gy^{16} \ldots,$$

where x denotes a displacement from the vertex of a lens in the direction of the optical axis 12, c' denotes a reciprocal of the radius of curvature at the vertex of a lens (approaching the optical axis 12), K denotes a Conic constant, y denotes a height (distance in the direction perpendicular to the optical axis 12) of the aspheric surface, and A, B, C, D, E, F and G are aspheric coefficients. The values of aspheric coefficients and Conic constant of each lens surface are listed in Table 2.

TABLE 2

| Lens surface | S17 | S18 |
|---|---|---|
| K | 1.10071 | −2.97277 |
| A | −3.88383E−05 | −3.03061E−05 |
| B | −4.06842E−08 | −1.30204E−07 |
| C | −6.76742E−09 | −1.88563E−09 |
| D | 2.56796E−10 | 1.39610E−10 |
| E | −4.56285E−12 | −2.77246E−12 |
| F | 3.80755E−14 | 2.33529E−14 |
| G | −1.24546E−16 | −7.51743E−17 |

Table 3 lists the internal transmittance of each of the lenses L1-L9 of the optical lens system 10a and the overall transmittance of all of the lenses L1-L9 at different wavelengths. As used herein, the term "internal transmittance" of a lens means a transmittance of a lens material forming such lens, and the transmittance of the lens material is measured at a thickness of 10 mm and a selected wavelength specified in the table. Table 3 clearly shows each of the lenses L1-L9 may have a light transmittance of larger than 95% at a wavelength of 380 nm or 400 nm.

TABLE 3

| | Internal transmittance | |
|---|---|---|
| | 380 nm | 400 nm |
| Lens L1 | 97.9% | 99.4% |
| Lens L2 | 97.6% | 99.0% |
| Lens L3 | 98.5% | 99.3% |
| Lens L4 | 99.9% | 99.9% |
| Lens L5 | 99.8% | 99.8% |
| Lens L6 | 98.1% | 99.6% |
| Lens L7 | 98.1% | 99.6% |
| Lens L8 | 96.8% | 98.6% |
| Lens L9 | 99.6% | 99.7% |
| Total | 86.9% | 94.8% |

Figure 2:
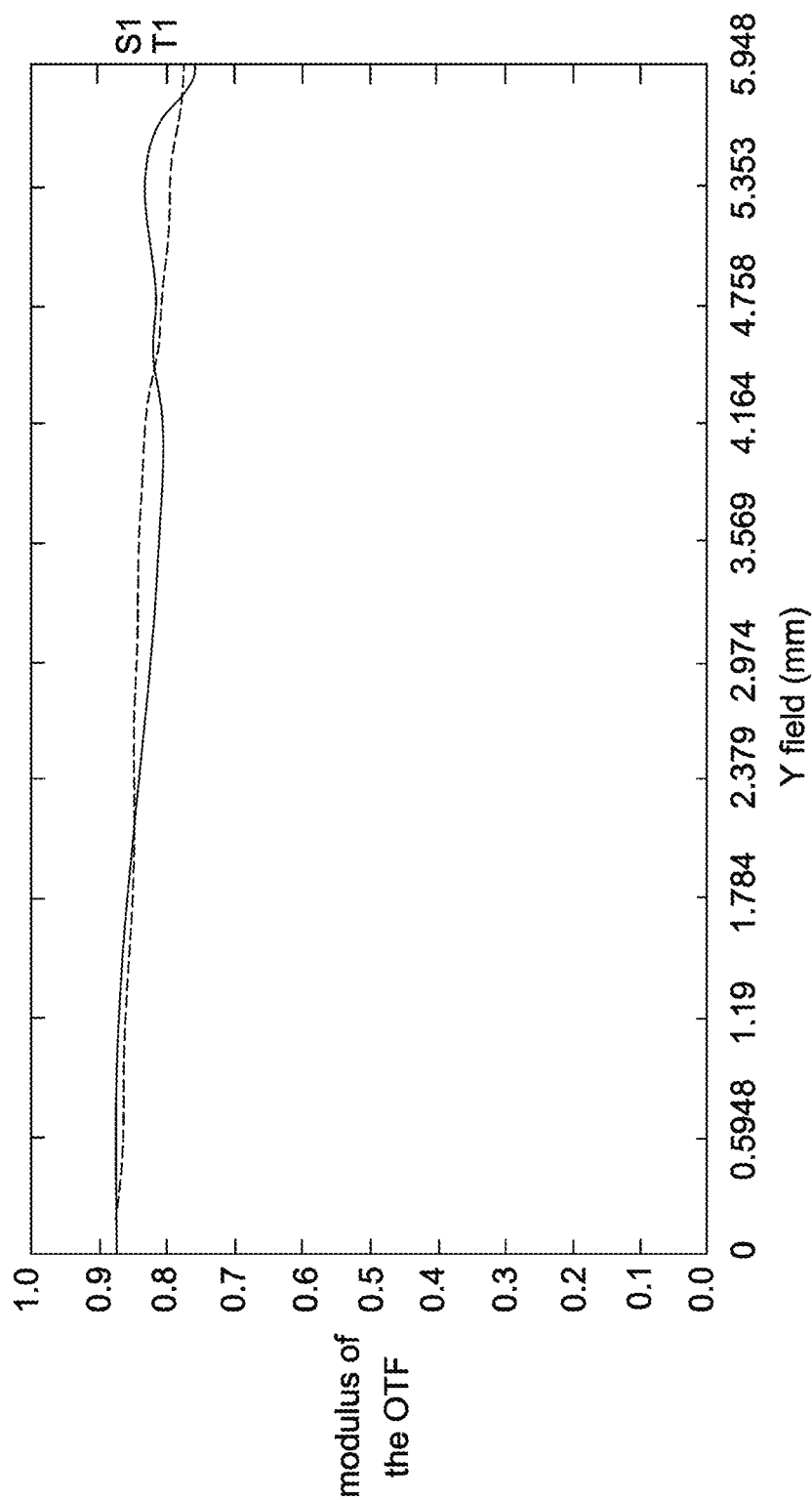
FIGS. 2, 3A and 3B show optical simulation results of the optical lens system shown in FIG. 1.
Figure 3:
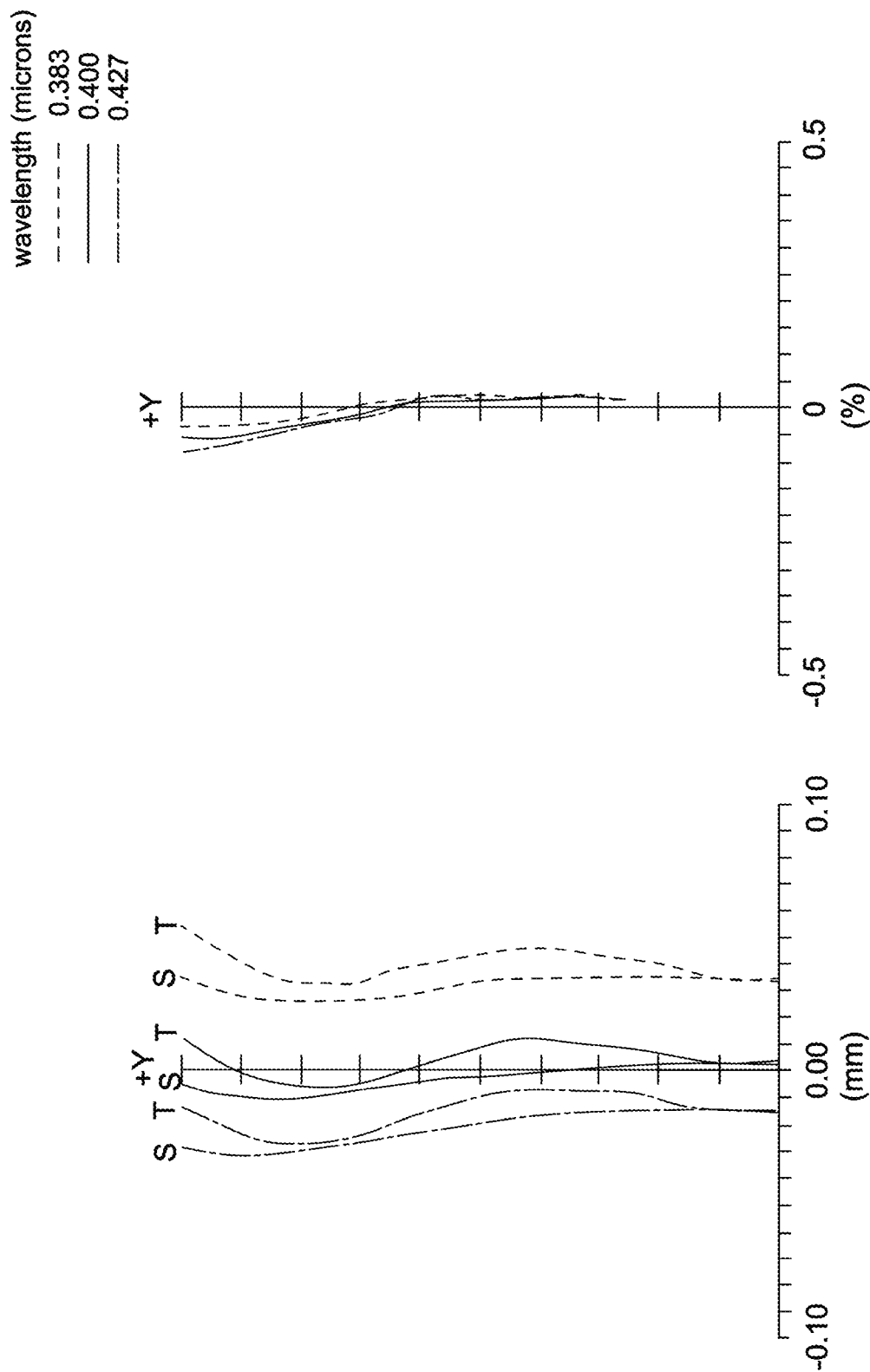

FIGS. 2, 3A and 3B show optical simulation results of the optical lens system shown in FIG. 1. FIG. 2 illustrates modulation transfer function (MTF) curves, FIG. 3A illustrates astigmatic field curves, and FIG. 3B illustrates percentage distortion curves. As shown in FIGS. 2, 3A and 3B, the MTF at a spatial frequency of 93 lp/mm is larger than 75%, and the optical distortion is smaller than 0.1%.

A second design example of an optical lens system 10b including nine lenses L1-L9 is described in detail below with reference to FIG. 4. The detailed optical data of the second example are shown in Table 4, and the aspheric surface data are shown in Table 5 below.

TABLE 4

Applied to a wavelength of 470 ± 25 nm
Effective focal length of the optical lens system F = 20.9737 mm
Effective focal length of the first lens group F1 = 76.3023 mm
Effective focal length of the second lens group F2 = 32.7664 mm

| Surface | radius (mm) | thickness (mm) | refractive index | Abbe number | Refractive power | Shape |
|---|---|---|---|---|---|---|
| S1 | 625.052 | 3.86 | 1.55 | 45.80 | L1 (−) | convex |
| S2 | 17.747 | 20.17 | | | | concave |
| S3 | 37.706 | 6.02 | 1.74 | 52.60 | L2 (+) | convex |
| S4 | −106.136 | 4.93 | | | | convex |
| S5 | 69.182 | 2.32 | 1.74 | 52.60 | L3 (+) | convex |
| S6 | −97.034 | 0.13 | | | | convex |
| S7 (stop) | INF | 3.30 | | | | |
| S8 | 31.437 | 2.12 | 1.50 | 81.60 | L4 (+) | convex |
| S9 | 105.976 | 0.67 | | | | concave |
| S10 | 24.471 | 4.14 | 1.50 | 81.60 | L5 (+) | convex |
| S11 | −30.954 | 0.80 | 1.63 | 35.70 | L6 (−) | concave |
| S12 | 15.305 | 5.37 | | | | concave |
| S13 | −10.997 | 0.80 | 1.63 | 35.70 | L7 (−) | concave |
| S14 | 77.039 | 1.12 | | | | concave |
| S15 | −30.153 | 5.10 | 1.74 | 52.60 | L8 (+) | concave |
| S16 | −14.755 | 0.10 | | | | convex |
| S17 | 24.988 | 6.95 | 1.50 | 81.50 | L9 (−) | convex |
| S18 | −20.407 | 6.68 | | | | convex |
| S19 | INF | 12.00 | 1.52 | 64.20 | | |
| S20 | INF | 2.00 | | | | |
| S21 | INF | 1.10 | 1.52 | 64.20 | | |

TABLE 5

| Lens surface | S17 | S18 |
|---|---|---|
| K | 1.71870 | −3.21861 |
| A | −3.25263E−05 | −2.71939E−05 |
| B | −1.35733E−08 | −2.25391E−08 |
| C | −5.89587E−09 | −1.52209E−09 |
| D | 2.66412E−10 | 1.40539E−10 |
| E | −4.58516E−12 | −2.71012E−12 |
| F | 3.78333E−14 | 2.40216E−14 |
| G | −1.18483E−16 | −7.75110E−17 |

Table 6 lists the internal transmittance of each of the lenses L1-L9 of the optical lens system 10b and the overall transmittance of all of the lenses L1-L9 at different wavelengths. Table 6 clearly shows each of the lenses L1-L9 may have an internal transmittance of larger than 95% at a wavelength of 400 nm or 460 nm.

TABLE 6

| | Internal transmittance | |
|---|---|---|
| | 400 nm | 460 nm |
| Lens L1 | 99.4% | 99.8% |
| Lens L2 | 98.3% | 99.5% |
| Lens L3 | 99.3% | 99.8% |
| Lens L4 | 99.9% | 99.9% |
| Lens L5 | 99.8% | 99.8% |
| Lens L6 | 99.6% | 99.9% |
| Lens L7 | 99.6% | 99.9% |
| Lens L8 | 98.5% | 99.5% |
| Lens L9 | 99.7% | 99.7% |
| Total | 94.1% | 97.9% |

Figure 4:
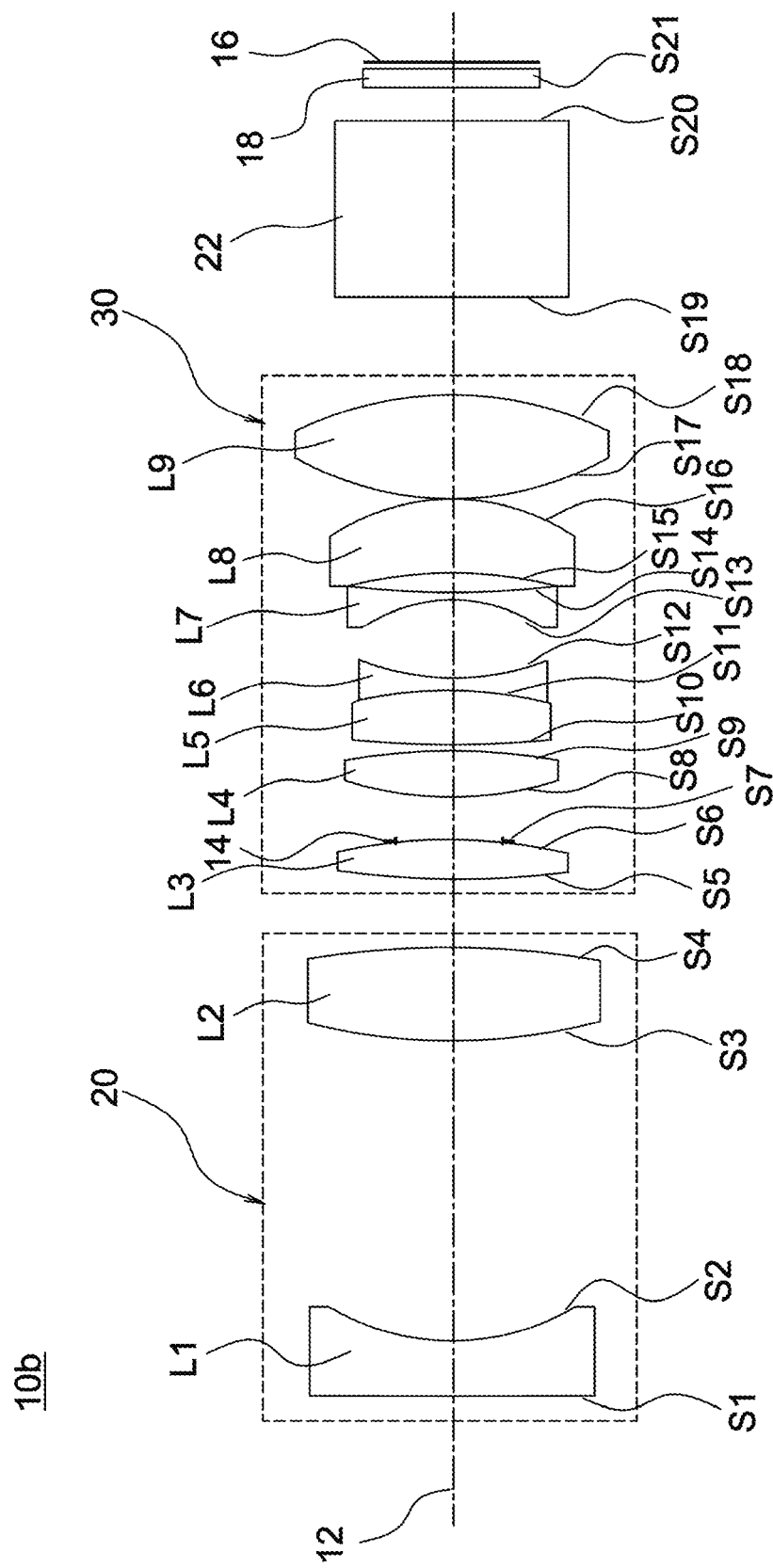
FIG. 4 shows a schematic diagram illustrating an optical lens system according to another embodiment of the invention.
Figure 5:
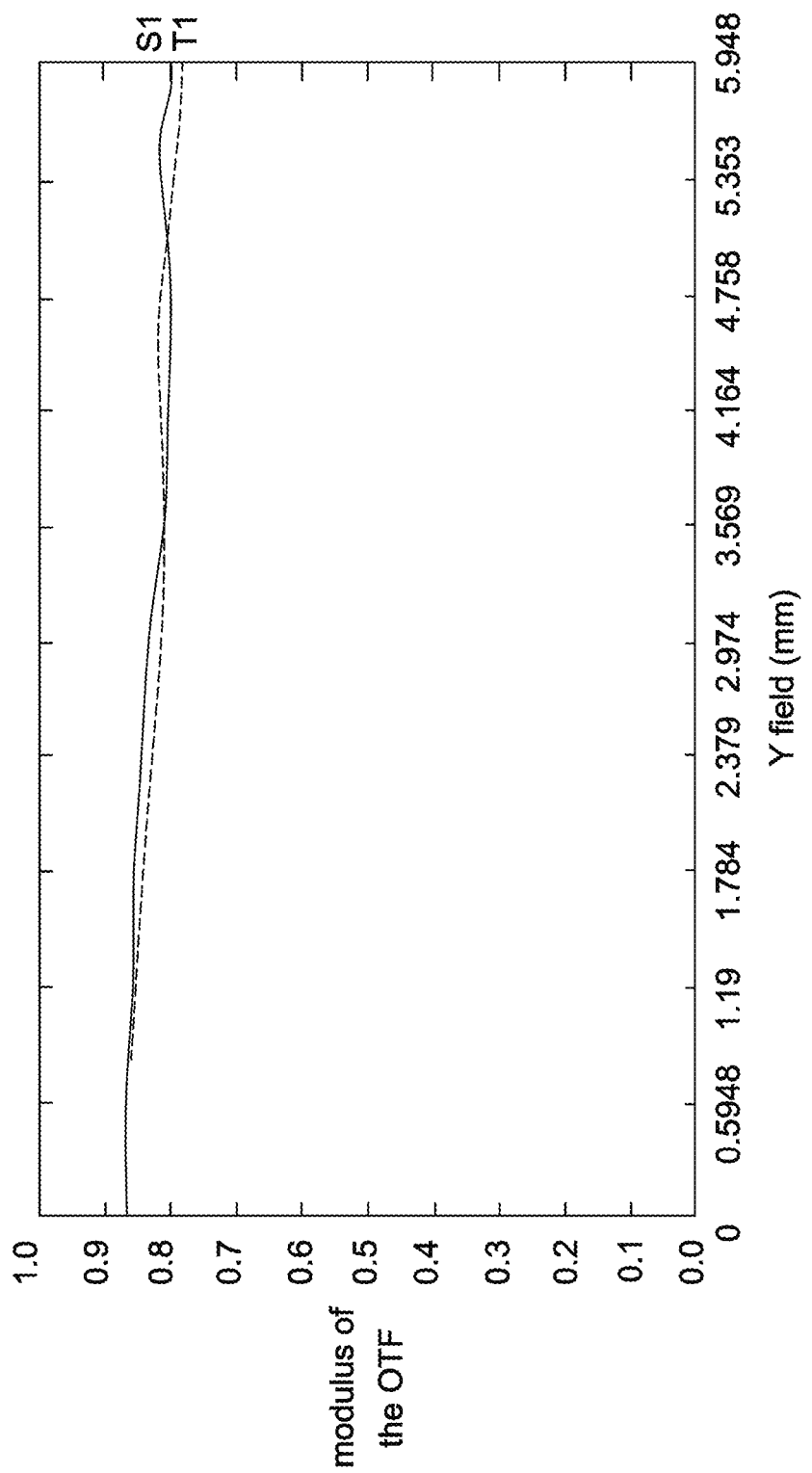
FIGS. 5, 6A and 6B show optical simulation results of the optical lens system shown in FIG. 4.
Figure 6:
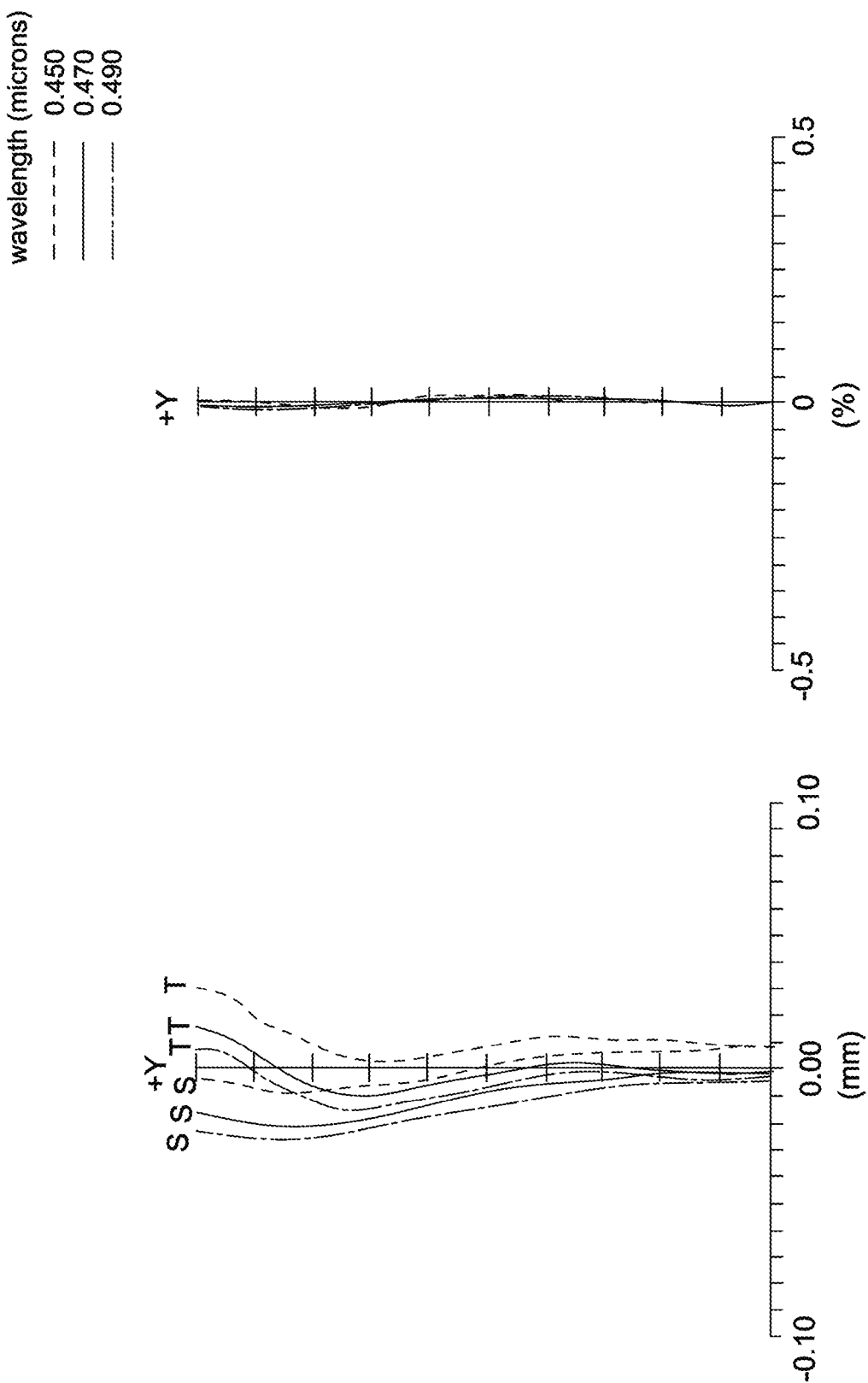

FIGS. 5, 6A and 6B show optical simulation results of the optical lens system shown in FIG. 4. FIG. 5 illustrates modulation transfer function (MTF) curves, FIG. 6A illustrates astigmatic field curves, and FIG. 6B illustrates percentage distortion curves. As shown in FIGS. 5, 6A and 6B, the MTF at a spatial frequency of 93 lp/mm is larger than 75%, and the optical distortion is smaller than 0.1%.

A third design example of an optical lens system 10c including nine lenses L1-L9 is described in detail below with reference to FIG. 7. The detailed optical data of the second example are shown in Table 7, and the aspheric surface data are shown in Table 8 below.

TABLE 7

Applied to a wavelength of 405 ± 25 nm
Effective focal length of the optical lens system F = 21.3556 mm
Effective focal length of the first lens group F1 = 76.9390 mm
Effective focal length of the second lens group F2 = 32.5259 mm

| Surface | radius (mm) | thickness (mm) | refractive index | Abbe number | Refractive power | Shape |
|---|---|---|---|---|---|---|
| S1 | 340.136 | 1.00 | 1.55 | 45.80 | L1 (−) | convex |
| S2 | 17.758 | 20.48 | | | | concave |
| S3 | 38.668 | 3.90 | 1.74 | 52.60 | L2 (+) | convex |
| S4 | −109.511 | 9.32 | | | | convex |
| S5 | 55.037 | 2.37 | 1.74 | 52.60 | L3 (+) | convex |
| S6 | −127.435 | 0.00 | | | | convex |
| S7 (stop) | INF | 0.10 | | | | |
| S8 | 45.900 | 2.04 | 1.50 | 81.60 | L4 (+) | convex |
| S9 | 571.706 | 3.58 | | | | concave |
| S10 | 26.836 | 4.67 | 1.50 | 81.60 | L5 (+) | convex |
| S11 | −24.052 | 0.80 | 1.63 | 35.70 | L6 (−) | concave |
| S12 | 16.821 | 3.97 | | | | concave |
| S13 | −11.516 | 0.80 | 1.63 | 35.70 | L7 (−) | concave |
| S14 | 278.385 | 1.26 | | | | concave |
| S15 | −27.830 | 6.64 | 1.74 | 52.60 | L8 (+) | concave |
| S16 | −15.936 | 0.10 | | | | convex |
| S17 | 23.947 | 5.84 | 1.50 | 81.60 | L9 (+) | convex |
| S18 | −24.778 | 6.06 | | | | convex |
| S19 | INF | 12.00 | 1.52 | 64.20 | | |
| S20 | INF | 2.00 | | | | |
| S21 | INF | 1.10 | 1.52 | 64.20 | | |

TABLE 8

| Radius | S17 | S18 |
|---|---|---|
| K | 0.62489 | −4.35368 |
| A | −3.28231E−05 | −2.29932E−05 |
| B | −2.68419E−08 | −1.16262E−07 |
| C | −7.57941E−09 | −2.73603E−09 |
| D | 2.60161E−10 | 1.55837E−10 |
| E | −4.36140E−12 | −2.95646E−12 |
| F | 3.44500E−14 | 2.40146E−14 |
| G | −1.09708E−16 | −7.68070E−17 |

Table 9 lists the internal transmittance of each of the lenses L1-L9 of the optical lens system 10c and the overall transmittance of all of the lenses L1-L9 at different wavelengths. Table 9 clearly shows each of the lenses L1-L9 may have an internal transmittance of larger than 95% at a wavelength of 380 nm or 400 nm.

TABLE 9

| | Internal transmittance | |
|---|---|---|
| | 380 nm | 400 nm |
| Lens L1 | 99.4% | 99.8% |
| Lens L2 | 97.5% | 98.9% |
| Lens L3 | 98.5% | 99.3% |
| Lens L4 | 99.9% | 99.9% |
| Lens L5 | 99.7% | 99.8% |
| Lens L6 | 98.1% | 99.6% |
| Lens L7 | 98.1% | 99.6% |
| Lens L8 | 95.7% | 98.1% |
| Lens L9 | 99.6% | 99.7% |
| Total | 87.2% | 94.7% |

Figure 7:
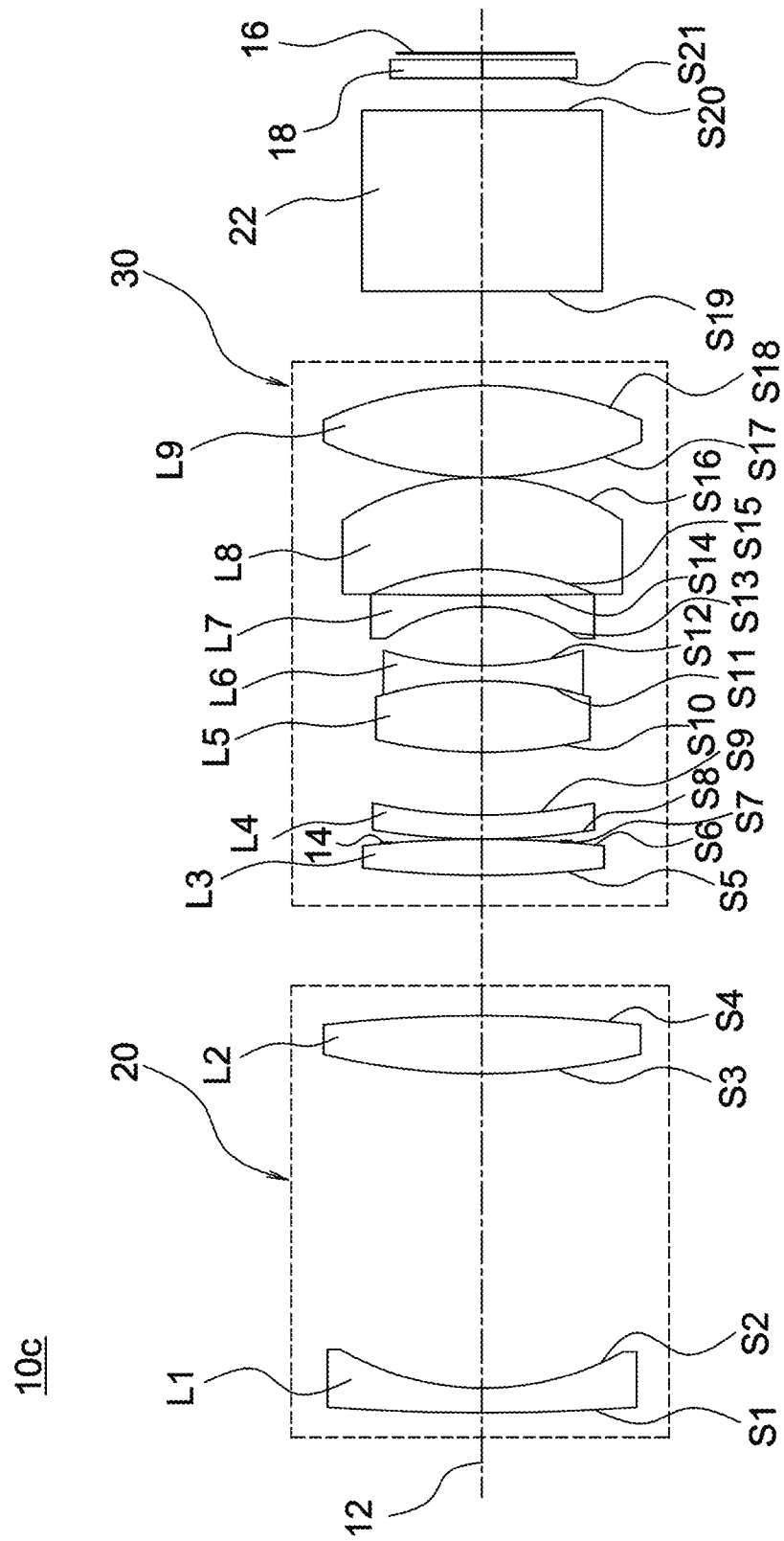
FIG. 7 shows a schematic diagram illustrating an optical lens system according to another embodiment of the invention.
Figure 8:
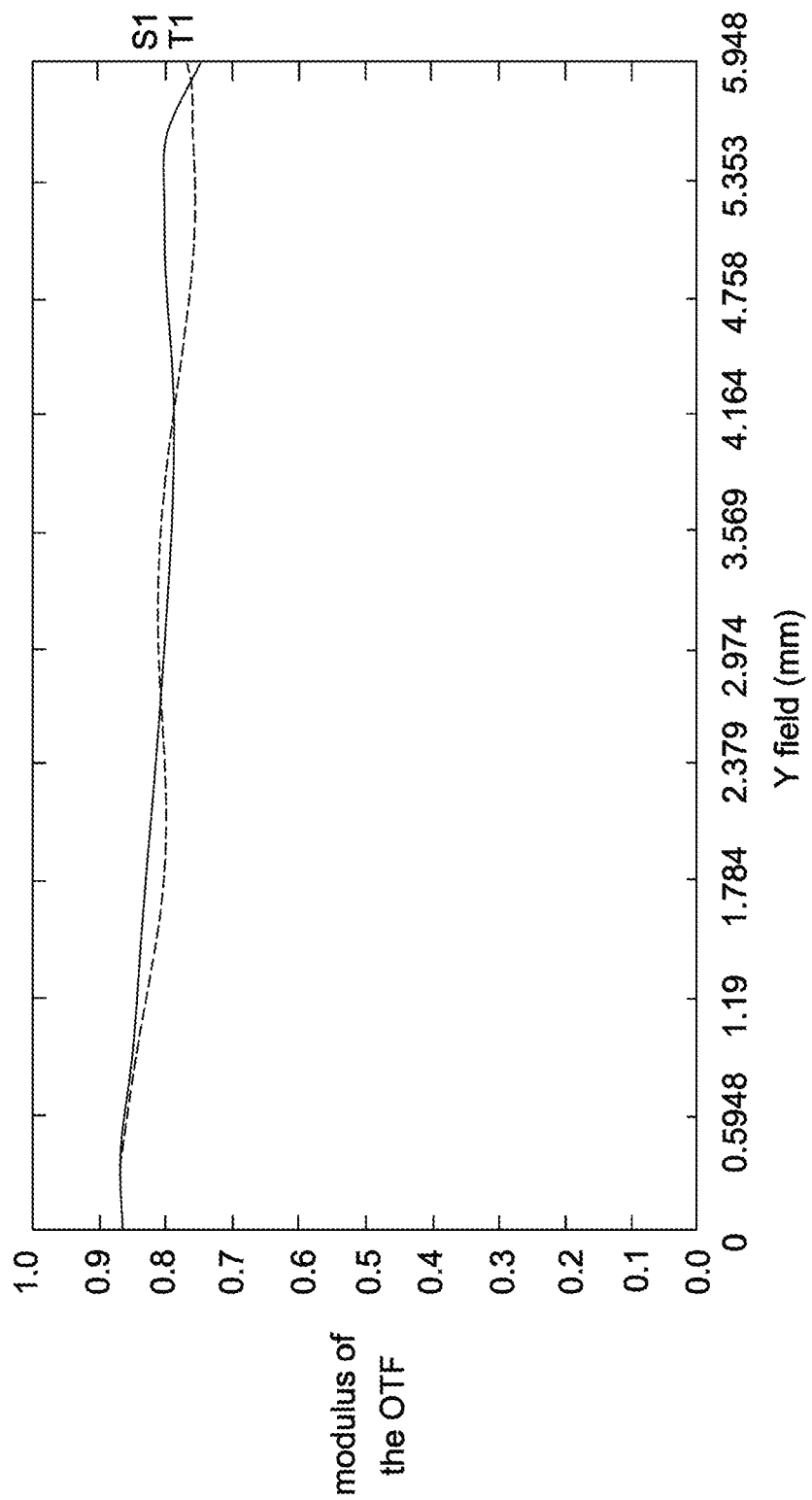
FIGS. 8, 9A and 9B show optical simulation results of the optical lens system shown in FIG. 7.
Figure 9:
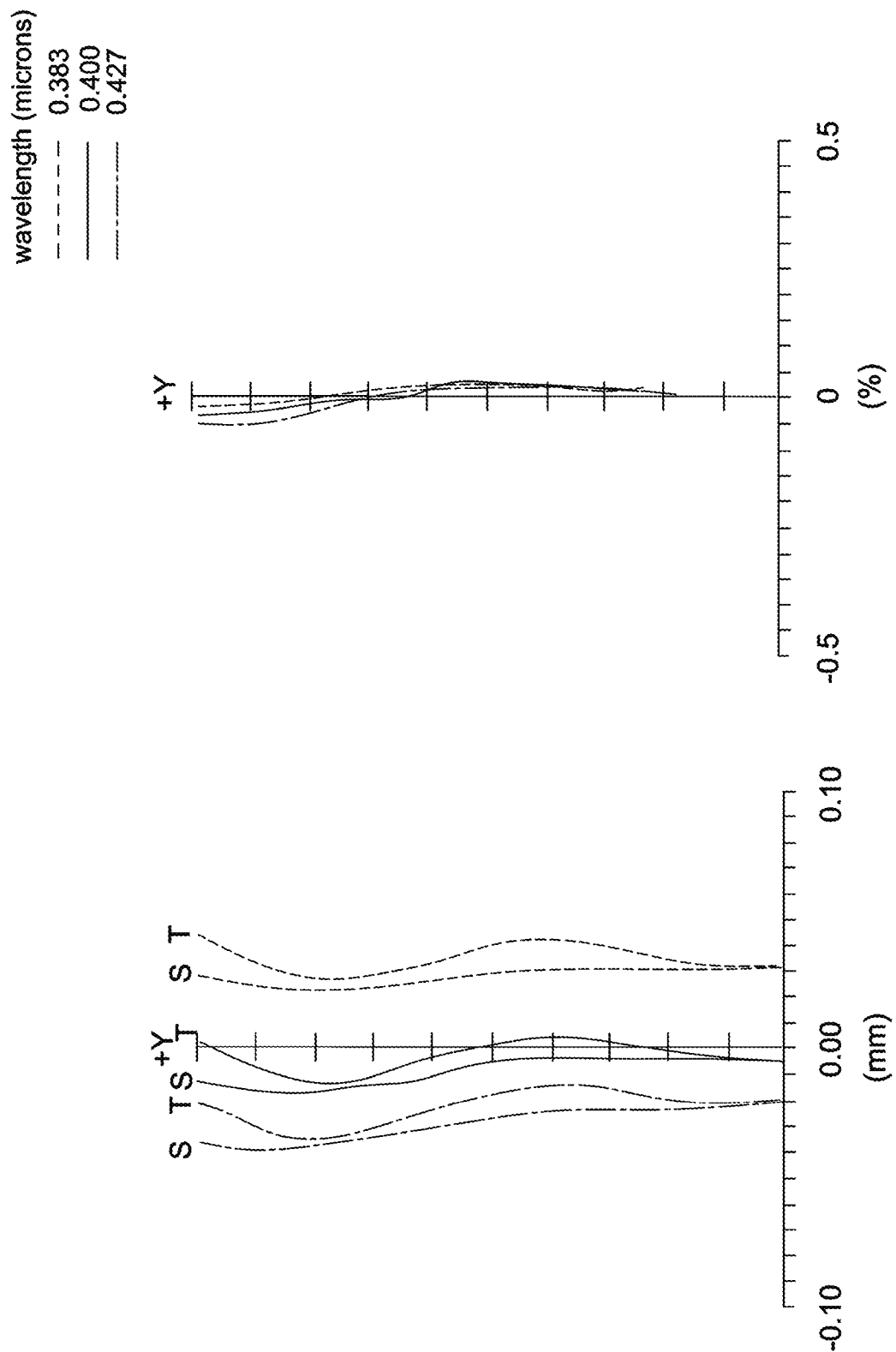

FIGS. 8, 9A and 9B show optical simulation results of the optical lens system shown in FIG. 7. FIG. 8 illustrates modulation transfer function (MTF) curves, FIG. 9A illustrates astigmatic field curves, and FIG. 9B illustrates percentage distortion curves. As shown in FIGS. 8, 9A and 9B, the MTF at a spatial frequency of 93 lp/mm is larger than 75%, and the optical distortion is smaller than 0.1%.

A fourth design example of the optical lens system 10d including eight lenses L1-L8 is described in detail below with reference to FIG. 10. The detailed optical data of the first example are shown in Table 10, and the aspheric surface data are shown in Table 11 below.

TABLE 10

Applied to a wavelength of 405 ± 25 nm
Effective focal length of the optical lens system F = 18.0912 mm
Effective focal length of the first lens group F1 = 56.5119 mm
Effective focal length of the second lens group F2 = 27.1366 mm

| Surface | radius (mm) | thickness (mm) | refractive index | Abbe number | Refractive power | Shape |
|---|---|---|---|---|---|---|
| S1 | −145.942 | 1.18 | 1.49 | 70.20 | L1(−) | concave |
| S2 | 19.502 | 3.53 | | | | concave |
| S3 | −37.008 | 7.44 | 1.75 | 52.30 | L2(+) | concave |
| S4 | −26.602 | 19.07 | | | | convex |
| S5 | 20.939 | 2.95 | 1.50 | 81.50 | L3(+) | convex |
| S6(stop) | 109.747 | 6.02 | | | | concave |
| S7 | 31.202 | 3.30 | 1.70 | 55.50 | L4(+) | convex |
| S8 | −49.052 | 4.32 | | | | convex |
| S9 | −26.587 | 0.82 | 1.62 | 36.30 | L5(−) | concave |
| S10 | 21.384 | 4.15 | | | | concave |
| S11 | −8.911 | 0.80 | 1.62 | 36.30 | L6(−) | concave |
| S12 | −60.360 | 4.87 | 1.75 | 52.30 | L7(+) | concave |
| S13 | −13.916 | 0.37 | | | | convex |
| S14 | 23.758 | 6.79 | 1.50 | 81.50 | L8(+) | convex |
| S15 | −20.132 | 8.77 | | | | convex |
| S16 | INF | 12.00 | 1.52 | 64.20 | | |
| S17 | INF | 2.00 | | | | |
| S18 | INF | 1.10 | 1.52 | 64.20 | | |

TABLE 11

| Radius | S14 | S15 |
|---|---|---|
| K | 0.00000 | 0.00000 |
| A | −2.82044E−05 | 3.63169E−05 |
| B | 2.45762E−08 | −2.69222E−08 |
| C | −1.00424E−10 | 2.65369E−10 |
| D | −4.13447E−13 | −1.10686E−12 |
| E | 0.00000E+00 | 0.00000E+00 |
| F | 0.00000E+00 | 0.00000E+00 |
| G | 0.00000E+00 | 0.00000E+00 |

Table 12 lists the internal transmittance of each of the lenses L1-L8 of the optical lens system 10d and the overall transmittance of all of the lenses L1-L8 at different wavelengths. Table 12 clearly shows each of the lenses L1-L8 may have an internal transmittance of larger than 95% at a wavelength of 380 nm or 400 nm.

TABLE 12

| | Internal transmittance | |
|---|---|---|
| | 380 nm | 400 nm |
| Lens L1 | 100.0% | 100.0% |
| Lens L2 | 96.7% | 98.5% |

TABLE 12-continued

| | Internal transmittance | |
|---|---|---|
| | 380 nm | 400 nm |
| Lens L3 | 99.8% | 99.9% |
| Lens L4 | 98.6% | 99.4% |
| Lens L5 | 100.0% | 100.0% |
| Lens L6 | 100.0% | 100.0% |
| Lens L7 | 97.9% | 99.0% |
| Lens L8 | 99.6% | 99.7% |
| Total | 92.7% | 96.4% |

Figure 10:
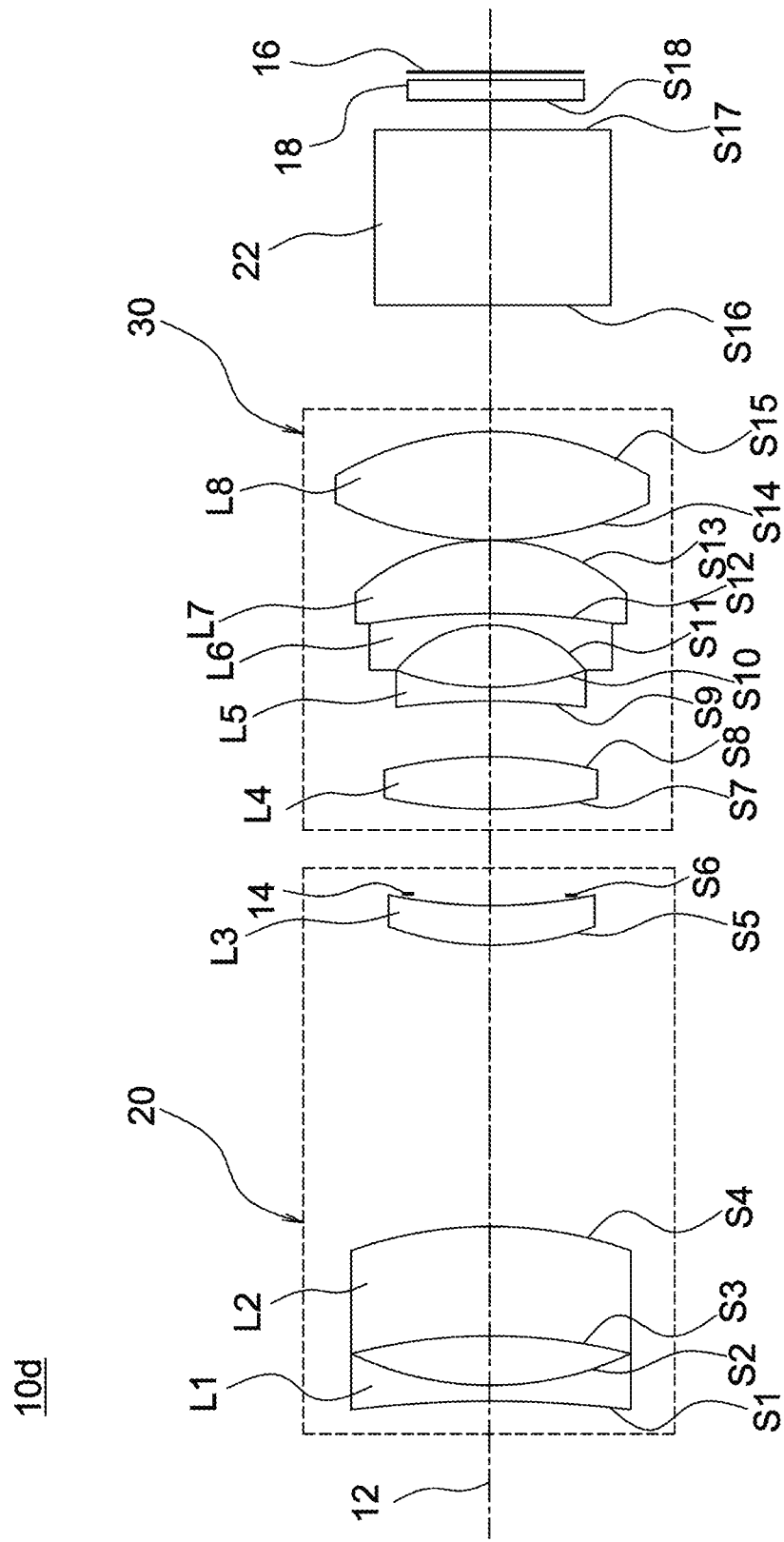
FIG. 10 shows a schematic diagram illustrating an optical lens system according to another embodiment of the invention.
Figure 11:
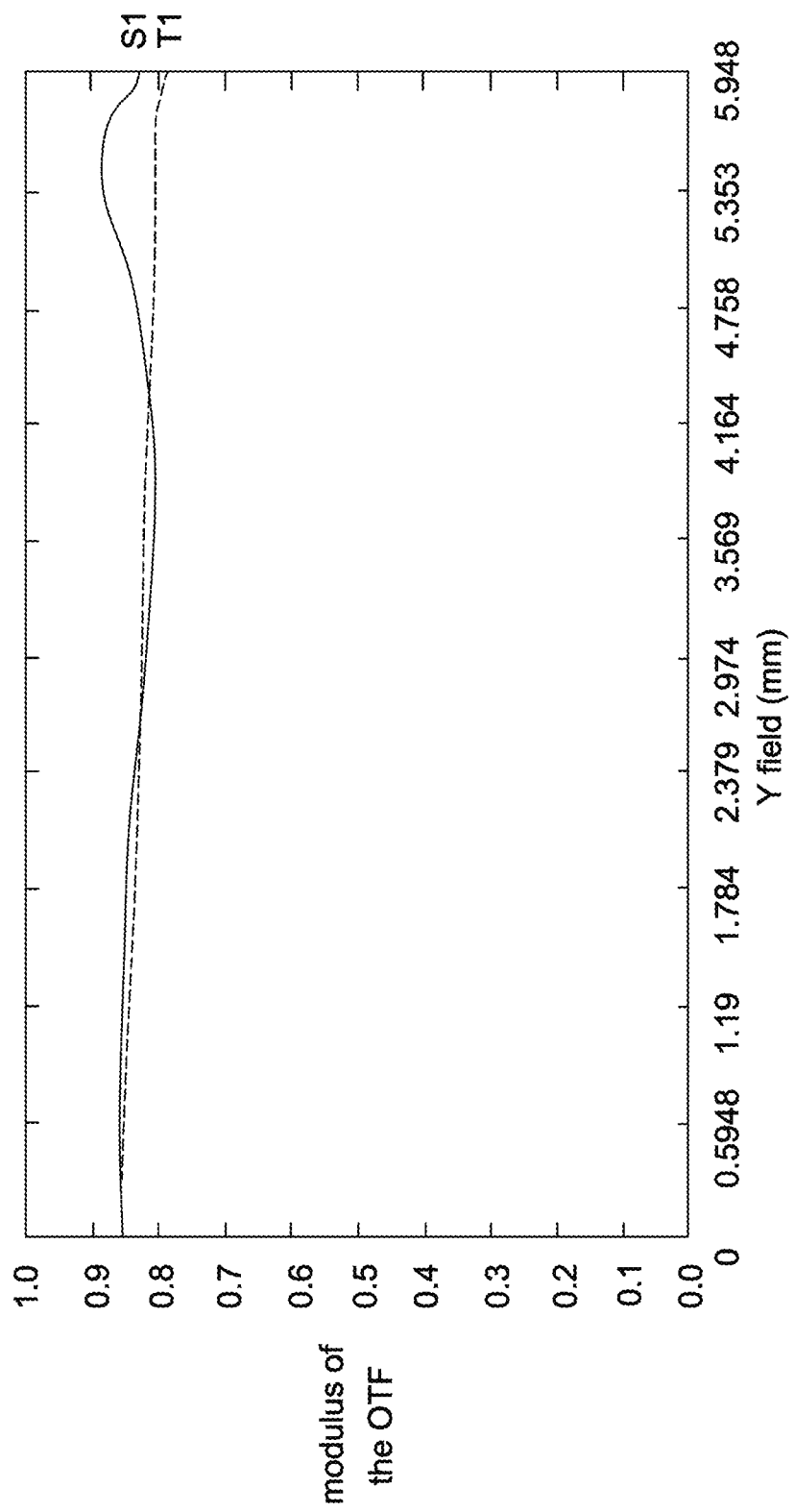
FIGS. 11, 12A and 12B show optical simulation results of the optical lens system shown in FIG. 10.
Figure 12:
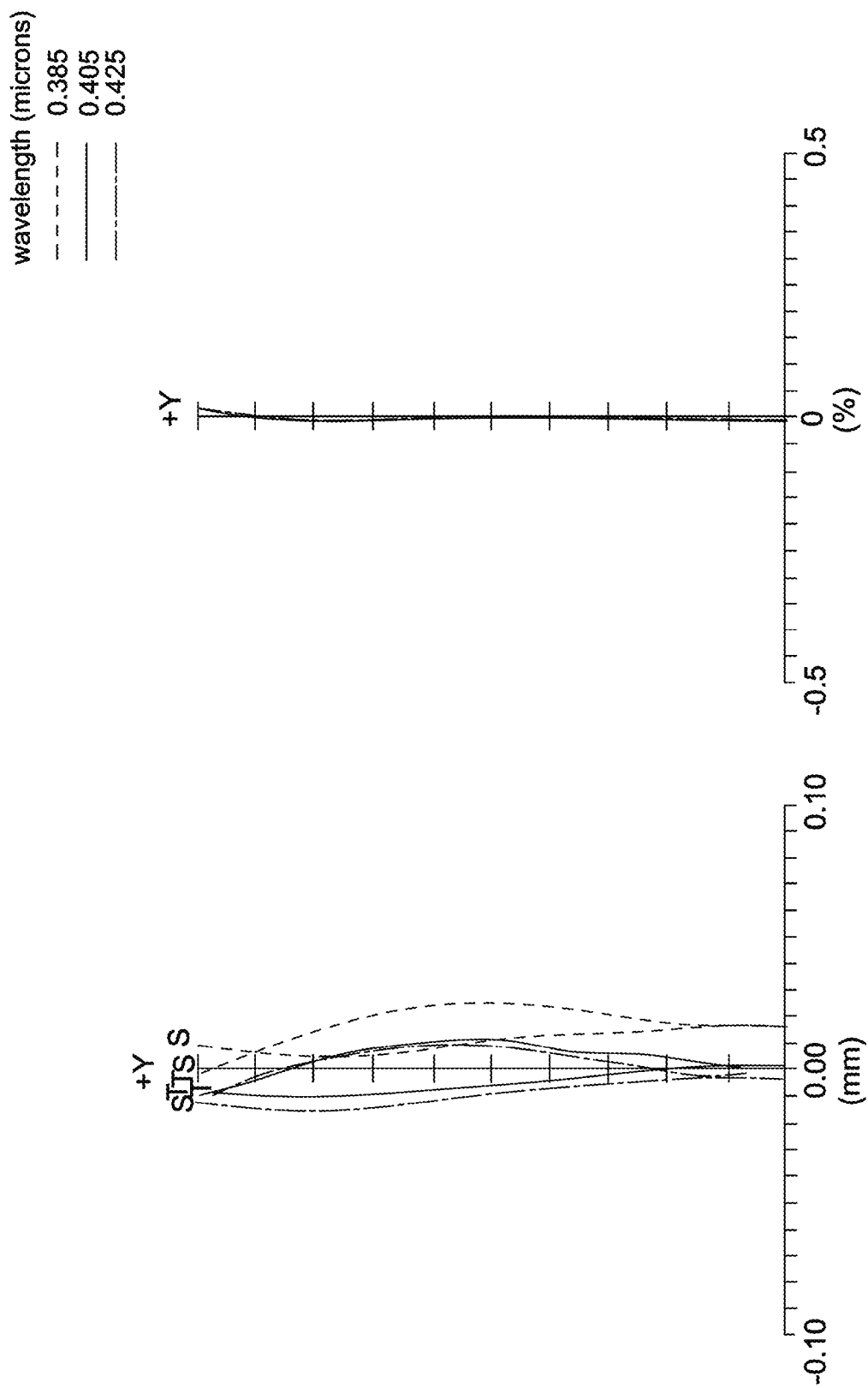

FIGS. 11, 12A and 12B show optical simulation results of the optical lens system shown in FIG. 10. FIG. 11 illustrates modulation transfer function (MTF) curves, FIG. 12A illustrates astigmatic field curves, and FIG. 12B illustrates percentage distortion curves. As shown in FIGS. 11, 12A and 12B, the MTF at a spatial frequency of 93 lp/mm is larger than 75%, and the optical distortion is smaller than 0.1%.

A fifth design example of the optical lens system 10e including eight lenses L1-L8 is described in detail below with reference to FIG. 13. The detailed optical data of the first example are shown in Table 13, and the aspheric surface data are shown in Table 14 below.

TABLE 13

Applied to a wavelength of 405 ± 25 nm
Effective focal length of the optical lens system F = 19.3228 mm
Effective focal length of the first lens group F1 = 62.4585 mm
Effective focal length of the second lens group F2 = 28.2227 mm

| Surface | radius (mm) | thickness (mm) | refractive index | Abbe number | Refractive power | Shape |
|---|---|---|---|---|---|---|
| S1 | 15.363 | 6.97 | 1.75 | 52.30 | L1 (−) | convex |
| S2 | 11.416 | 3.41 | | | | concave |
| S3 | 53.065 | 0.80 | 1.52 | 52.40 | L2 (−) | convex |
| S4 | 12.298 | 20.49 | | | | concave |
| S5 | 30.869 | 3.45 | 1.50 | 81.50 | L3 (+) | convex |
| S6 (stop) | −31.948 | 5.97 | | | | convex |
| S7 | 32.293 | 3.22 | 1.73 | 54.70 | L4 (+) | convex |
| S8 | −72.809 | 4.17 | | | | convex |

TABLE 13-continued

Applied to a wavelength of 405 ± 25 nm
Effective focal length of the optical lens system F = 19.3228 mm
Effective focal length of the first lens group F1 = 62.4585 mm
Effective focal length of the second lens group F2 = 28.2227 mm

| Surface | radius (mm) | thickness (mm) | refractive index | Abbe number | Refractive power | Shape |
|---|---|---|---|---|---|---|
| S9  | −70.595  | 2.67  | 1.62 | 36.30 | L5 (−) | concave |
| S10 | 24.698   | 3.67  |      |       |        | concave |
| S11 | −10.076  | 0.80  | 1.62 | 36.30 | L6 (−) | concave |
| S12 | −177.804 | 5.57  | 1.60 | 65.40 | L7 (+) | concave |
| S13 | −15.034  | 0.10  |      |       |        | convex |
| S14 | 23.258   | 6.30  | 1.50 | 81.50 | L8 (+) | convex |
| S15 | −21.427  | 6.80  |      |       |        | convex |
| S16 | INF      | 12.00 | 1.52 | 64.20 |        |        |
| S17 | INF      | 2.00  |      |       |        |        |
| S18 | INF      | 1.10  | 1.52 | 64.20 |        |        |

TABLE 14

| Lens surface | S14 | S15 |
|---|---|---|
| K | 0.00000 | 0.00000 |
| A | −3.49685E−05 | 3.34199E−05 |
| B | 4.51970E−08 | −5.43131E−08 |
| C | −5.95685E−11 | 1.05172E−09 |
| D | 1.48961E−12 | −3.29336E−12 |
| E | −1.37864E−14 | −2.98752E−14 |
| F | −1.03443E−16 | −2.25178E−16 |
| G | 4.38657E−18 | 6.95888E−18 |

Table 15 lists the internal transmittance of each of the lenses L1-L8 of the optical lens system 10e and the overall transmittance of all of the lenses L1-L8 at different wavelengths. Table 15 clearly shows each of the lenses L1-L8 may have a light transmittance of larger than 95% at a wavelength of 380 nm or 400 nm.

TABLE 15

|  | Internal transmittance | |
|---|---|---|
|  | 380 nm | 400 nm |
| Lens L1 | 96.9% | 98.6% |
| Lens L2 | 99.7% | 99.9% |
| Lens L3 | 99.8% | 99.8% |
| Lens L4 | 98.9% | 99.5% |
| Lens L5 | 99.9% | 99.9% |
| Lens L6 | 100.0% | 100.0% |
| Lens L7 | 96.4% | 98.7% |
| Lens L8 | 99.6% | 99.7% |
| Total | 91.4% | 96.2% |

Figure 13:
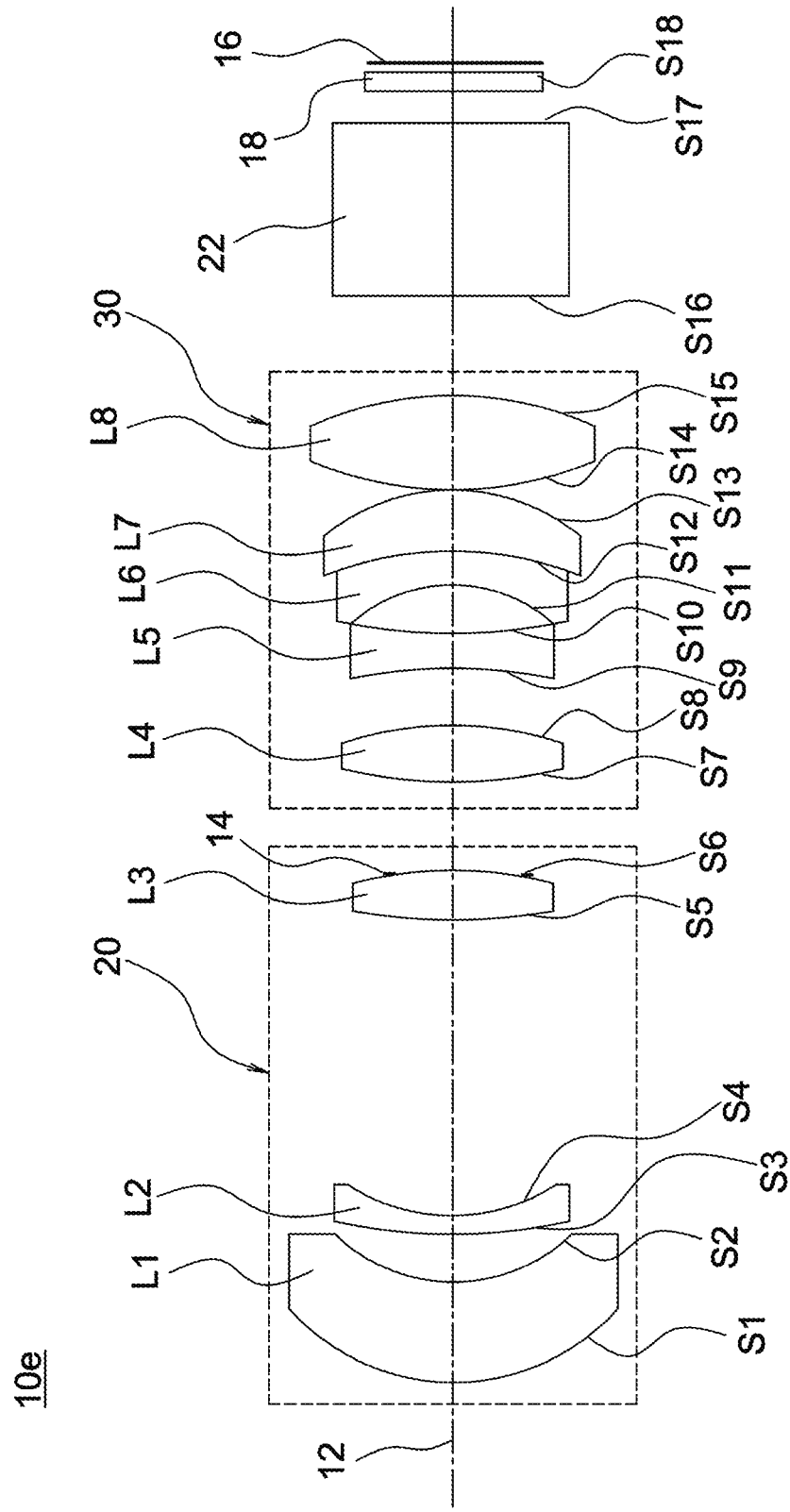
FIG. 13 shows a schematic diagram illustrating an optical lens system according to another embodiment of the invention.
Figure 14:
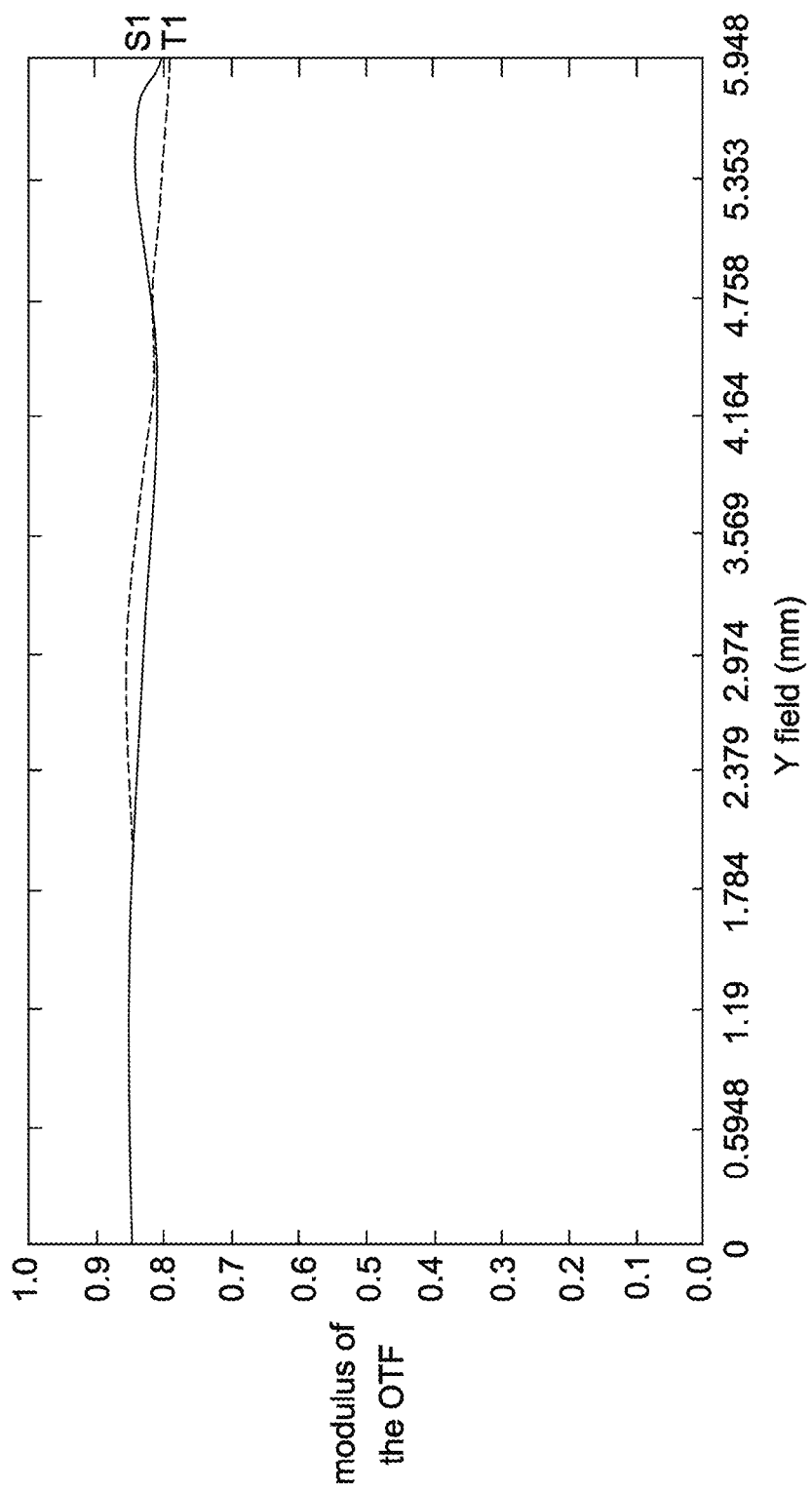
FIGS. 14, 15A and 15B show optical simulation results of the optical lens system shown in FIG. 13.
Figure 15:
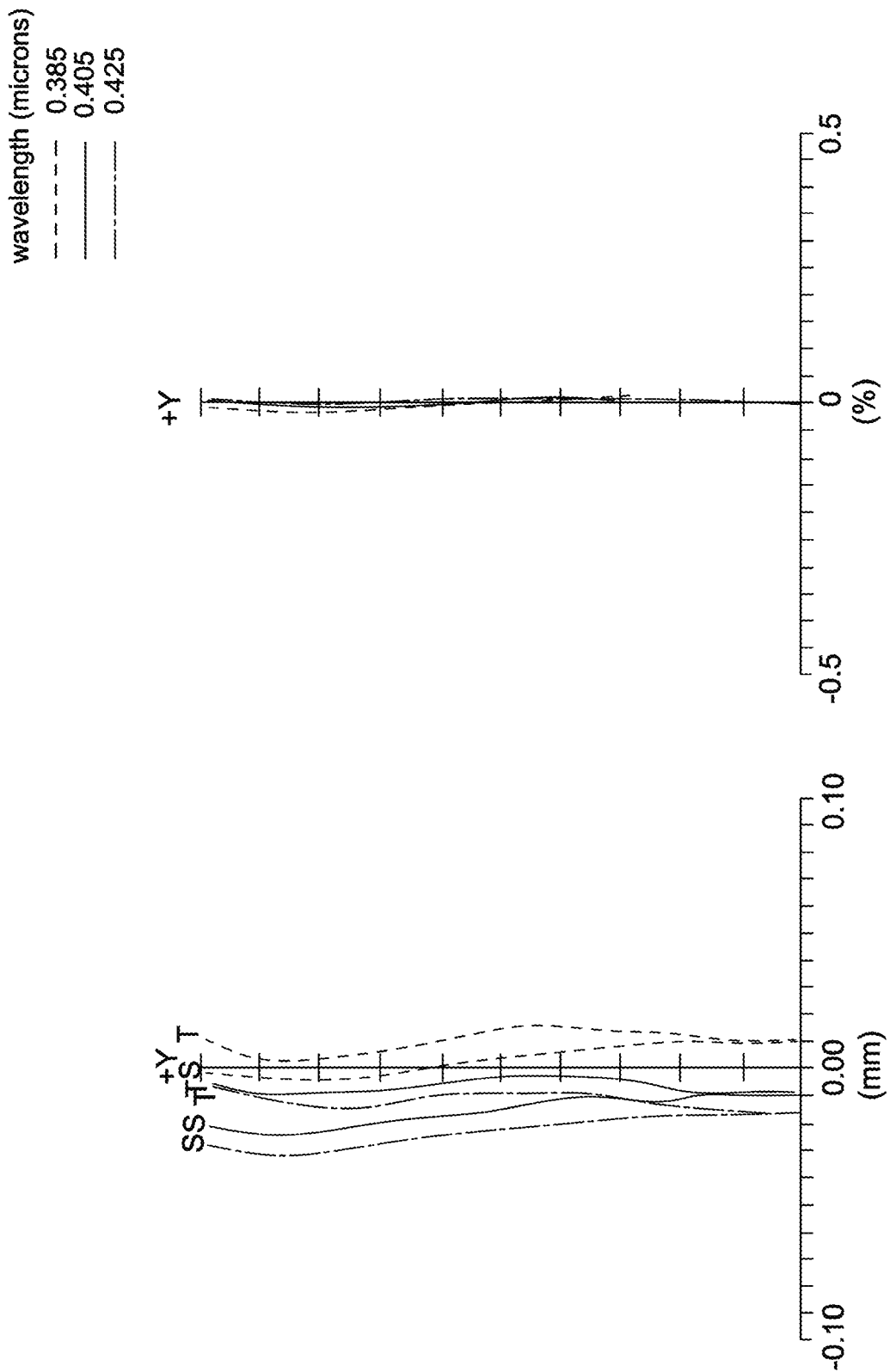

FIGS. 14, 15A and 15B show optical simulation results of the optical lens system shown in FIG. 13. FIG. 14 illustrates modulation transfer function (MTF) curves, FIG. 15A illustrates astigmatic field curves, and FIG. 15B illustrates percentage distortion curves. As shown in FIGS. 14, 15A and 15B, the MTF at a spatial frequency of 93 lp/mm is larger than 75%, and the optical distortion is smaller than 0.1%.

A sixth design example of the optical lens system 10f including eight lenses L1-L8 is described in detail below with reference to FIG. 16. The detailed optical data of the first example are shown in Table 16, and the aspheric surface data are shown in Table 17 below.

TABLE 16

Applied to a wavelength of 405 ± 25 nm
Effective focal length of the optical lens system F = 18.5414 mm
Effective focal length of the first lens group F1 = 59.4447 mm
Effective focal length of the second lens group F2 = 26.6449 mm

| Surface | radius (mm) | thickness (mm) | refractive index | Abbe number | Refractive power | Shape |
|---|---|---|---|---|---|---|
| S1 | 16.076 | 7.99 | 1.75 | 52.30 | L1 (−) | convex |
| S2 | 11.724 | 3.78 |      |       |        | concave |
| S3 | 48.277 | 0.78 | 1.52 | 52.40 | L2 (−) | convex |
| S4 | 11.887 | 21.39 |     |       |        | concave |
| S5 | 30.679 | 3.39 | 1.50 | 81.50 | L3 (+) | convex |
| S6 (stop) | −31.664 | 6.21 |  |       |        | convex |
| S7 | 31.206 | 3.22 | 1.73 | 54.70 | L4 (+) | convex |
| S8 | −70.338 | 4.38 |     |       |        | convex |
| S9 | −50.911 | 0.79 | 1.62 | 36.30 | L5 (−) | concave |
| S10 | 24.825 | 4.10 |      |       |        | concave |
| S11 | −9.722 | 0.85 | 1.62 | 36.30 | L6 (−) | concave |
| S12 | −64.849 | 4.85 | 1.60 | 65.40 | L7 (+) | concave |
| S13 | −13.881 | 0.17 |     |       |        | convex |
| S14 | 22.656 | 6.49 | 1.50 | 81.50 | L8 (+) | convex |
| S15 | −20.065 | 6.28 |     |       |        | convex |

TABLE 16-continued

Applied to a wavelength of 405 ± 25 nm
Effective focal length of the optical lens system F = 18.5414 mm
Effective focal length of the first lens group F1 = 59.4447 mm
Effective focal length of the second lens group F2 = 26.6449 mm

| Surface | radius (mm) | thickness (mm) | refractive index | Abbe number | Refractive power | Shape |
|---|---|---|---|---|---|---|
| S16 | INF | 12.00 | 1.52 | 64.20 | | |
| S17 | INF | 2.00 | | | | |
| S18 | INF | 1.10 | 1.52 | 64.20 | | |

TABLE 17

| Lens surface | S14 | S15 |
|---|---|---|
| K | 0.00000 | 0.00000 |
| A | −4.18757E−05 | 3.39217E−05 |
| B | 4.06563E−08 | −3.45270E−08 |
| C | −6.60500E−10 | −1.95656E−10 |
| D | −5.67731E−13 | −1.51058E−12 |
| E | 0.00000E+00 | 0.00000E+00 |
| F | 0.00000E+00 | 0.00000E+00 |
| G | 0.00000E+00 | 0.00000E+00 |

Table 18 lists the internal transmittance of each of the lenses L1-L8 of the optical lens system 10f and the overall transmittance of all of the lenses L1-L8 at different wavelengths. Table 18 clearly shows each of the lenses L1-L8 may have an internal transmittance of larger than 95% at a wavelength of 380 nm or 400 nm.

TABLE 18

| | Internal transmittance | |
|---|---|---|
| | 380 nm | 400 nm |
| Lens L1 | 96.5% | 98.4% |
| Lens L2 | 99.7% | 99.9% |
| Lens L3 | 99.8% | 99.8% |
| Lens L4 | 98.9% | 99.5% |
| Lens L5 | 100.0% | 100.0% |
| Lens L6 | 100.0% | 100.0% |
| Lens L7 | 96.9% | 98.9% |
| Lens L8 | 99.6% | 99.7% |
| Total | 91.5% | 96.2% |

Figure 16:
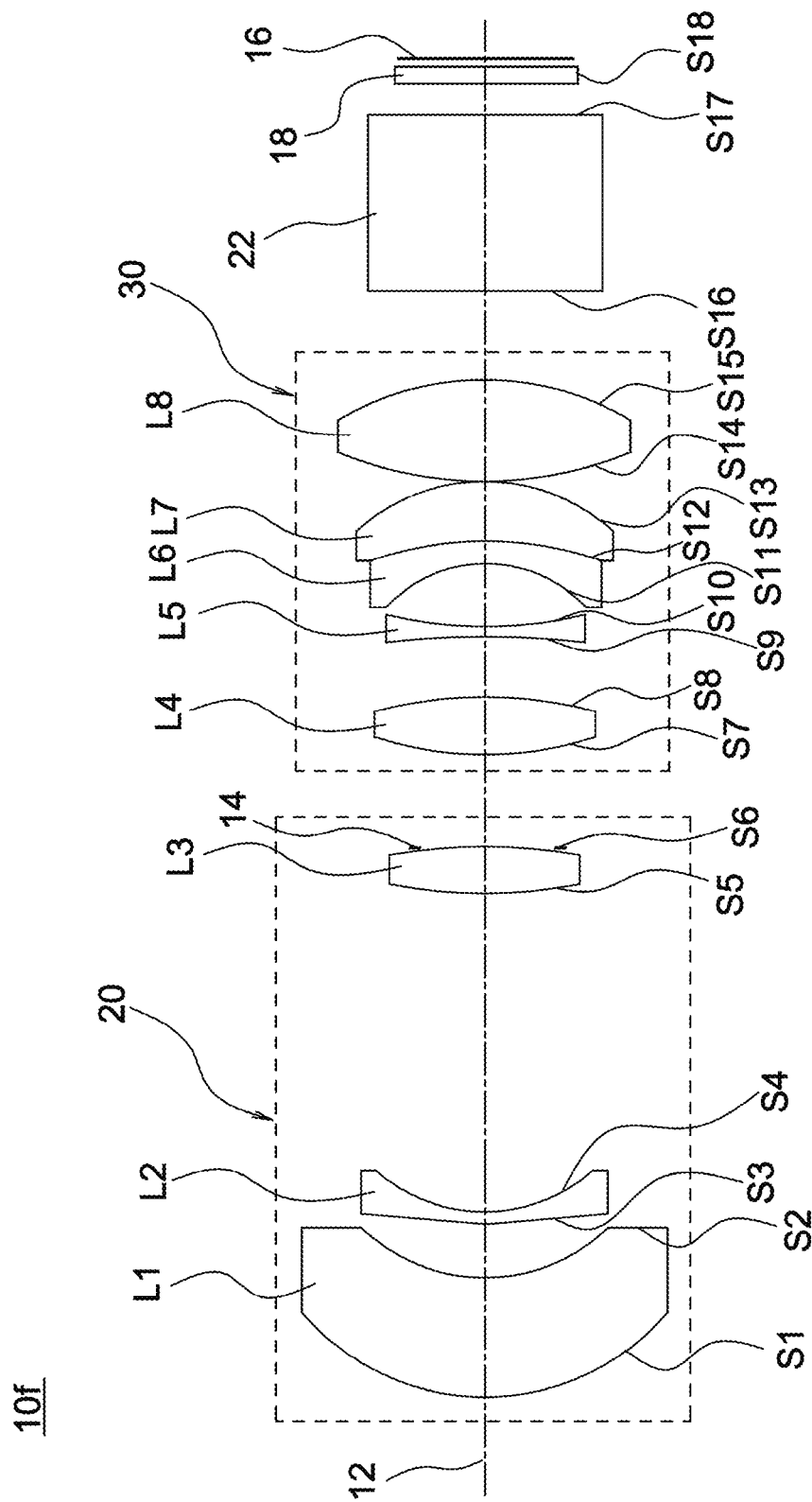
FIG. 16 shows a schematic diagram illustrating an optical lens system according to another embodiment of the invention.
Figure 17:
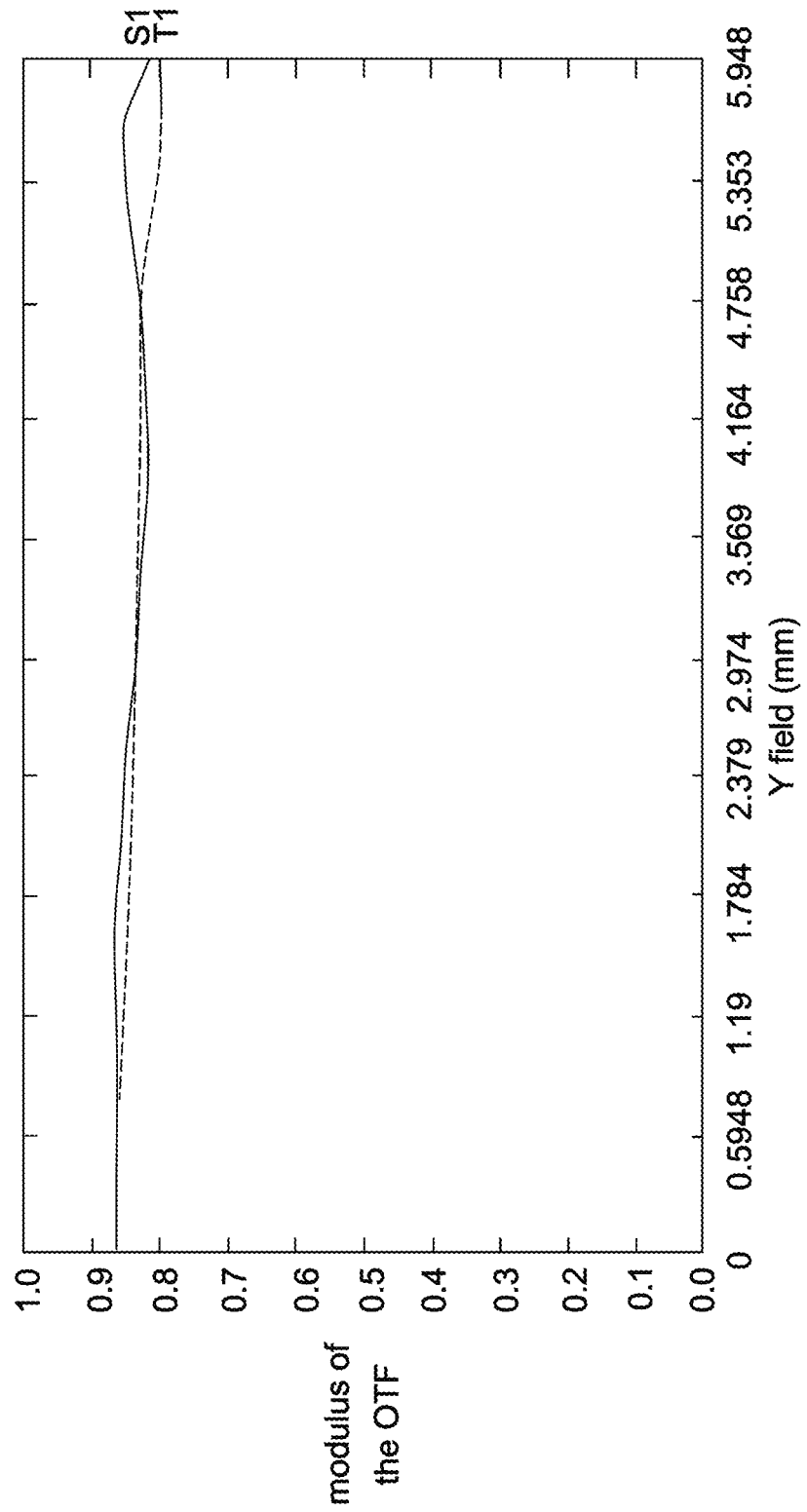
FIGS. 17, 18A and 18B show optical simulation results of the optical lens system shown in FIG. 16.
Figure 18:
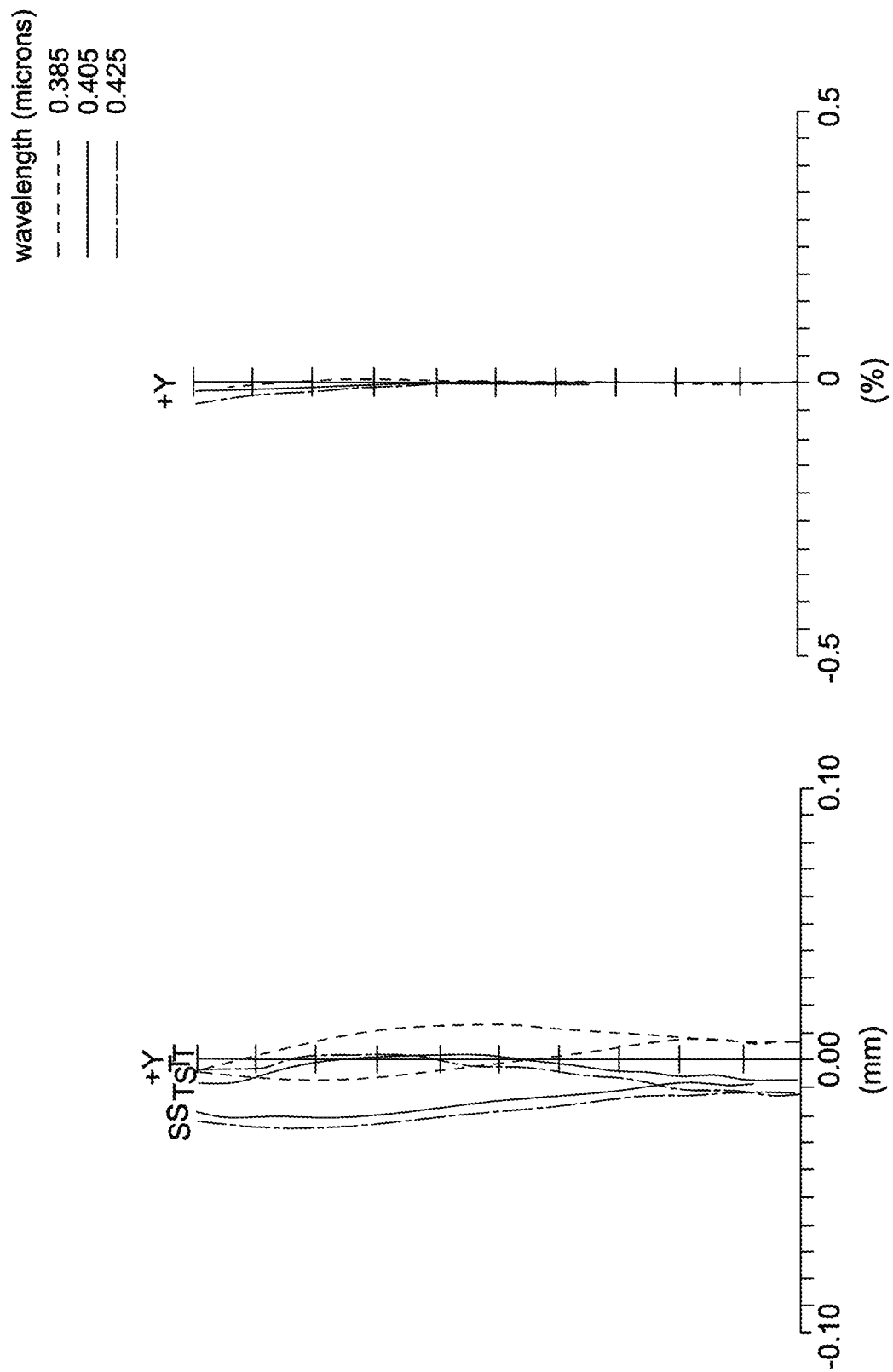

FIGS. 17, 18A and 18B show optical simulation results of the optical lens system shown in FIG. 16. FIG. 17 illustrates modulation transfer function (MTF) curves, FIG. 18A illustrates astigmatic field curves, and FIG. 18B illustrates percentage distortion curves. As shown in FIGS. 17, 18A and 18B, the MTF at a spatial frequency of 93 lp/mm is larger than 75%, and the optical distortion is smaller than 0.1%.

A seventh design example of an optical lens system 10g including nine lenses L1-L9 is described in detail below with reference to FIG. 19. The detailed optical data of the first example are shown in Table 19, and the aspheric surface data are shown in Table 20 below.

TABLE 19

Applied to a wavelength of 355 ± 25 nm
Effective focal length of the optical lens system F = 21.0242 mm
Effective focal length of the first lens group F1 = 75.2275 mm
Effective focal length of the second lens group F2 = 32.2147 mm

| Surface | radius (mm) | thickness (mm) | refractive index | Abbe number | Refractive power | Shape |
|---|---|---|---|---|---|---|
| S1 | 460.660 | 5.38 | 1.53 | 49.00 | L1 (−) | convex |
| S2 | 17.286 | 18.95 | | | | concave |
| S3 | 36.212 | 3.59 | 1.65 | 58.60 | L2 (+) | convex |
| S4 | −74.135 | 6.33 | | | | convex |
| S5 | 135.057 | 2.18 | 1.65 | 58.60 | L3 (+) | convex |
| S6 | −67.501 | 0.00 | | | | convex |
| S7 (stop) | INF | 0.23 | | | | |
| S8 | 32.635 | 4.74 | 1.65 | 58.60 | L4 (+) | convex |
| S9 | 123.497 | 1.09 | | | | concave |
| S10 | 146.754 | 8.28 | 1.50 | 81.60 | L5 (+) | convex |
| S11 | −18.696 | 0.65 | 1.58 | 40.80 | L6 (−) | concave |
| S12 | 16.768 | 4.11 | | | | concave |
| S13 | −9.192 | 0.79 | 1.58 | 40.80 | L7 (−) | concave |
| S14 | 9137.871 | 0.36 | | | | concave |
| S15 | −88.754 | 5.42 | 1.65 | 58.60 | L8 (+) | concave |
| S16 | −13.303 | 0.10 | | | | convex |
| S17 | 24.462 | 5.98 | 1.50 | 81.60 | L9 (+) | convex |
| S18 | −24.232 | 6.25 | | | | convex |
| S19 | INF | 12.00 | 1.52 | 64.20 | | |
| S20 | INF | 2.00 | | | | |
| S21 | INF | 1.10 | 1.52 | 64.20 | | |

TABLE 20

| Lens surface | S17 | S18 |
|---|---|---|
| K | 0.97325 | −1.11102 |
| A | −3.01353E−05 | 1.23416E−05 |
| B | −1.11844E−07 | −3.80374E−07 |
| C | −4.26331E−09 | 5.19474E−09 |
| D | 2.14074E−10 | −9.67177E−13 |
| E | −4.55735E−12 | −1.55562E−12 |

TABLE 20-continued

| Lens surface | S17 | S18 |
|---|---|---|
| F | 4.32461E−14 | 2.03571E−14 |
| G | −1.61214E−16 | −8.72940E−17 |

Table 21 lists the internal transmittance of each of the lenses L1-L9 of the optical lens system 10c and the overall transmittance of all of the lenses L1-L9 at different wavelengths. Table 9 clearly shows each of the lenses L1-L9 may have an internal transmittance of larger than 95% at a wavelength of 350 nm or 400 nm.

TABLE 21

| | Internal transmittance | |
|---|---|---|
| | 350 nm | 400 nm |
| Lens L1 | 99.7% | 99.9% |
| Lens L2 | 97.5% | 99.7% |
| Lens L3 | 98.5% | 99.8% |
| Lens L4 | 96.6% | 99.6% |
| Lens L5 | 95.6% | 99.6% |
| Lens L6 | 99.9% | 100.0% |
| Lens L7 | 99.9% | 100.0% |
| Lens L8 | 96.1% | 99.6% |
| Lens L9 | 96.8% | 99.7% |
| Total | 82.0% | 97.9% |

Figure 19:
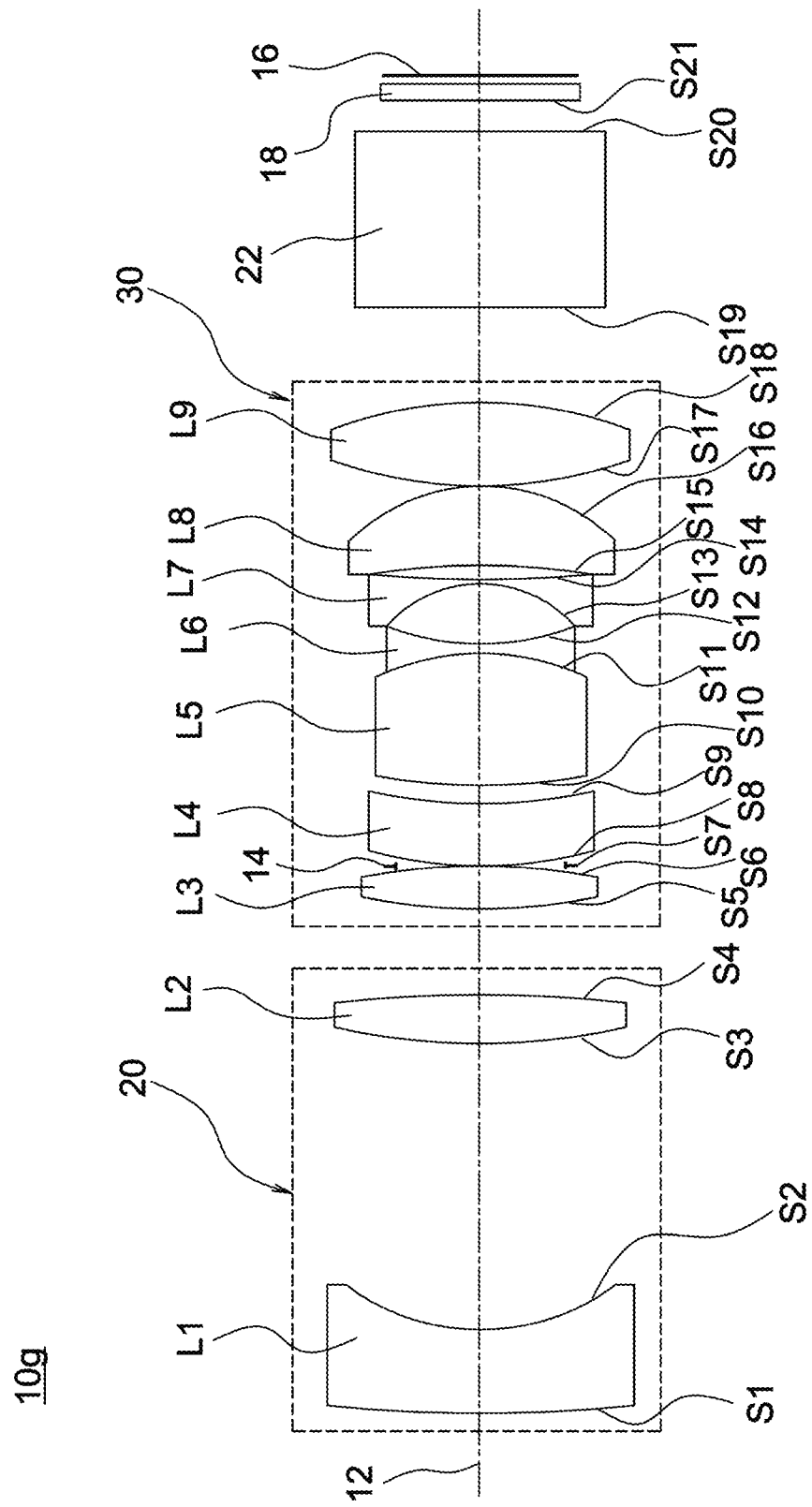
FIG. 19 shows a schematic diagram illustrating an optical lens system according to another embodiment of the invention.
Figure 20:
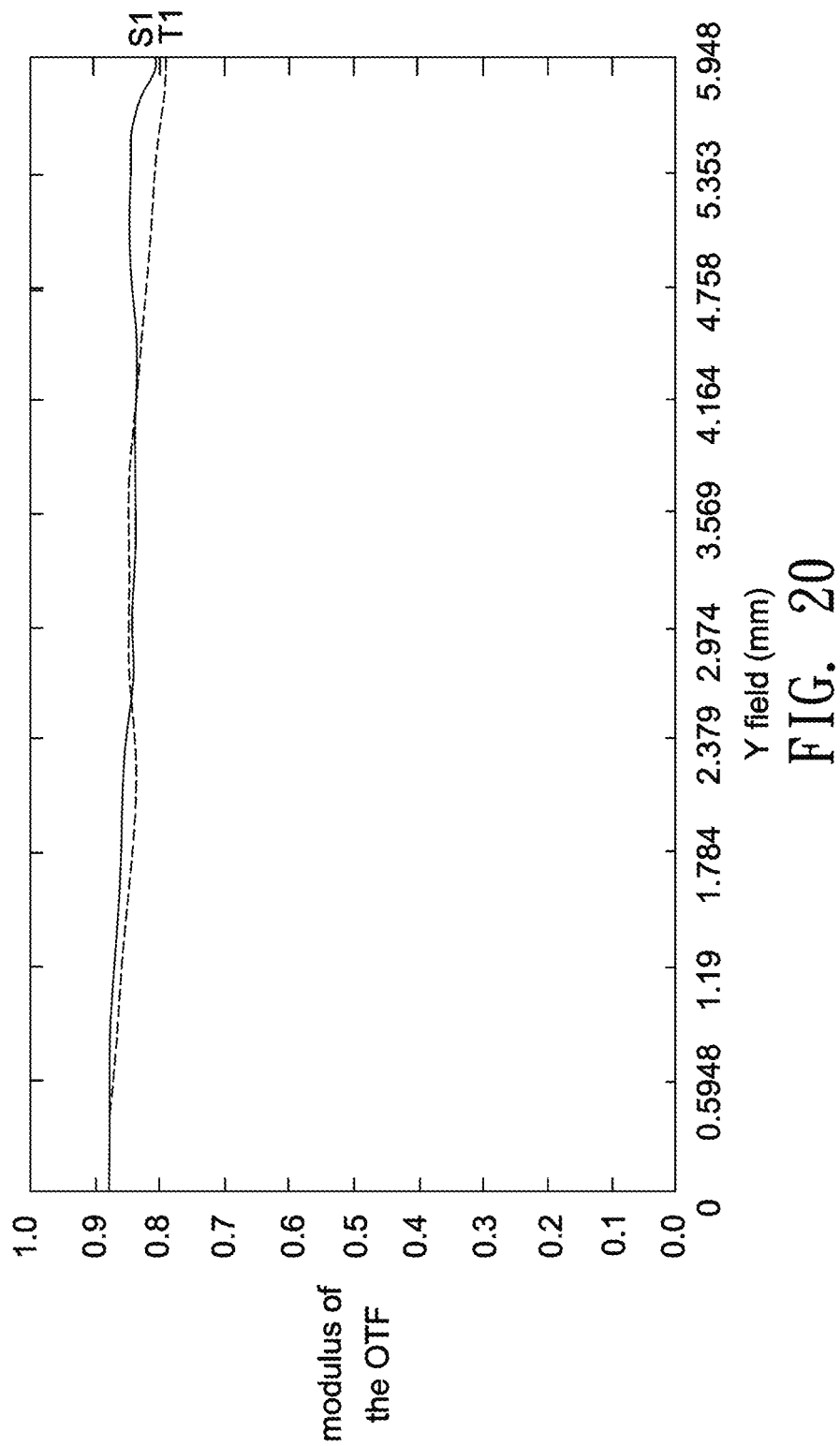
FIGS. 20, 21A and 21B show optical simulation results of the optical lens system shown in FIG. 19.
Figure 21:
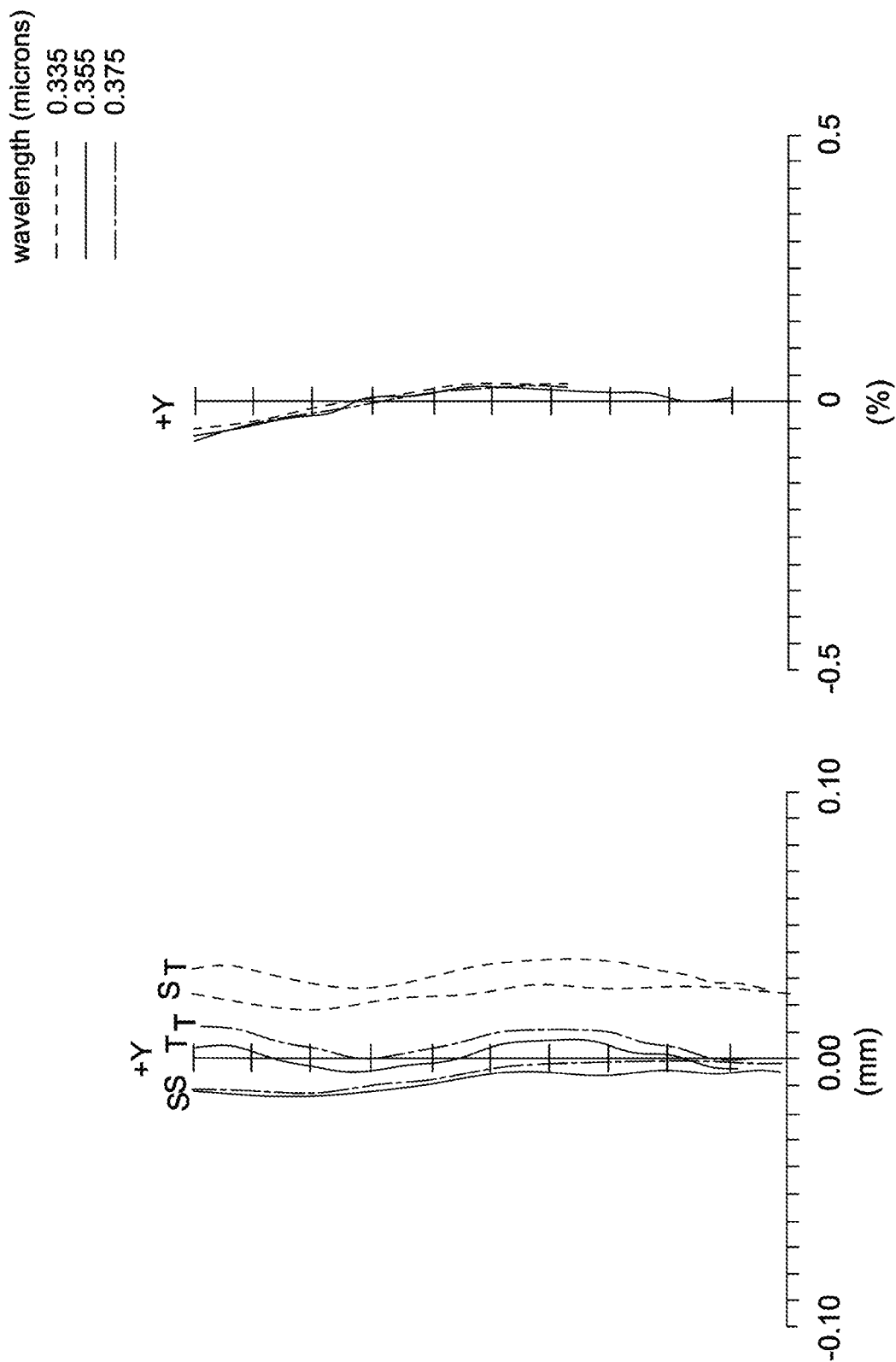

FIGS. 20, 21A and 21B show optical simulation results of the optical lens system shown in FIG. 19. FIG. 20 illustrates modulation transfer function (MTF) curves, FIG. 21A illustrates astigmatic field curves, and FIG. 22B illustrates percentage distortion curves. As shown in FIGS. 20, 21A and 21B, the MTF at a spatial frequency of 93 lp/mm is larger than 75%, and the optical distortion is smaller than 0.1%.

A eighth design example of an optical lens system 10h including nine lenses L1-L9 is described in detail below with reference to FIG. 22. The detailed optical data of the first example are shown in Table 22, and the aspheric surface data are shown in Table 23 below.

TABLE 22

Applied to a wavelength of 355 ± 25 nm
Effective focal length of the optical lens system F = 21.5196 mm
Effective focal length of the first lens group F1 = 79.0767 mm
Effective focal length of the second lens group F2 = 32.1572 mm

| Surface | radius (mm) | thickness (mm) | refractive index | Abbe number | Refractive power | Shape |
|---|---|---|---|---|---|---|
| S1 | −981.473 | 1.59 | 1.53 | 49.00 | L1 (−) | concave |
| S2 | 18.920 | 19.31 | | | | concave |
| S3 | 36.497 | 3.51 | 1.65 | 58.60 | L2 (+) | convex |
| S4 | −81.048 | 6.45 | | | | convex |
| S5 | 93.681 | 2.15 | 1.65 | 58.60 | L3 (−) | convex |
| S6 | −97.564 | 0.00 | | | | convex |
| S7 (stop) | INF | 2.07 | | | | |
| S8 | 32.730 | 5.72 | 1.65 | 58.60 | L4 (+) | convex |
| S9 | 388.761 | 8.07 | 1.50 | 81.60 | L5 (+) | convex |
| S10 | −20.119 | 0.80 | 1.58 | 40.80 | L6 (−) | concave |
| S11 | 15.850 | 4.39 | | | | concave |
| S12 | −8.897 | 0.80 | 1.58 | 40.80 | L7 (−) | concave |
| S13 | 397.529 | 6.76 | 1.65 | 58.60 | L8 (+) | convex |
| S14 | −13.562 | 0.10 | | | | convex |
| S15 | 24.096 | 5.90 | 1.50 | 81.60 | L9 (+) | convex |
| S16 | −29.486 | 6.14 | | | | convex |
| S17 | INF | 12.00 | 1.52 | 64.20 | | |
| S18 | INF | 2.00 | | | | |
| S19 | INF | 1.10 | 1.52 | 64.20 | | |

TABLE 23

| Lens surface | S15 | S16 |
|---|---|---|
| K | 1.62221 | −3.48112 |
| A | −2.56543E−05 | 1.49947E−05 |
| B | −2.52618E−07 | −4.37304E−07 |
| C | 5.36134E−10 | 9.09589E−09 |
| D | 1.34416E−10 | −5.41251E−11 |
| E | −4.22458E−12 | −1.75211E−12 |
| F | 4.58335E−14 | 2.81970E−14 |
| G | −1.81901E−16 | −1.27536E−16 |

Table 24 lists the internal transmittance of each of the lenses L1-L9 of the optical lens system 10c and the overall transmittance of all of the lenses L1-L9 at different wavelengths. Table 24 clearly shows each of the lenses L1-L9 may have a light transmittance of larger than 95% at a wavelength of 350 nm or 400 nm.

TABLE 24

| | Internal transmittance | |
|---|---|---|
| | 350 nm | 400 nm |
| Lens L1 | 99.9% | 100.0% |
| Lens L2 | 97.5% | 99.7% |
| Lens L3 | 98.5% | 99.8% |
| Lens L4 | 95.9% | 99.5% |
| Lens L5 | 95.7% | 99.6% |
| Lens L6 | 99.8% | 100.0% |
| Lens L7 | 99.8% | 100.0% |
| Lens L8 | 95.2% | 99.5% |

TABLE 24-continued

| | Internal transmittance | |
|---|---|---|
| | 350 nm | 400 nm |
| Lens L9 | 96.9% | 99.7% |
| Total | 81.0% | 97.8% |

Figure 22:
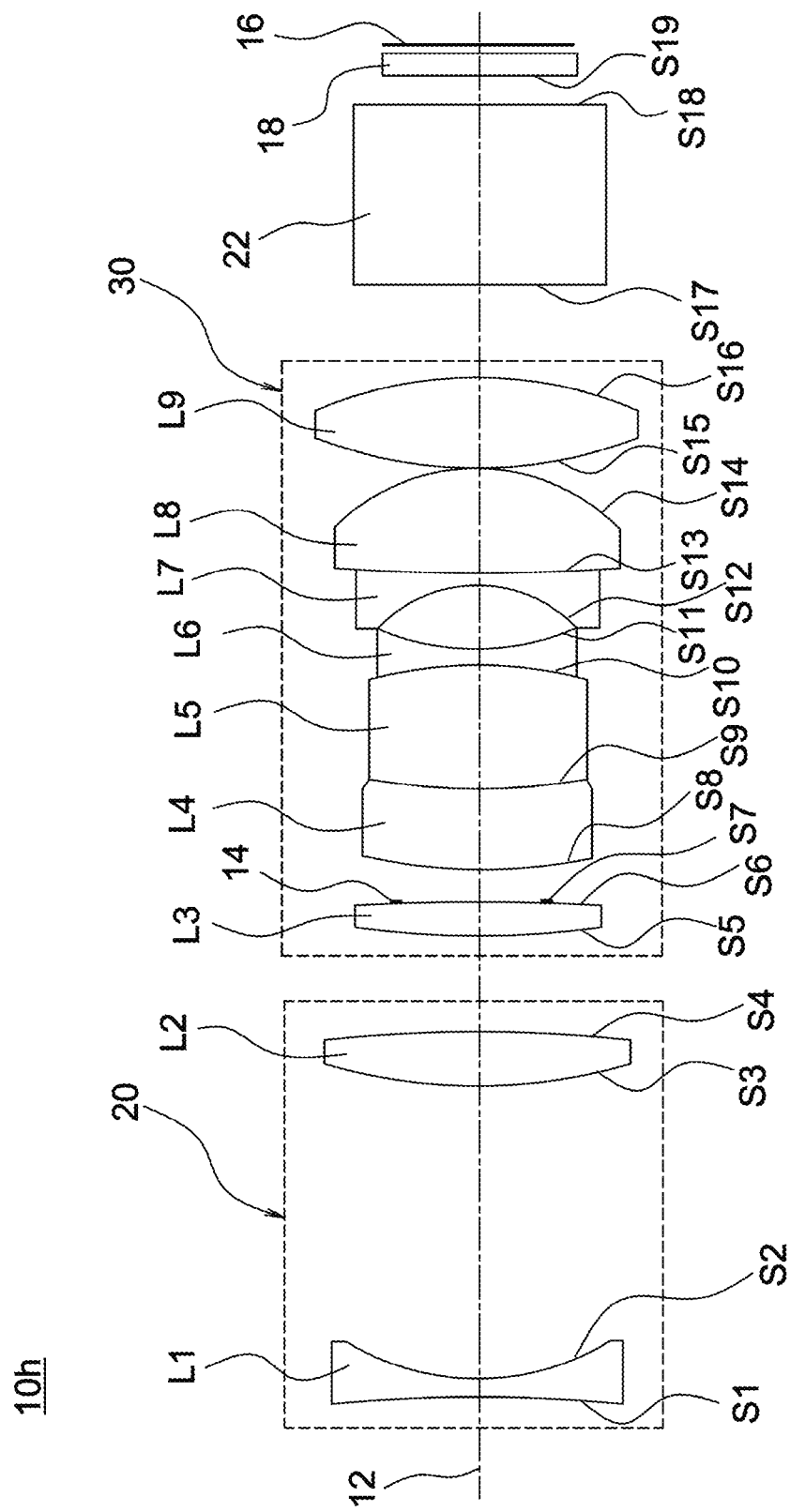
FIG. 22 shows a schematic diagram illustrating an optical lens system according to another embodiment of the invention.
Figure 23:
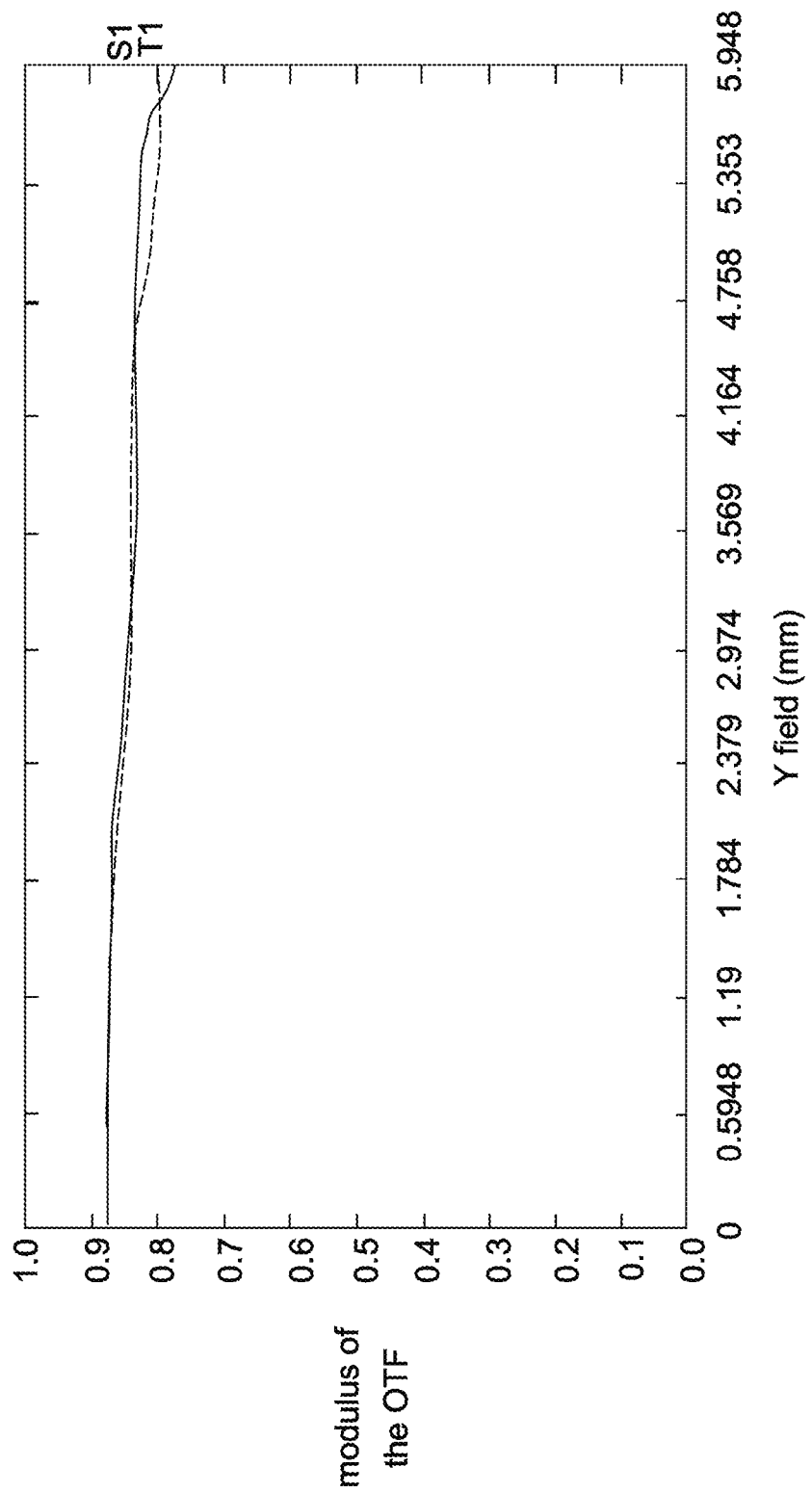
FIGS. 23, 24A and 24B show optical simulation results of the optical lens system shown in FIG. 22.
Figure 24:
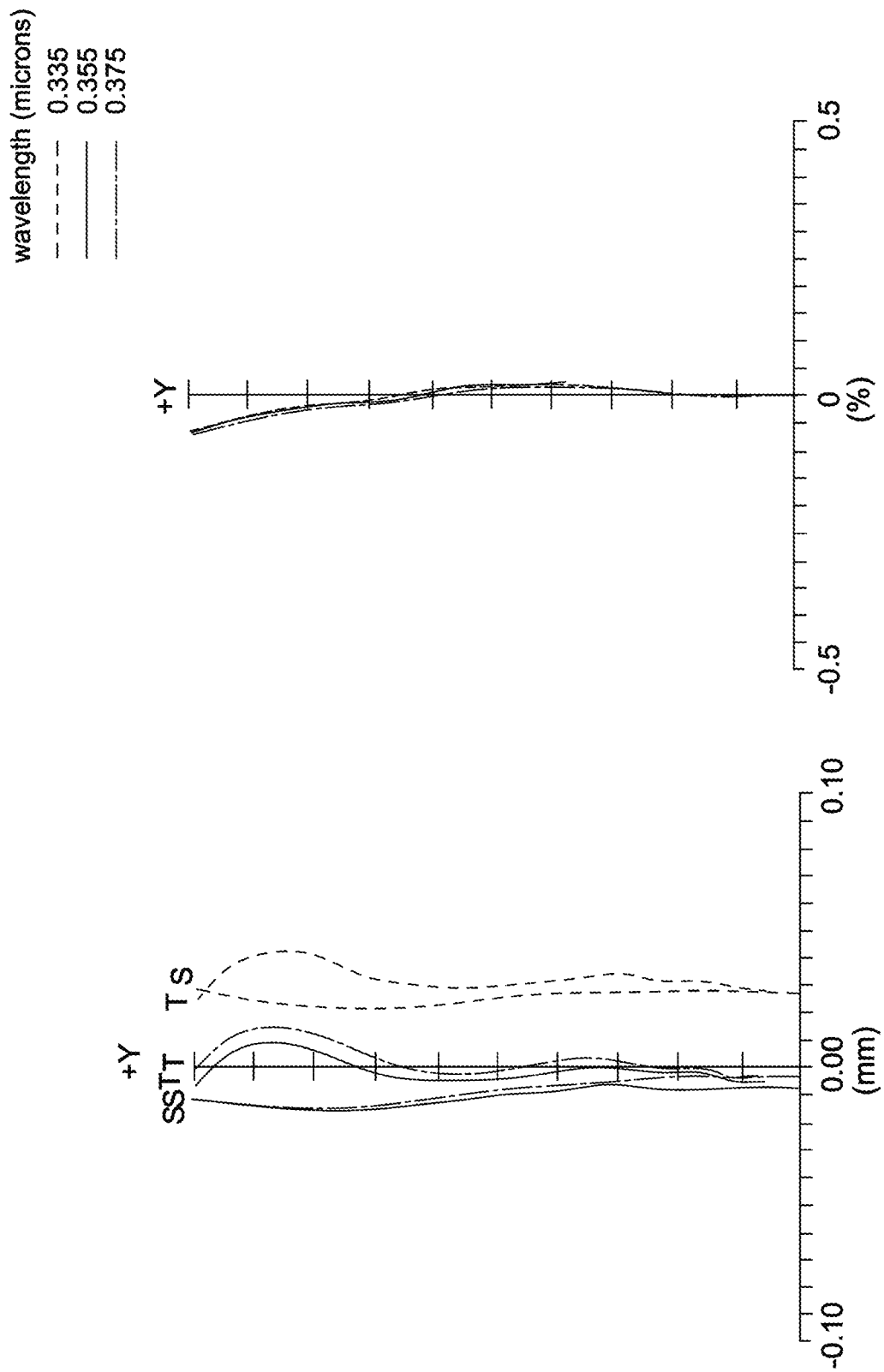

FIGS. 23, 24A and 24B show optical simulation results of the optical lens system shown in FIG. 22. FIG. 23 illustrates modulation transfer function (MTF) curves, FIG. 24A illustrates astigmatic field curves, and FIG. 24B illustrates percentage distortion curves. As shown in FIGS. 23, 24A and 24B, the MTF at a spatial frequency of 93 lp/mm is larger than 75%, and the optical distortion is smaller than 0.1%.

The simulated results are within permitted ranges specified by the standard, which indicates the optical lens system according to the above embodiments may achieve good imaging quality.

The following examples of optical lens systems 10i-10m describe another configuration where no cemented lens is provided and each of the lenses in the optical lens system may be a singlet lens. As prior developments have not taught or suggested, the inventors discover that a cemented lens, though being favorable for correcting optical aberrations, may cause defects in the transmission of short wavelength light, because the short wavelength light may damage the molecular bonding of an adhesive in the cemented lens to result in minor shift of lens pieces constituting the cemented lens. Particularly, a lower wavelength of light passing through a cemented lens, such as lower than 370 nm, may raise the possibility of damaging the molecular bonding of an adhesive in the cemented lens. Therefore, the optical lens system without the use of a cemented lens may have improved production reliability. Further, each of the optical lens systems 10i-10m may have a first lens group having negative refractive power and a second lens group having positive refractive power and includes at least one aspherical lens surface to reduce aberration. Besides, each of the optical lens systems 10i-10m may be adapted to transmit short wavelength light, such as ultraviolet at a wavelength of 350-420 nm, for imaging purpose. The optical lens system 10i-10m according to one embodiment may satisfy the following condition:

$T_{(\lambda=365)}$>80%; and
$TE_{(\lambda=365)}$>70%, where $T_{(\lambda=365)}$ denotes a transmittance of a lens material forming each of the lenses in the optical lens system, with the transmittance of the lens material being measured at a wavelength of 365 nm and a thickness of 10 mm, and $TE_{(\lambda=365)}$ denotes an overall transmittance of all of the lenses in the optical lens system measured at a wavelength of 365 nm. Further, at least one of the first lens group and the second lens group is moveable during focusing. Moreover, in the present and/or the other embodiment present in the specification, each of the lenses in the optical lens system may, but not essentially, be formed of a material having a transmittance larger than 80% measured at a wavelength of 365 nm and a thickness of 10 mm.

Figure 25:
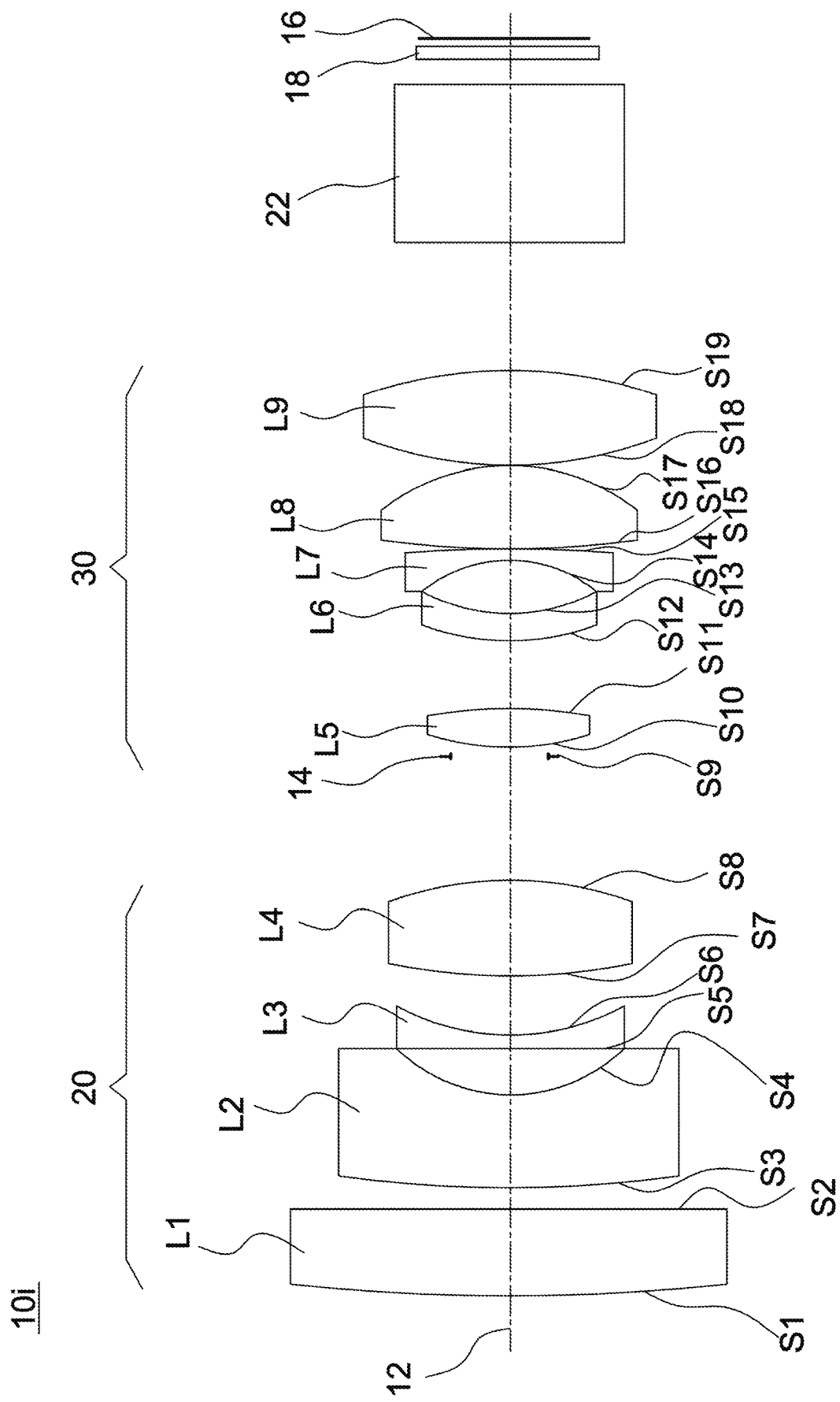
FIG. 25 shows a schematic diagram illustrating an optical lens system according to another embodiment of the invention.

The design example of an optical lens system 10i is described in detail below with reference to FIG. 25. As illustrated in FIG. 25, the optical lens system 10i may include a first lens group 20 and a second lens group 30. The first lens group 20 with negative refractive power includes four lenses L1, L2, L3 and L4 arranged in order, along an optical axis 12, from a magnified side (on the left of FIG. 25) to a minified side (on the right of FIG. 25). The second lens group 30 includes five lenses L5, L6, L7, L8 and L9 arranged in order, along the optical axis 12, from the magnified side to the minified side. The refractive powers of the lens L1, L2, L3, L4, L5, L6, L7, L8 and L9 are positive, negative, negative, positive, positive, negative, negative, positive and positive, respectively. Each of the first lens group 20 and the second lens group 30 includes at least one aspheric surface. In the present embodiment, both surfaces of each of the lens L4 and the lens L9 are aspheric surfaces. An aperture stop 14 is located between the lens L4 and the lens L5.

The detailed optical data of an optical lens system 10i are shown in Table 25, and the aspheric surface data are shown in Table 26 below.

TABLE 25

| Surface | radius (mm) | thickness (mm) | refractive index | Abbe number | Refractive power | Shape |
|---|---|---|---|---|---|---|
| S1 | 106.6 | 7.00 | 1.65 | 58.6 | L1 (+) | convex |
| S2 | Infinity | 1.50 | | | | planar |
| S3 | 103.5 | 7.00 | 1.50 | 81.6 | L2 (−) | convex |
| S4 | 11.2 | 3.37 | | | | concave |
| S5 | Infinity | 0.92 | 1.49 | 70.2 | L3 (−) | planar |
| S6 | 13.5 | 5.13 | | | | concave |
| S7 | 72.7 | 6.50 | 1.58 | 59.2 | L4 (+) | convex |
| S8 | −23.6 | 13.77 | | | | convex |
| S9 (stop) | | 0.10 | | | Stop | |
| S10 | 22.1 | 2.68 | 1.50 | 81.6 | L5 (+) | convex |
| S11 | −32.7 | 5.19 | | | | convex |
| S12 | 17.8 | 1.89 | 1.62 | 36.3 | L6 (−) | convex |
| S13 | 12.1 | 3.99 | | | | concave |
| S14 | −8.6 | 0.80 | 1.62 | 36.3 | L7 (−) | concave |
| S15 | −111.5 | 0.25 | | | | convex |
| S16 | 86.7 | 6.12 | 1.50 | 81.6 | L8 (+) | convex |
| S17 | −13.3 | 0.10 | | | | convex |
| S18 | 27.2 | 7.00 | 1.58 | 59.2 | L9 (+) | convex |
| S19 | −24.0 | 7.69 | | | | convex |

TABLE 26

| Lens surface | S7 | S8 | S18 | S19 |
|---|---|---|---|---|
| K | 0.00E+00 | 0.00E+00 | 0.00E+00 | 0.00E+00 |
| A | −4.07E−06 | −2.70E−05 | −6.99E−06 | 4.88E−05 |
| B | −4.39E−07 | −3.79E−07 | 6.51E−08 | −2.12E−08 |
| C | 3.76E−09 | 1.95E−09 | 1.38E−10 | 1.74E−09 |

TABLE 26-continued

| Lens surface | S7 | S8 | S18 | S19 |
|---|---|---|---|---|
| D | −4.66E−11 | −2.83E−11 | −4.86E−13 | −1.20E−11 |
| E | 0.00E+00 | 0.00E+00 | −3.01E−14 | 1.74E−16 |

Table 27 lists the internal transmittance of each of the lenses L1-L9 of the optical lens system 10i and the overall transmittance of all of the lenses L1-L9 at different wavelengths.

TABLE 27

| | Internal transmittance | | |
|---|---|---|---|
| | 365 nm | 385 nm | 405 nm |
| Lens L1 | 96.5% | 98.0% | 98.5% |
| Lens L2 | 97.9% | 98.9% | 98.9% |
| Lens L3 | 98.9% | 98.9% | 98.9% |
| Lens L4 | 97.3% | 98.3% | 98.6% |
| Lens L5 | 98.6% | 99.0% | 99.0% |
| Lens L6 | 98.7% | 98.9% | 98.9% |
| Lens L7 | 98.9% | 98.9% | 98.9% |
| Lens L8 | 98.0% | 98.9% | 98.9% |
| Lens L9 | 97.2% | 98.3% | 98.6% |
| Total | 83.4% | 88.7% | 89.7% |

Figure 26:
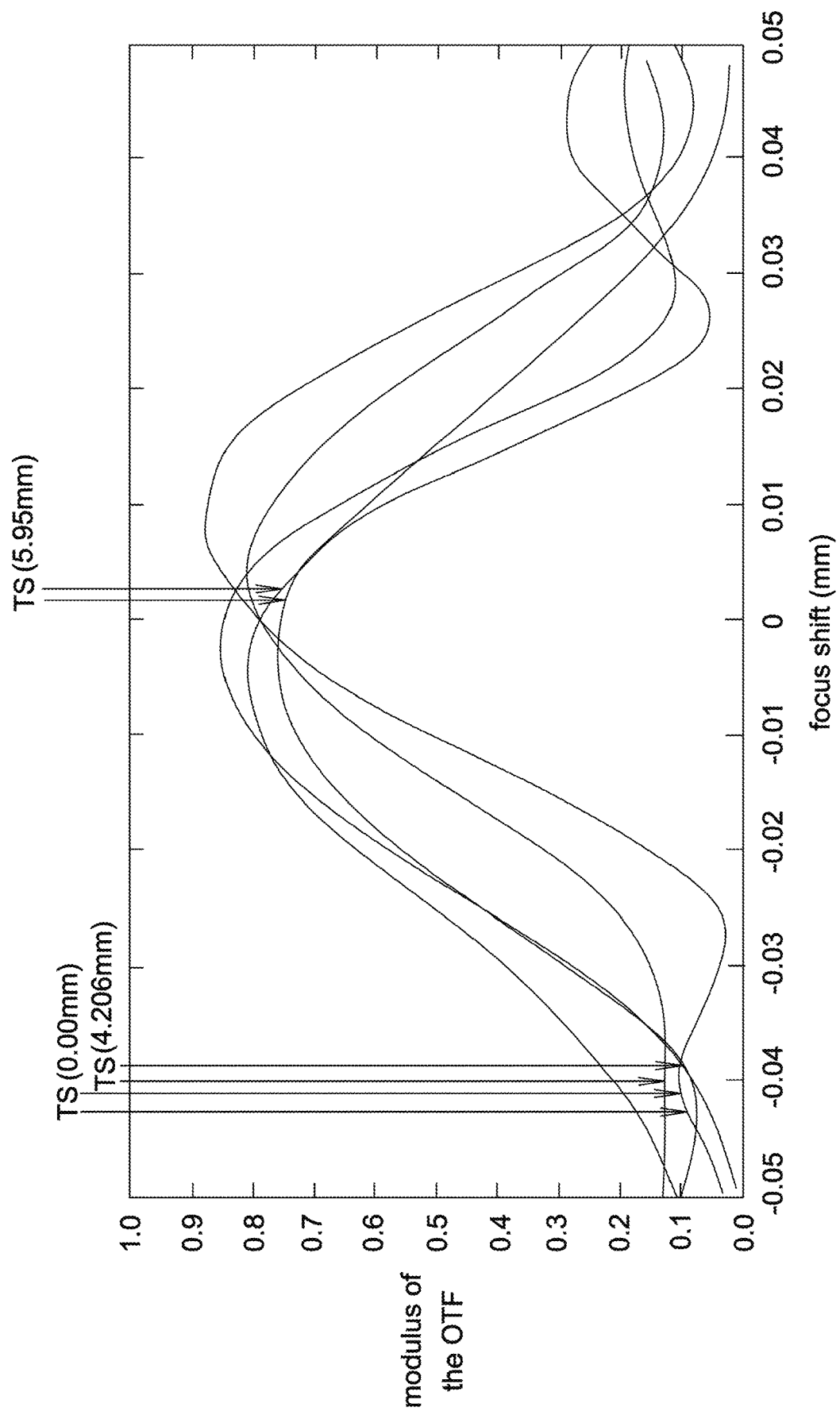
FIGS. 26, 27A and 27B show optical simulation results of the optical lens system shown in FIG. 25.
Figure 27:
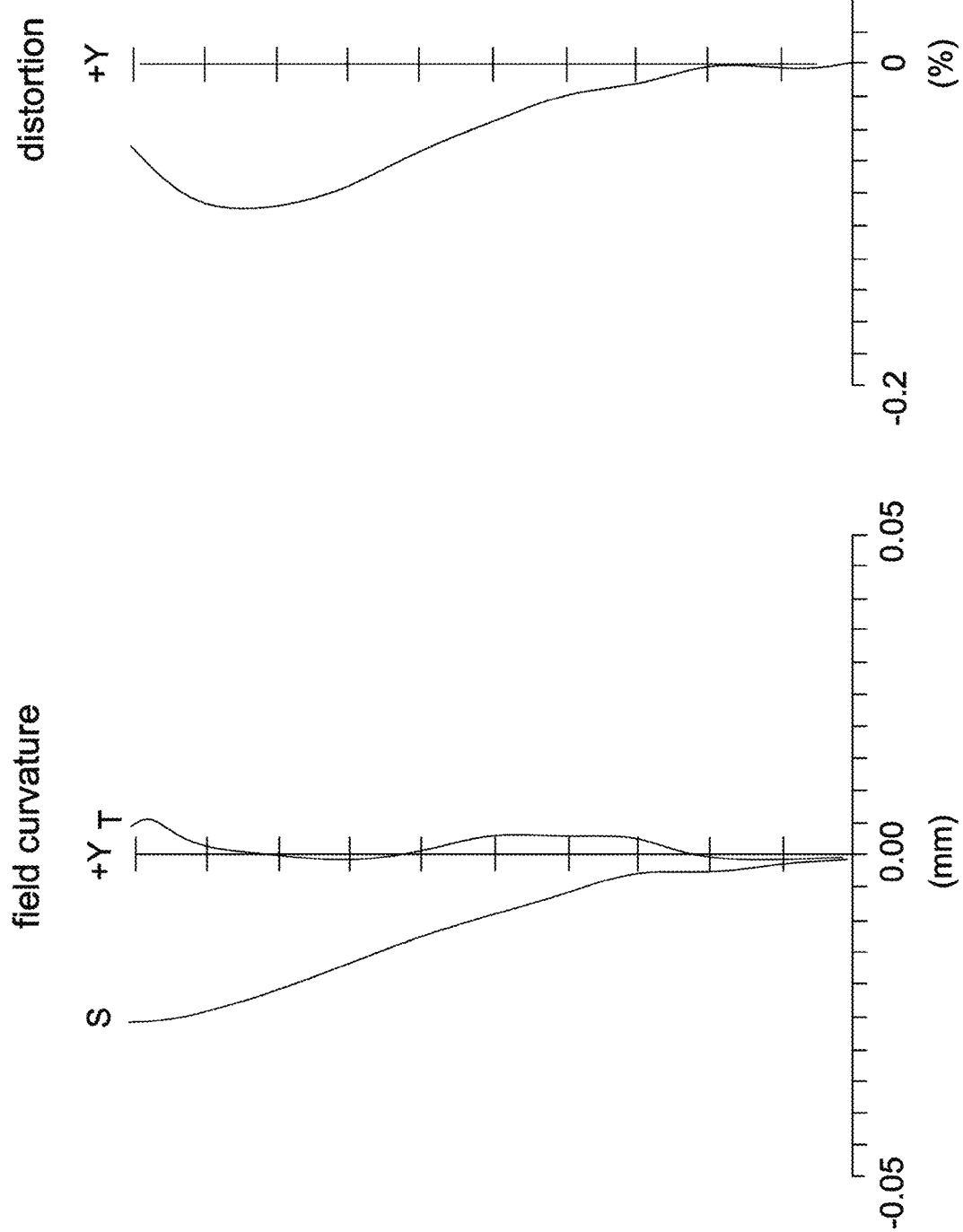

FIGS. 26, 27A and 27B show optical simulation results of the optical lens system shown in FIG. 13. FIG. 26 illustrates modulation transfer function (MTF) curves, FIG. 27A illustrates astigmatic field curves, and FIG. 27B illustrates percentage distortion curves. As shown in FIG. 27B, an absolute value of a maximum optical distortion is smaller than 0.2%.

Figure 28:
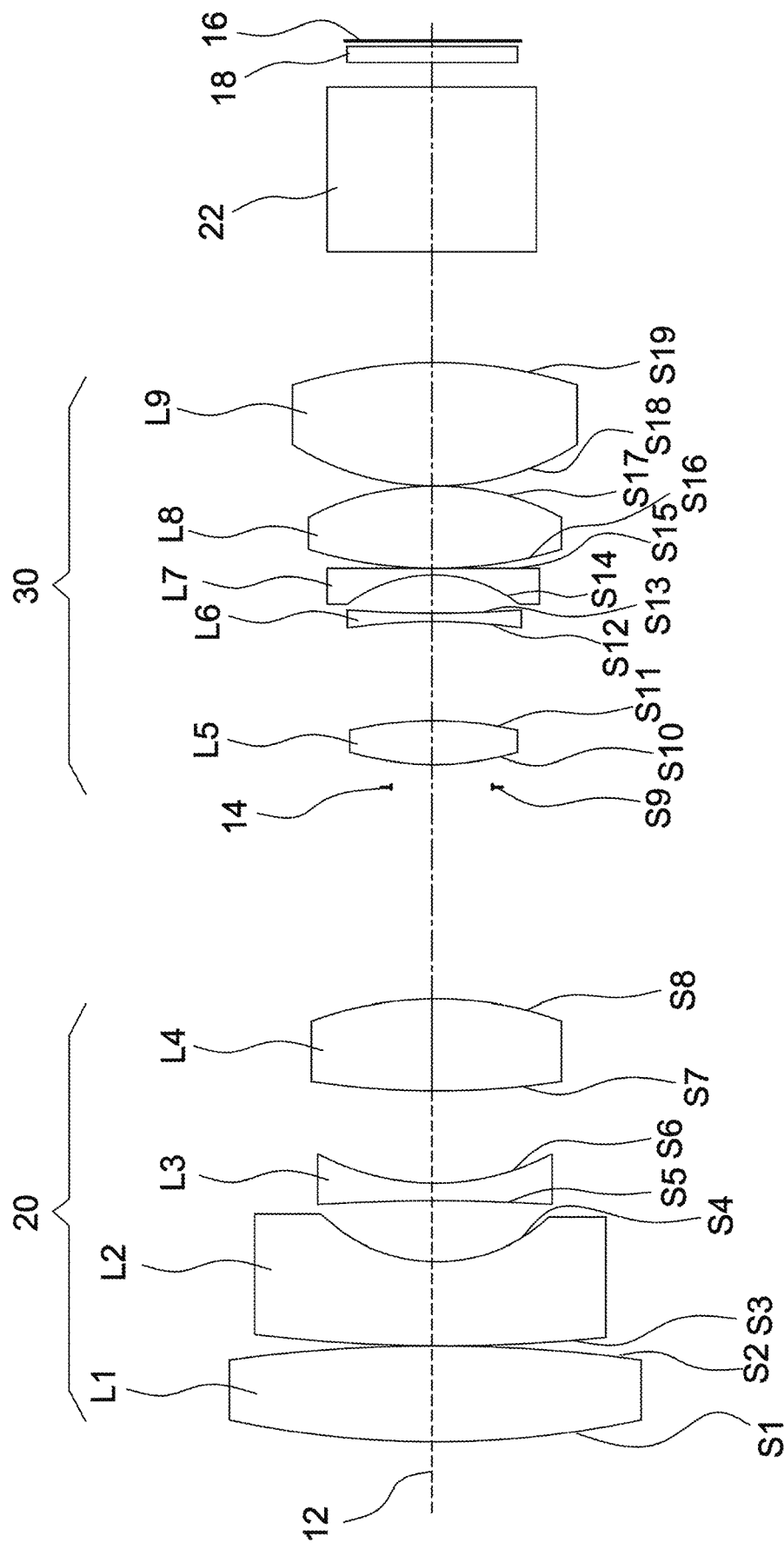
FIG. 28 shows a schematic diagram illustrating an optical lens system according to another embodiment of the invention.

The detailed optical data of an optical lens system 10j illustrated in FIG. 28 are shown in Table 28, and the aspheric surface data are shown in Table 29 below.

TABLE 28

| Surface | radius (mm) | thickness (mm) | refractive index | Abbe number | Refractive power | Shape |
|---|---|---|---|---|---|---|
| S1 | 88.5 | 7.00 | 1.65 | 58.6 | L1 (+) | convex |
| S2 | −245.8 | 0.10 | | | | convex |
| S3 | 230.9 | 6.71 | 1.50 | 81.6 | L2 (−) | convex |
| S4 | 12.8 | 3.98 | | | | concave |
| S5 | −62.6 | 0.99 | 1.49 | 70.2 | L3 (−) | concave |
| S6 | 14.2 | 7.26 | | | | concave |
| S7 | 80.7 | 7.00 | 1.58 | 59.2 | L4 (+) | convex |
| S8 | −25.5 | 16.15 | | | | convex |
| S9 (stop) | | 1.39 | | | Stop | |
| S10 | 22.0 | 3.06 | 1.50 | 81.6 | L5 (+) | convex |
| S11 | −32.7 | 7.49 | | | | convex |
| S12 | −36.3 | 0.80 | 1.65 | 39.7 | L6 (−) | concave |
| S13 | 121.5 | 2.55 | | | | concave |
| S14 | −11.0 | 0.85 | 1.65 | 39.7 | L7 (−) | concave |
| S15 | Infinity | 0.15 | | | | planar |
| S16 | 51.4 | 5.52 | 1.50 | 81.6 | L8 (+) | convex |
| S17 | −16.9 | 0.10 | | | | convex |
| S18 | 22.9 | 9.00 | 1.58 | 59.2 | L9 (+) | convex |
| S19 | −24.2 | 8.47 | | | | convex |

TABLE 29

| Lens surface | S7 | S8 | S18 | S19 |
|---|---|---|---|---|
| K | 5.33E+00 | −2.83E−01 | −2.76E−02 | −9.04E−03 |
| A | 4.65E−07 | −1.25E−05 | −2.36E−05 | 5.44E−05 |
| B | −1.64E−07 | −1.59E−07 | 1.71E−07 | 8.88E−08 |
| C | 9.26E−10 | 7.24E−10 | 6.70E−11 | 1.04E−09 |

TABLE 29-continued

| Lens surface | S7 | S8 | S18 | S19 |
|---|---|---|---|---|
| D | −3.45E−12 | −5.14E−12 | 2.68E−12 | −1.34E−12 |
| E | 1.75E−15 | 5.75E−15 | 1.16E−16 | 3.58E−14 |

Table 30 lists the internal transmittance of each of the lenses L1-L9 of the optical lens system 10j and the overall transmittance of all of the lenses L1-L9 at different wavelengths.

TABLE 30

| | Internal transmittance | | |
|---|---|---|---|
| | 365 nm | 385 nm | 405 nm |
| Lens L1 | 96.5% | 98.0% | 98.5% |
| Lens L2 | 98.0% | 98.9% | 98.9% |
| Lens L3 | 98.9% | 99.0% | 99.0% |
| Lens L4 | 97.2% | 98.3% | 98.6% |
| Lens L5 | 98.5% | 99.0% | 99.0% |
| Lens L6 | 97.9% | 98.6% | 98.8% |
| Lens L7 | 97.8% | 98.5% | 98.8% |
| Lens L8 | 98.2% | 98.9% | 98.9% |
| Lens L9 | 96.7% | 98.1% | 98.5% |
| Total | 81.5% | 88.0% | 89.4% |

Figure 29:
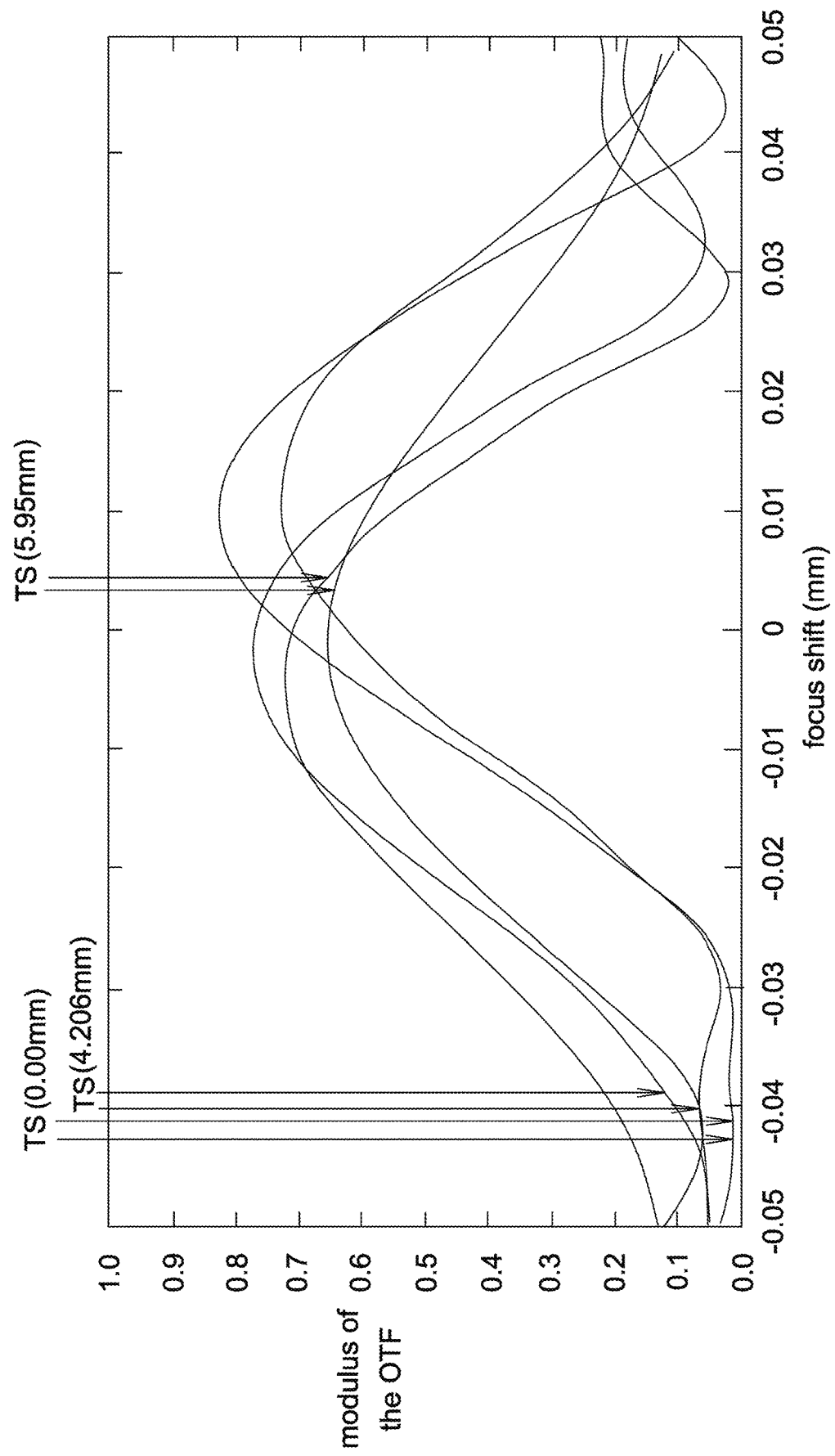
FIGS. 29, 30A and 30B show optical simulation results of the optical lens system shown in FIG. 28.
Figure 30:
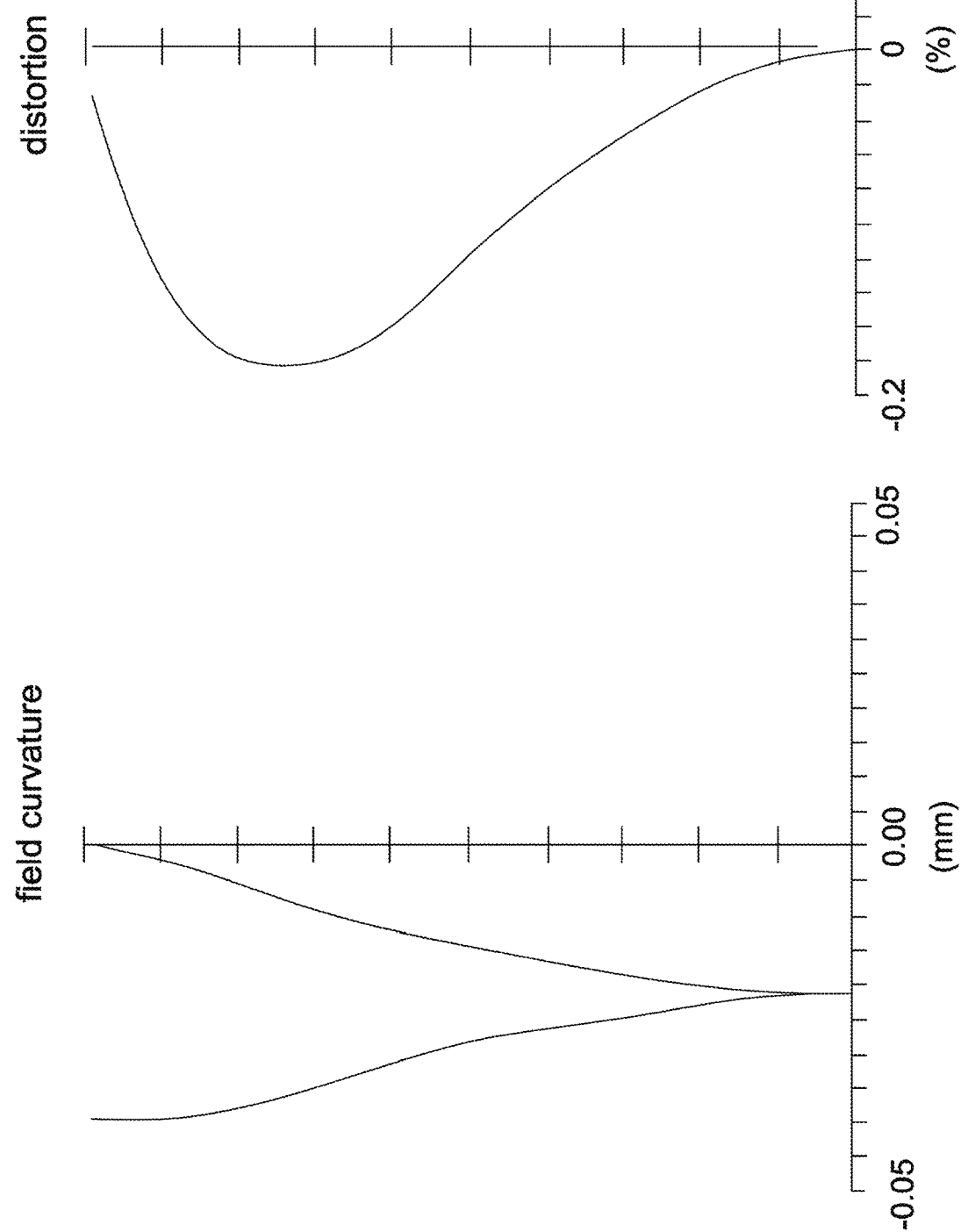

FIGS. 29, 30A and 30B show optical simulation results of the optical lens system shown in FIG. 25. FIG. 29 illustrates modulation transfer function (MTF) curves, FIG. 30A illustrates astigmatic field curves, and FIG. 30B illustrates percentage distortion curves. As shown in FIG. 30B, an absolute value of a maximum optical distortion is smaller than 0.2%. Meanwhile, at least in the present embodiment, the condition of G/N<0.2 is satisfied, where N denotes a total number of the lenses in the optical lens system, and G denotes a number of the lenses formed of a lens material having a transmittance of smaller than 87% in the projection lens system, the transmittance of the lens material being measured at a wavelength of 365 nm and a thickness of 10 mm. It worth a mention that the G number should at least equal to or larger than zero, while in the present embodiment, the G number is 2 and refer to lens L6 and L7. Meanwhile, the transmittance of the material of lens L6 and L7 is reduced to less than 84% while the wavelength is at 360 nm instead of 87% at 365 nm as previously described. Furthermore, the overall transmittance of all of the lenses in the optical lens system measured at a wavelength of 365 nm is larger than 70%, and more precisely, 81.5% in the present embodiment as depicted in the table 30.

Figure 31:
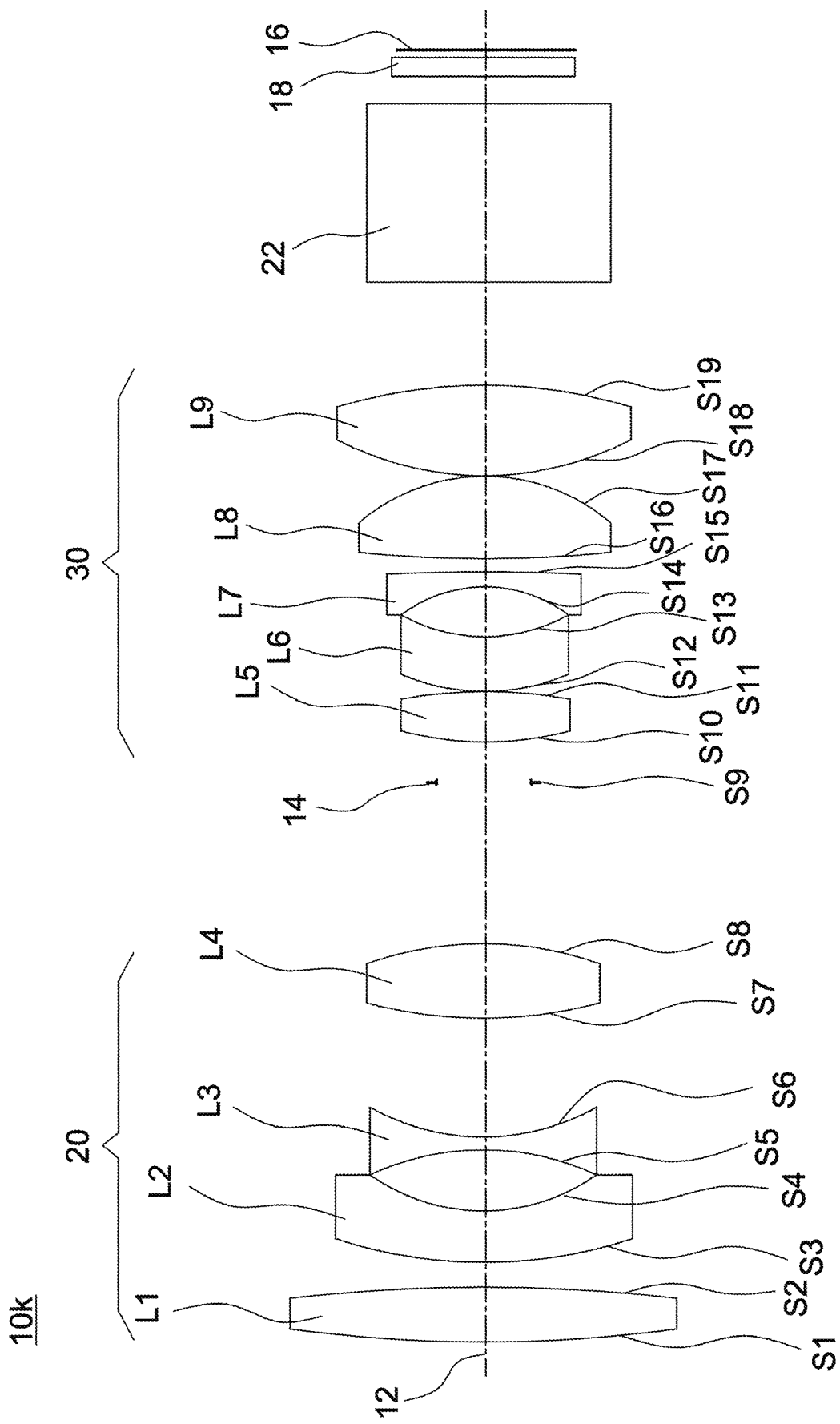
FIG. 31 shows a schematic diagram illustrating an optical lens system according to another embodiment of the invention.

The detailed optical data of an optical lens system 10k illustrated in FIG. 31 are shown in Table 31, and the aspheric surface data are shown in Table 32 below.

TABLE 31

| Surface | radius (mm) | thickness (mm) | refractive index | Abbe number | Refractive power | Shape |
|---|---|---|---|---|---|---|
| S1 | 119.0 | 3.62 | 1.65 | 58.5 | L1 (+) | convex |
| S2 | −99.1 | 1.74 | | | | convex |
| S3 | 32.7 | 3.27 | 1.50 | 81.5 | L2 (−) | convex |
| S4 | 13.7 | 4.01 | | | | concave |
| S5 | −24.0 | 0.80 | 1.50 | 81.5 | L3 (−) | concave |
| S6 | 13.8 | 8.11 | | | | concave |
| S7 | 32.8 | 5.00 | 1.55 | 63.5 | L4 (+) | convex |
| S8 | −23.2 | 10.68 | | | | convex |
| S9 (stop) | | 2.63 | | | Stop | |
| S10 | 17.7 | 3.34 | 1.50 | 81.5 | L5 (+) | convex |
| S11 | −40.8 | 0.14 | | | | convex |
| S12 | 22.5 | 3.74 | 1.62 | 36.4 | L6 (−) | convex |
| S13 | 10.9 | 3.31 | | | | concave |
| S14 | −8.5 | 0.80 | 1.62 | 36.4 | L7 (−) | concave |
| S15 | −411.5 | 1.10 | | | | convex |
| S16 | 128.4 | 5.43 | 1.50 | 81.6 | L8 (+) | convex |
| S17 | −12.9 | 0.10 | | | | convex |
| S18 | 22.0 | 5.75 | 1.58 | 59.2 | L9 (+) | convex |
| S19 | −26.9 | 7.08 | | | | convex |

TABLE 32

| Lens surface | S7 | S8 | S18 | S19 |
|---|---|---|---|---|
| K | 0.00E+00 | 0.00E+00 | 0.00E+00 | 0.00E+00 |
| A | 5.36E−06 | 5.45E−06 | −2.89E−06 | 5.43E−05 |
| B | −3.20E−07 | −3.09E−07 | 9.00E−08 | 1.84E−08 |
| C | 3.08E−09 | 2.71E−09 | −1.59E−10 | 1.24E−09 |
| D | −3.66E−11 | −3.19E−11 | 3.35E−12 | −9.29E−12 |
| E | 0.00E+00 | 0.00E+00 | −3.66E−14 | −3.99E−16 |

Table 33 lists the internal transmittance of each of the lenses L1-L9 of the optical lens system 10k and the overall transmittance of all of the lenses L1-L9 at different wavelengths.

TABLE 33

| | Internal transmittance | | |
|---|---|---|---|
| | 365 nm | 385 nm | 405 nm |
| Lens L1 | 97.4% | 98.3% | 98.6% |
| Lens L2 | 98.4% | 98.8% | 98.8% |
| Lens L3 | 98.9% | 99.0% | 99.0% |

TABLE 33-continued

| | Internal transmittance | | |
|---|---|---|---|
| | 365 nm | 385 nm | 405 nm |
| Lens L4 | 98.3% | 98.6% | 98.7% |
| Lens L5 | 98.4% | 98.8% | 98.8% |
| Lens L6 | 98.4% | 98.8% | 98.9% |
| Lens L7 | 98.9% | 99.0% | 99.0% |
| Lens L8 | 98.3% | 98.8% | 98.8% |
| Lens L9 | 97.5% | 98.4% | 98.7% |
| Total | 85.5% | 89.1% | 89.8% |

Figure 32:
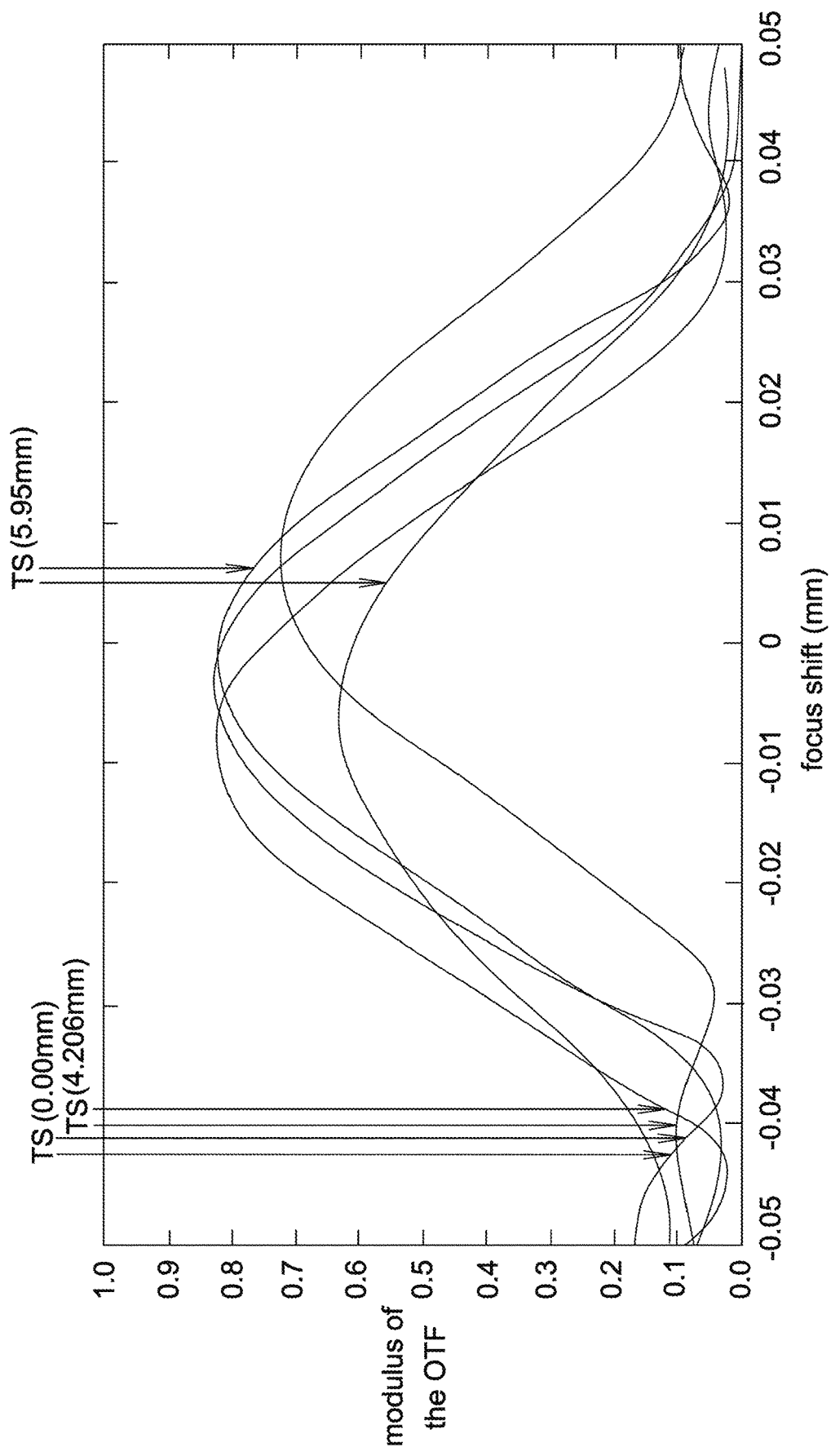
FIGS. 32, 33A and 33B show optical simulation results of the optical lens system shown in FIG. 31.
Figure 33:
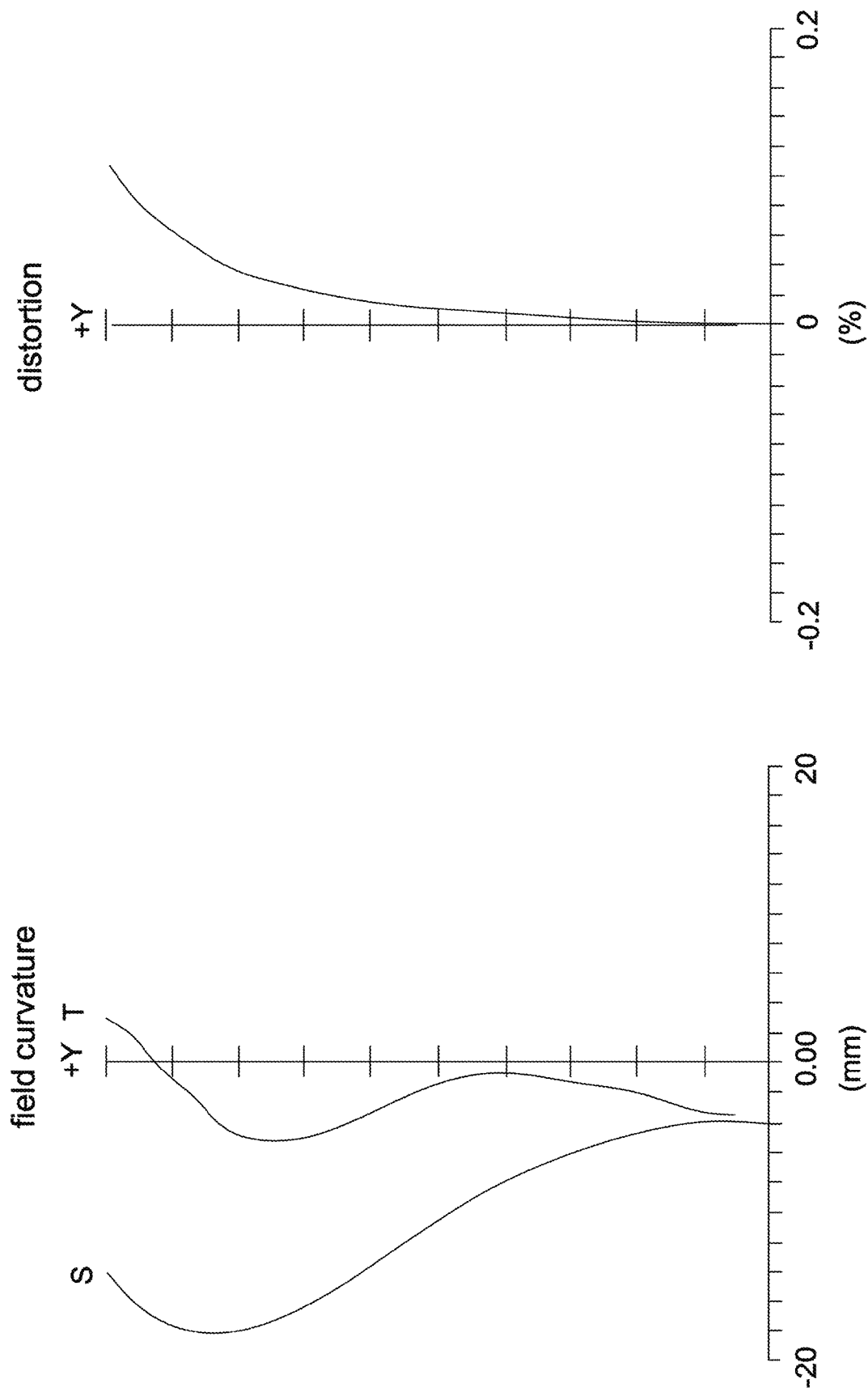

FIGS. 32, 33A and 33B show optical simulation results of the optical lens system shown in FIG. 31. FIG. 32 illustrates modulation transfer function (MTF) curves, FIG. 33A illustrates astigmatic field curves, and FIG. 33B illustrates percentage distortion curves. As shown in FIG. 33B, an absolute value of a maximum optical distortion is smaller than 0.2%.

Figure 34:
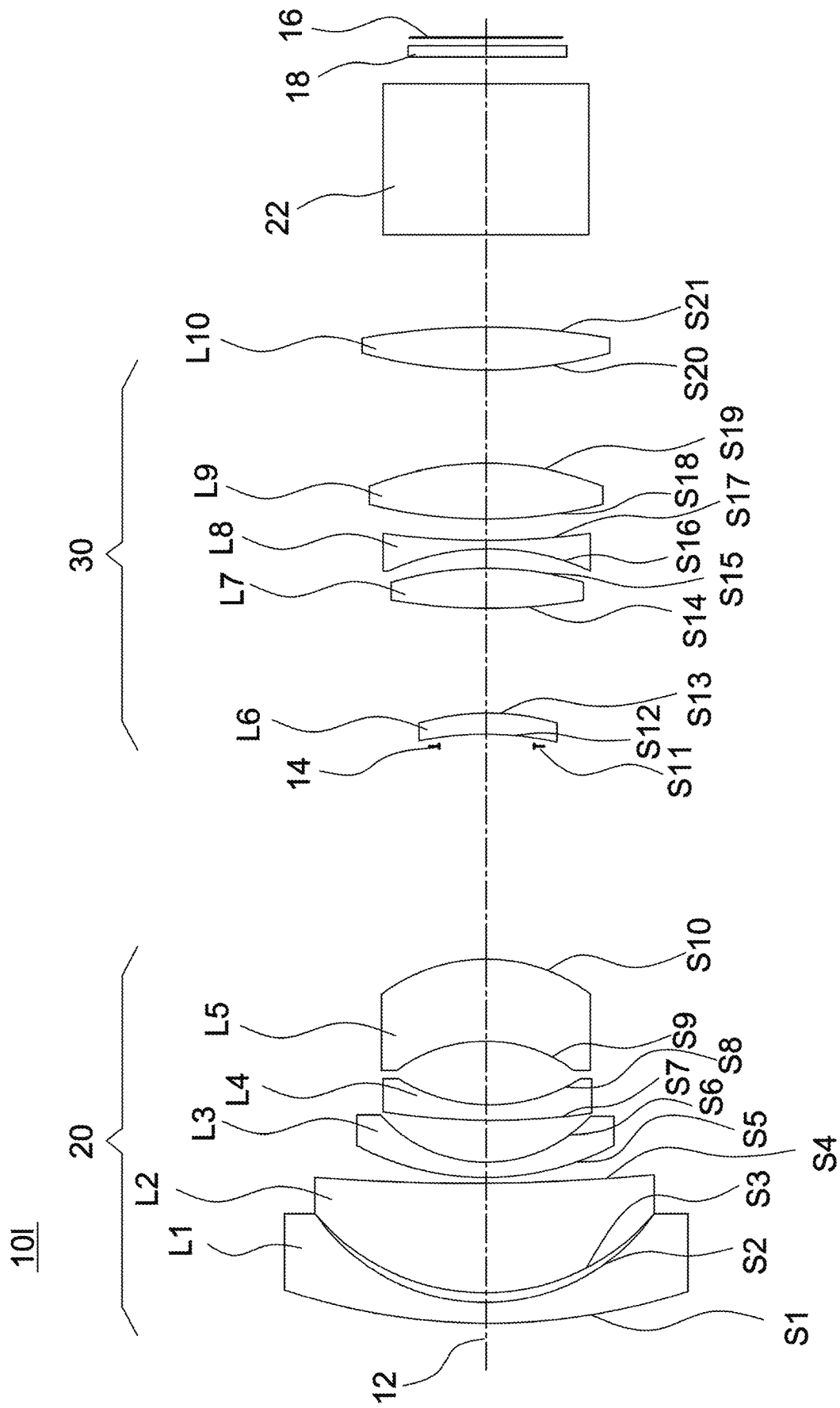
FIG. 34 shows a schematic diagram illustrating an optical lens system according to another embodiment of the invention.

The detailed optical data of an optical lens system 10l illustrated in FIG. 34 are shown in Table 34, and the aspheric surface data are shown in Table 35 below.

TABLE 34

| Surface | radius (mm) | thickness (mm) | refractive index | Abbe number | Refractive power | Shape |
|---|---|---|---|---|---|---|
| S1 | 50.3 | 1.63 | 1.52 | 64.1 | L1 (−) | convex |
| S2 | 16.1 | 0.66 | | | | concave |
| S3 | 16.7 | 9.04 | 1.68 | 55.3 | L2 (+) | convex |
| S4 | 295.1 | 0.21 | | | | concave |
| S5 | 22.3 | 1.22 | 1.68 | 55.3 | L3(−) | convex |
| S6 | 11.4 | 3.44 | | | | concave |
| S7 | 82.8 | 0.80 | 1.50 | 81.6 | L4 (−) | convex |
| S8 | 11.7 | 5.20 | | | | concave |
| S9 | −11.1 | 6.50 | 1.67 | 54.9 | L5 (+) | concave |
| S10 | −12.6 | 16.90 | | | | convex |
| S11 (stop) | | 0.63 | | | Stop | |
| S12 | −41.4 | 1.89 | 1.52 | 64.1 | L6 (+) | concave |

TABLE 34-continued

| Surface | radius (mm) | thickness (mm) | refractive index | Abbe number | Refractive power | Shape |
|---|---|---|---|---|---|---|
| S13 | −18.0 | 8.56 | | | | convex |
| S14 | 58.6 | 2.94 | 1.49 | 70.2 | L7 (+) | convex |
| S15 | −25.5 | 1.40 | | | | convex |
| S16 | −19.4 | 0.80 | 1.67 | 38.1 | L8 (−) | concave |
| S17 | 57.2 | 1.70 | | | | concave |
| S18 | 32.6 | 4.32 | 1.50 | 81.6 | L9 (+) | convex |
| S19 | −25.8 | 7.73 | | | | convex |
| S20 | 41.9 | 3.20 | 1.58 | 59.2 | L10 (+) | convex |
| S21 | −42.6 | 7.16 | | | | convex |

TABLE 35

| Lens surface | S9 | S10 | S20 | S21 |
|---|---|---|---|---|
| K | 0.00E+00 | 0.00E+00 | 0.00E+00 | 0.00E+00 |
| A | 3.55E−06 | 3.26E−05 | −1.21E−05 | 1.51E−05 |
| B | 1.11E−07 | 1.16E−07 | 1.14E−07 | 1.40E−07 |
| C | 1.63E−10 | 1.37E−09 | 1.81E−10 | 1.34E−10 |
| D | 1.53E−10 | 1.95E−11 | 7.64E−13 | 1.07E−12 |
| E | 0.00E+00 | 0.00E+00 | 0.00E+00 | 0.00E+00 |

Table 36 lists the internal transmittance of each of the lenses L1-L10 of the optical lens system 10*l* and the overall transmittance of all of the lenses L1-L10 at different wavelengths.

TABLE 36

| | Internal transmittance | | |
|---|---|---|---|
| | 365 nm | 385 nm | 405 nm |
| Lens L1 | 98.8% | 98.9% | 98.9% |
| Lens L2 | 94.5% | 97.2% | 98.0% |
| Lens L3 | 98.4% | 98.8% | 98.9% |

TABLE 36-continued

| | Internal transmittance | | |
|---|---|---|---|
| | 365 nm | 385 nm | 405 nm |
| Lens L4 | 98.9% | 99.0% | 99.0% |
| Lens L5 | 95.8% | 98.2% | 98.2% |
| Lens L6 | 98.8% | 98.9% | 98.9% |
| Lens L7 | 98.9% | 99.0% | 99.0% |
| Lens L8 | 98.5% | 98.8% | 98.9% |
| Lens L9 | 98.5% | 98.8% | 98.9% |
| Lens L10 | 98.2% | 98.7% | 98.8% |
| Total | 81.0% | 87.1% | 88.2% |

Figure 35:
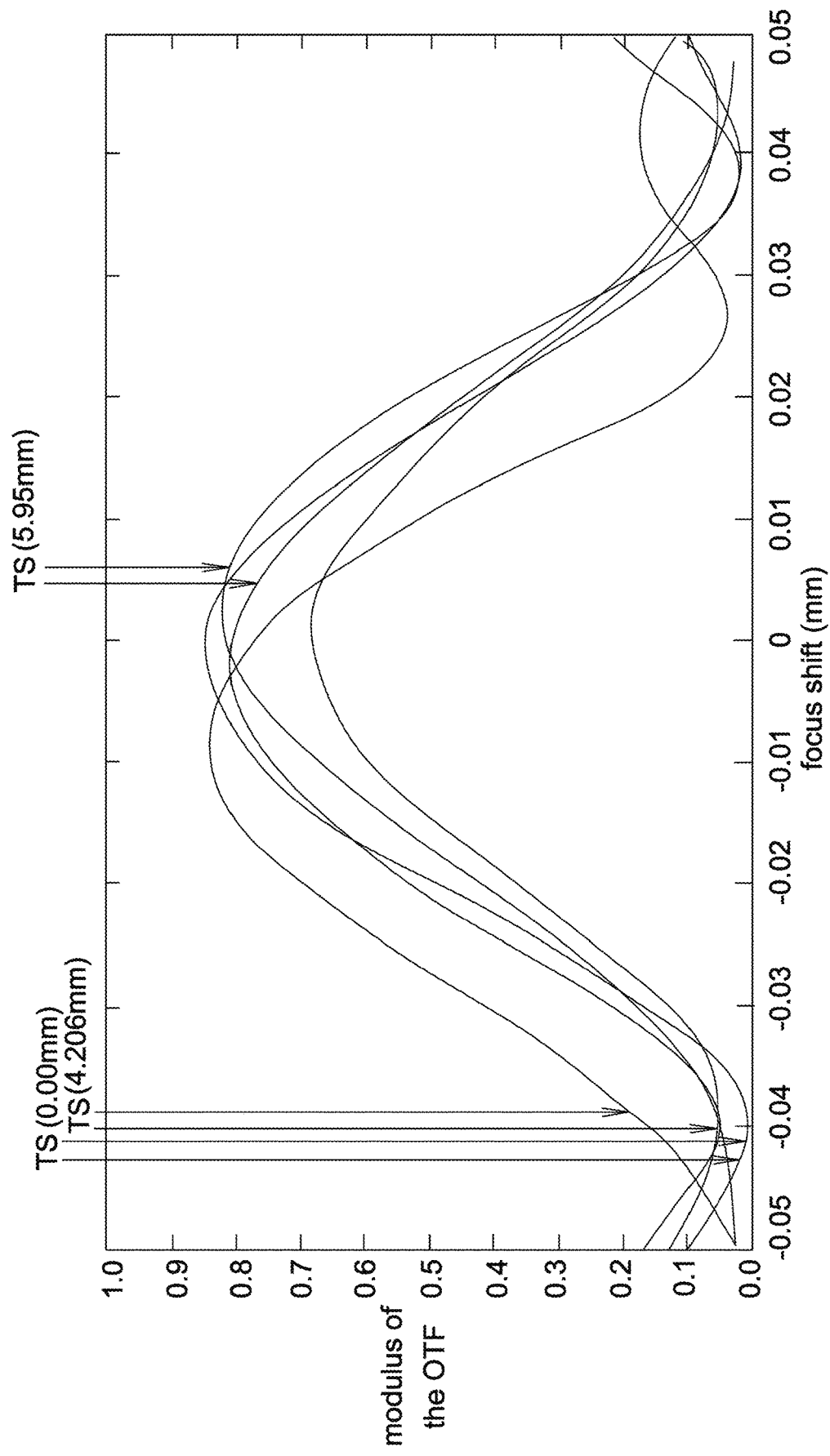
FIGS. 35, 36A and 36B show optical simulation results of the optical lens system shown in FIG. 34.
Figure 36B:
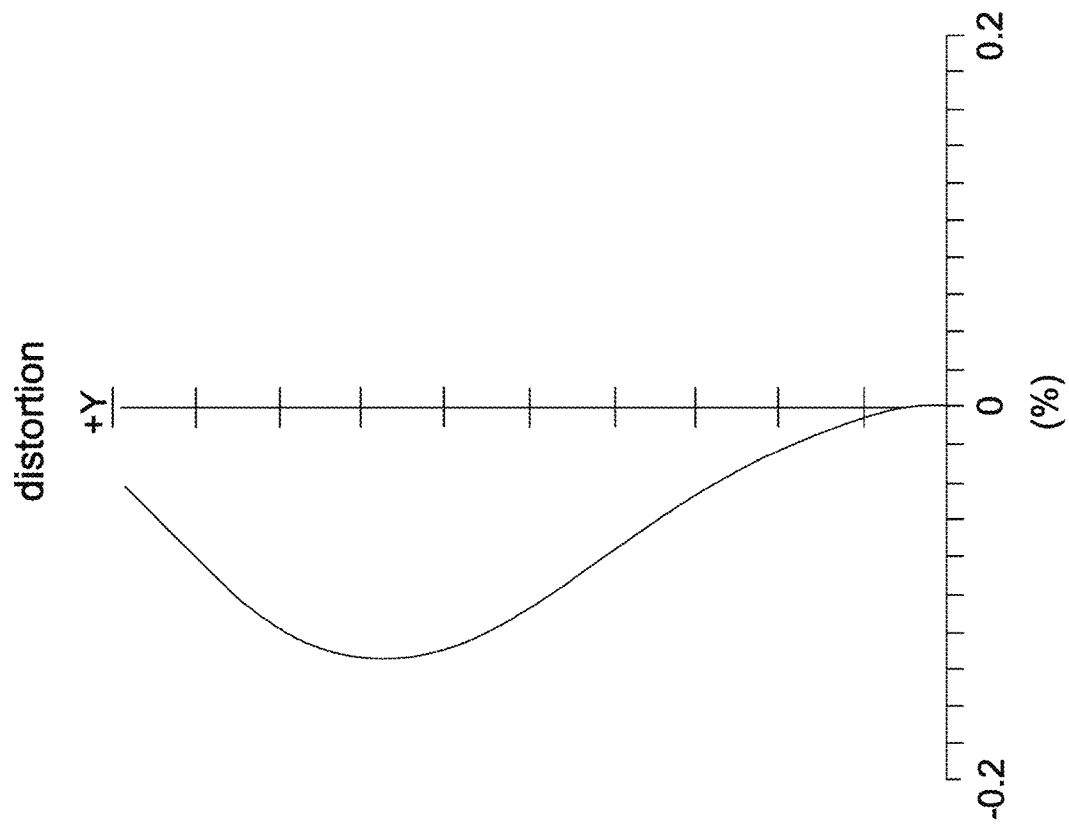
Figure 36A:
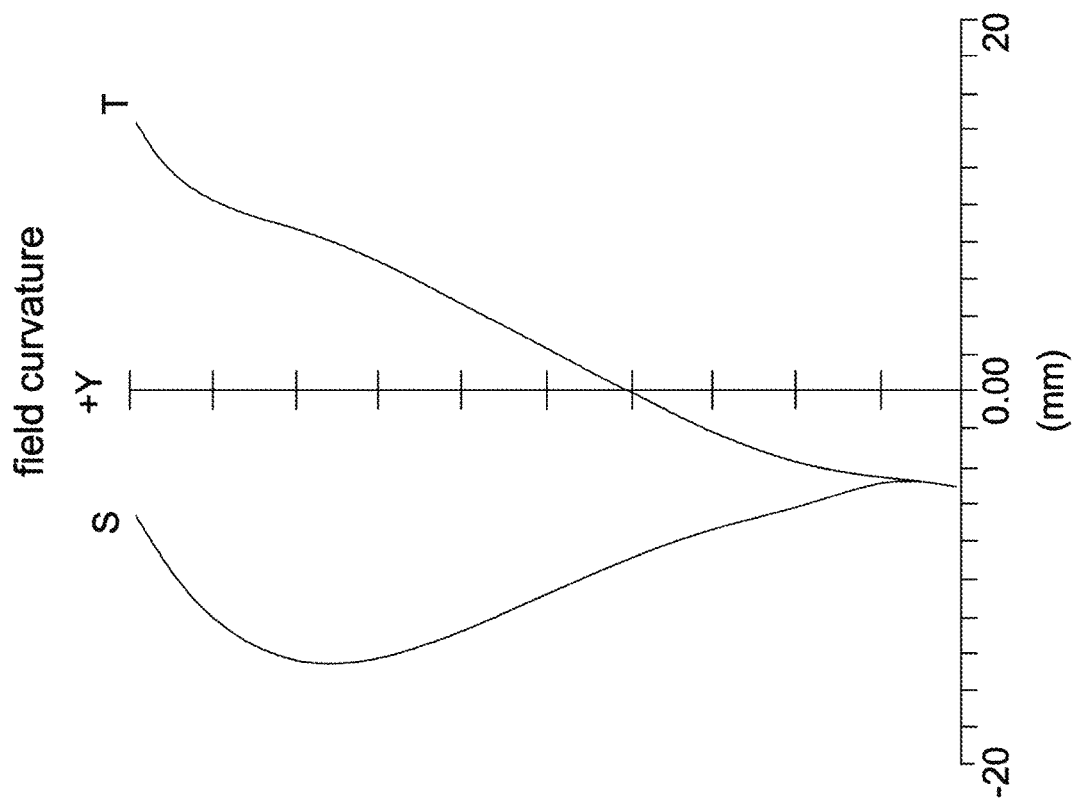

FIGS. 35, 36A and 36B show optical simulation results of the optical lens system shown in FIG. 34. FIG. 35 illustrates modulation transfer function (MTF) curves, FIG. 36A illustrates astigmatic field curves, and FIG. 36B illustrates percentage distortion curves. As shown in FIG. 36B, an absolute value of a maximum optical distortion is smaller than 0.2%.

Figure 37:
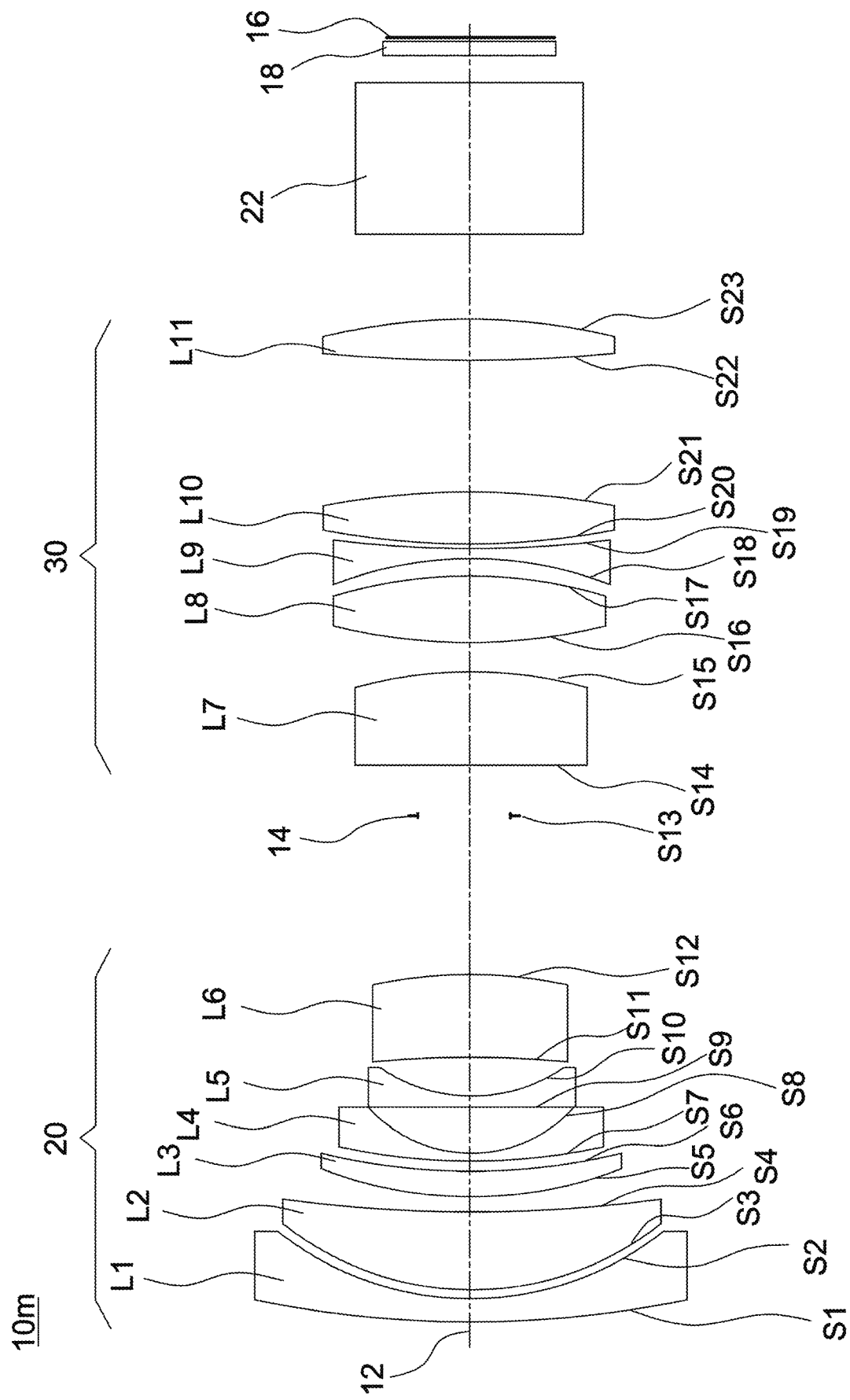
FIG. 37 shows a schematic diagram illustrating an optical lens system according to another embodiment of the invention.

The detailed optical data of the an optical lens system 10*m* illustrated in FIG. 37 are shown in Table 37, and the aspheric surface data are shown in Table 38 below.

TABLE 37

| Surface | radius (mm) | thickness (mm) | refractive index | Abbe number | Refractive power | Shape |
|---|---|---|---|---|---|---|
| S1 | 69.3 | 1.60 | 1.52 | 64.1 | L1 (−) | convex |
| S2 | 18.7 | 0.65 | | | | concave |
| S3 | 19.0 | 6.50 | 1.68 | 55.3 | L2 (+) | convex |
| S4 | 123.7 | 0.81 | | | | concave |
| S5 | 25.9 | 2.22 | 1.67 | 38.1 | L3 (+) | convex |
| S6 | 40.5 | 0.10 | | | | concave |
| S7 | 24.0 | 1.26 | 1.68 | 55.3 | L4 (−) | convex |
| S8 | 9.7 | 3.48 | | | | concave |
| S9 | Infinity | 0.80 | 1.50 | 81.6 | L5 (−) | planar |
| S10 | 9.8 | 3.05 | | | | concave |
| S11 | −100.0 | 6.50 | 1.67 | 54.9 | L6 (+) | concave |
| S12 | −32.3 | 12.38 | | | | convex |
| S13 (stop) | | 4.62 | | | | Stop |
| S14 | Infinity | 6.50 | 1.52 | 64.1 | L7 (+) | planar |
| S15 | −29.9 | 2.21 | | | | convex |
| S16 | 29.5 | 5.35 | 1.50 | 81.5 | L8 (+) | convex |
| S17 | −29.5 | 1.16 | | | | convex |
| S18 | −24.1 | 1.05 | 1.67 | 38.1 | L9 (−) | concave |
| S19 | 63.0 | 4.32 | | | | concave |
| S20 | 34.1 | 4.11 | 1.50 | 81.6 | L10 (+) | convex |
| S21 | −42.7 | 10.46 | | | | convex |
| S22 | 52.8 | 3.02 | 1.58 | 59.2 | L11 (+) | convex |
| S23 | −43.2 | 6.60 | | | | convex |

TABLE 38

| Lens surface | S11 | S12 | S22 | S23 |
|---|---|---|---|---|
| K | 0.00E+00 | 0.00E+00 | 0.00E+00 | 0.00E+00 |
| A | −5.96E−05 | −8.56E−05 | −3.95E−05 | −6.54E−06 |
| B | −1.29E−06 | −7.44E−07 | 8.67E−08 | 8.51E−08 |
| C | 1.25E−08 | 2.14E−09 | −2.77E−09 | −2.44E−09 |
| D | −3.34E−10 | −4.64E−11 | 1.46E−11 | 1.36E−11 |
| E | 0.00E+00 | 0.00E+00 | 0.00E+00 | 0.00E+00 |

Table 36 lists the internal transmittance of each of the lenses L1-L11 of the optical lens system 10m and the overall transmittance of all of the lenses L1-L11 at different wavelengths.

TABLE 39

| | Internal transmittance | | |
|---|---|---|---|
| | 365 nm | 385 nm | 405 nm |
| Lens L1 | 98.8% | 98.9% | 99.0% |
| Lens L2 | 95.8% | 97.7% | 98.3% |
| Lens L3 | 97.7% | 98.6% | 98.8% |
| Lens L4 | 98.4% | 98.8% | 98.9% |
| Lens L5 | 98.9% | 99.0% | 99.0% |
| Lens L6 | 95.8% | 98.2% | 98.2% |
| Lens L7 | 98.2% | 98.6% | 98.8% |
| Lens L8 | 98.0% | 98.7% | 98.7% |
| Lens L9 | 98.4% | 98.8% | 98.9% |
| Lens L10 | 98.5% | 98.8% | 98.9% |
| Lens L11 | 98.2% | 98.7% | 98.8% |
| Total | 78.9% | 85.8% | 87.0% |

Figure 38:
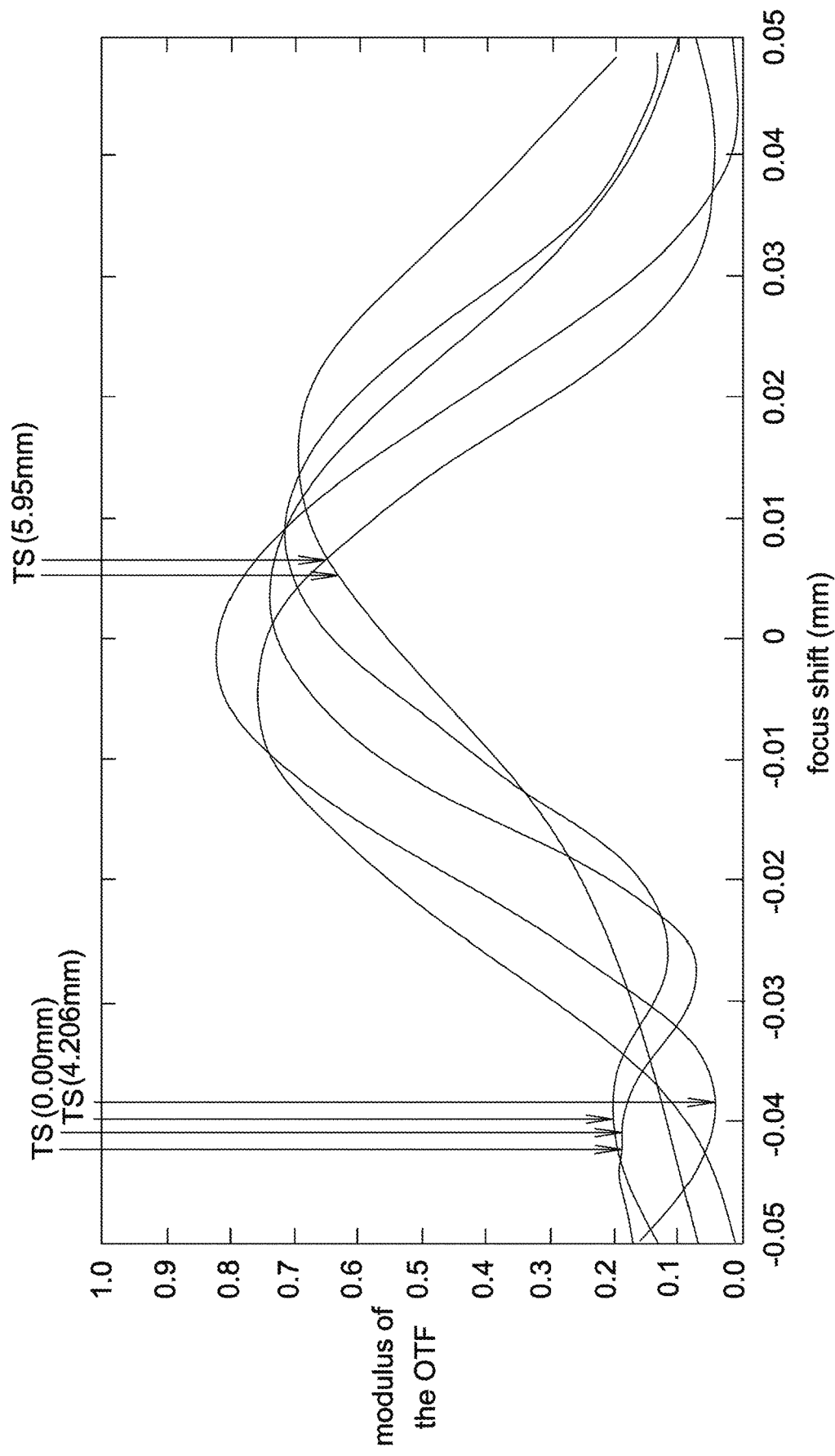

FIGS. 38, 39A and 39B show optical simulation results of the optical lens system shown in FIG. 37. FIG. 38 illustrates modulation transfer function (MTF) curves, FIG. 39A illustrates astigmatic field curves, and FIG. 39B illustrates percentage distortion curves. As shown in FIG. 39B, an absolute value of a maximum optical distortion is smaller than 0.2%.

Note the parameters listed in Tables 1-39 are only for exemplified purposes but do not limit the invention. It should be appreciated that variations about the design parameters or setting may be made in the embodiments by persons skilled in the art without departing from the scope of the invention. Therefore, any optical lens system of the same structure is considered to be within the scope of the present disclosure even if it uses different data. The embodiments depicted above and the appended drawings are exemplary and are not intended to limit the scope of the present disclosure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens system for imaging, comprising in order from a magnified side to a minified side:
   a first lens group of positive refractive power comprising a first lens and a second lens; and
   a second lens group of positive refractive power comprising a third lens and a fourth lens,
   wherein one of the third lens and the fourth lens includes one aspheric surface,
   wherein each of the lenses in the optical lens system being a single lens, and
   wherein, during focusing, the first lens group remains stationary, and the second lens group is movable in a direction of an optical axis, and the optical lens satisfies the following conditions:
   an effective focal length of the optical lens system is in the range of 18.0912 mm to 21.5196 mm; and
   $TE_{(\lambda=400)} > 94$, where $TE_{(\lambda=400)}$ denotes an overall transmittance of all of the lenses in the optical lens system measured at a wavelength of 400 nm.

2. The optical lens system as claimed in claim 1, wherein the conditions:
   $C/N \geq 0.7$ and $N \leq 9$ are satisfied, where N denotes a total number of the lenses in the optical lens system, and C denotes a number of the lenses having an Abbe number of larger than 40.

3. The optical lens system as claimed in claim 2, wherein the condition:
   $T_{(\lambda=400)} > 95\%$ is satisfied, where $T_{(\lambda=400)}$ denotes a transmittance measured at a wavelength of 400 nm and a thickness of 10 mm of any lens material capable of forming the lenses in the optical lens system.

4. The optical lens system as claimed in claim 3, wherein each lens of the first lens group has a refractive index of no more than 1.75.

5. The optical lens system as claimed in claim 3, wherein the optical lens system has a fixed effective focal length.

6. The optical lens system as claimed in claim 3, wherein the optical lens system satisfies one of the following conditions:

(1) the optical lens system has nine lenses with refractive powers of negative, positive, positive, positive, positive, negative, negative, positive and positive;
(2) the optical lens system has eight lenses with refractive powers of negative, positive, positive, positive, negative, negative, positive and positive;
(3) the optical lens system has eight lenses with refractive powers of negative, negative, positive, positive, negative, negative, positive and positive.

7. The optical lens system as claimed in claim 3, wherein the second lens group comprises seven lenses with refractive powers.

8. The optical lens system as claimed in claim 3, wherein the first lens group comprises three lenses with refractive powers, and the second lens group comprises five lenses with refractive powers.

9. The optical lens system as claimed in claim 2, wherein the condition:
$T_{(\lambda=350)} > 90\%$ is satisfied, where $T_{(\lambda=350)}$ denotes a transmittance measured at a wavelength of 350 nm and a thickness of 10 mm of any lens material capable of forming the lenses in the optical lens system.

10. The optical lens system as claimed in claim 9, wherein the optical lens system has a fixed effective focal length.

11. The optical lens system as claimed in claim 9, wherein the optical lens system satisfies one of the following conditions:
(1) the optical lens system has nine lenses with refractive powers of negative, positive, positive, positive, positive, negative, negative, positive and positive;
(2) the optical lens system has eight lenses with refractive powers of negative, positive, positive, positive, negative, negative, positive and positive;
(3) the optical lens system has eight lenses with refractive powers of negative, negative, positive, positive, negative, negative, positive and positive.

12. The optical lens system as claimed in claim 9, wherein the second lens group comprises seven lenses with refractive powers.

13. The optical lens system as claimed in claim 9, wherein the first lens group comprises three lenses with refractive powers, and the second lens group comprises five lenses with refractive powers.

14. The optical lens system as claimed in claim 1, wherein each lens of the first lens group has a refractive index of no more than 1.75.

15. The optical lens system as claimed in claim 1, wherein the condition:
$T_{(\lambda=400)} > 95\%$ is satisfied, where $T_{(\lambda=400)}$ denotes a transmittance measured at a wavelength of 400 nm and a thickness of 10 mm of any lens material capable of forming the lenses in the optical lens system.

16. The optical lens system as claimed in claim 1, wherein the condition:
$TE_{(\lambda=350)} > 80\%$ is satisfied, where $TE_{(\lambda=350)}$ denotes an overall transmittance of all of the lenses in the optical lens system measured at a wavelength of 350 nm.

17. The optical lens system as claimed in claim 1, wherein the condition:
$T_{(\lambda=350)} > 90\%$ is satisfied, where $T_{(\lambda=350)}$ denotes a transmittance measured at a wavelength of 350 nm and a thickness of 10 mm of any lens material capable of forming the lenses in the optical lens system.

18. The optical lens system as claimed in claim 1, wherein the optical lens system satisfies one of the following conditions:
(1) the optical lens system has nine lenses with refractive powers of negative, positive, positive, positive, positive, negative, negative, positive and positive;
(2) the optical lens system has eight lenses with refractive powers of negative, positive, positive, positive, negative, negative, positive and positive;
(3) the optical lens system has eight lenses with refractive powers of negative, negative, positive, positive, negative, negative, positive and positive.

19. The optical lens system as claimed in claim 1, wherein the second lens group comprises seven lenses with refractive powers.

20. The optical lens system as claimed in claim 1, wherein the first lens group comprises three lenses with refractive powers, and the second lens group comprises five lenses with refractive powers.

* * * * *